United States Patent
Campbell et al.

(10) Patent No.: US 11,686,821 B2
(45) Date of Patent: Jun. 27, 2023

(54) SCAN PATTERNS FOR LIDAR SYSTEMS

(71) Applicant: Luminar, LLC, Orlando, FL (US)

(72) Inventors: Scott R. Campbell, Sanford, FL (US); Rodger W. Cleye, Aliso Viejo, CA (US); Jason M. Eichenholz, Orlando, FL (US); Lane A. Martin, Vancouver, WA (US); Matthew D. Weed, Orlando, FL (US)

(73) Assignee: Luminar, LLC, Orlando, FL (US)

( * ) Notice: Subject to any disclaimer, the term of this patent is extended or adjusted under 35 U.S.C. 154(b) by 1101 days.

(21) Appl. No.: 16/390,923

(22) Filed: Apr. 22, 2019

(65) Prior Publication Data
US 2019/0250254 A1   Aug. 15, 2019

Related U.S. Application Data

(63) Continuation of application No. 15/871,687, filed on Jan. 15, 2018, now Pat. No. 10,267,898, which is a
(Continued)

(51) Int. Cl.
*G01C 3/08* (2006.01)
*G01S 7/481* (2006.01)
(Continued)

(52) U.S. Cl.
CPC ............ *G01S 7/4815* (2013.01); *G01S 7/487* (2013.01); *G01S 7/4817* (2013.01);
(Continued)

(58) Field of Classification Search
CPC .... G01S 7/4815; G01S 7/4817; G01S 7/4865; G01S 17/10; G01S 7/487; G01S 17/42;
(Continued)

(56) References Cited

U.S. PATENT DOCUMENTS

| 5,006,721 A | 4/1991 | Cameron et al. |
| 5,198,657 A | 3/1993 | Trost et al. |

(Continued)

FOREIGN PATENT DOCUMENTS

| CN | 1987518 | 6/2007 |
| CN | 102323593 | 1/2012 |

(Continued)

OTHER PUBLICATIONS

International Preliminary Report on Patentability dated Jun. 5, 2018 for PCT/US2016/064020.
(Continued)

*Primary Examiner* — Samantha K Nickerson

(57) ABSTRACT

A system includes a first lidar sensor and a second lidar sensor, where each lidar sensor includes a scanner configured to direct a set of pulses of light along a scan pattern and a receiver configured to detect scattered light from the set of light pulses. The scan patterns are at least partially overlapped in an overlap region. The system further includes an enclosure, where the first lidar sensor and the second lidar sensor are contained within the enclosure. Each scanner includes one or more mirrors, and each mirror is driven by a scan mechanism.

13 Claims, 16 Drawing Sheets

Related U.S. Application Data continuation of application No. 15/466,702, filed on Mar. 22, 2017, now Pat. No. 9,869,754.

(51) Int. Cl.
  *G01S 17/10* (2020.01)
  *G01S 17/42* (2006.01)
  *G01S 17/87* (2020.01)
  *G01S 7/487* (2006.01)
  *G01S 17/931* (2020.01)
  *G01S 7/4865* (2020.01)

(52) U.S. Cl.
  CPC ............ *G01S 7/4865* (2013.01); *G01S 17/10* (2013.01); *G01S 17/42* (2013.01); *G01S 17/87* (2013.01); *G01S 17/931* (2020.01)

(58) Field of Classification Search
  CPC ...... G01S 17/87; G01S 17/931; G01S 7/4812; G01S 7/4814; G01S 7/4813; G01S 17/89
  See application file for complete search history.

(56) References Cited

U.S. PATENT DOCUMENTS

| | | |
|---|---|---|
| 5,696,778 A | 12/1997 | MacPherson |
| 5,867,305 A | 2/1999 | Waarts et al. |
| 5,872,621 A | 2/1999 | Wilkerson et al. |
| 5,892,575 A | 4/1999 | Marino |
| 5,978,736 A | 11/1999 | Greendale |
| 6,449,384 B2 | 9/2002 | Laumeyer et al. |
| 6,710,324 B2 | 3/2004 | Hipp |
| 6,723,975 B2 | 4/2004 | Saccomanno |
| 6,747,747 B2 | 6/2004 | Hipp |
| 6,759,649 B2 | 7/2004 | Hipp |
| 7,092,548 B2 | 8/2006 | Laumeyer et al. |
| 7,209,221 B2 | 4/2007 | Breed et al. |
| 7,248,342 B1 | 7/2007 | Degnan |
| 7,345,271 B2 | 3/2008 | Boehlau et al. |
| 7,443,903 B2 | 10/2008 | Leonardo et al. |
| 7,532,311 B2 | 5/2009 | Henderson et al. |
| 7,570,793 B2 | 8/2009 | Lages et al. |
| 7,583,364 B1 | 9/2009 | Mayor et al. |
| 7,649,920 B2 | 1/2010 | Welford |
| 7,652,752 B2 | 1/2010 | Fetzer et al. |
| 7,839,491 B2 | 11/2010 | Harris et al. |
| 7,872,794 B1 | 1/2011 | Minelly et al. |
| 7,902,570 B2 | 3/2011 | Itzler et al. |
| 7,945,408 B2 | 5/2011 | Dimsdale et al. |
| 7,969,558 B2 | 6/2011 | Hall |
| 7,995,796 B2 | 8/2011 | Retterath et al. |
| 8,059,263 B2 | 11/2011 | Haberer et al. |
| 8,072,663 B2 | 12/2011 | O'Neill et al. |
| 8,081,301 B2 | 12/2011 | Stann et al. |
| 8,138,849 B2 | 3/2012 | West et al. |
| 8,279,420 B2 | 10/2012 | Ludwig et al. |
| 8,280,623 B2 | 10/2012 | Trepagnier et al. |
| 8,346,480 B2 | 1/2013 | Trepagnier et al. |
| 8,364,334 B2 | 1/2013 | Au et al. |
| 8,452,561 B2 | 5/2013 | Dimsdale et al. |
| 8,541,744 B1 | 9/2013 | Liu |
| 8,548,014 B2 | 10/2013 | Fermann et al. |
| 8,625,080 B2 | 1/2014 | Heizman et al. |
| 8,675,181 B2 | 3/2014 | Hall |
| 8,693,008 B2 | 4/2014 | Doemer et al. |
| 8,723,955 B2 | 5/2014 | Klehn et al. |
| 8,767,190 B2 | 7/2014 | Hall |
| 8,796,605 B2 | 8/2014 | Mordarski et al. |
| 8,804,787 B1 | 8/2014 | Coleman et al. |
| 8,836,922 B1 | 9/2014 | Pennecot et al. |
| 8,880,296 B2 | 11/2014 | Breed |
| 8,896,818 B2 | 11/2014 | Walsh et al. |
| 8,934,509 B2 | 1/2015 | Savage-Leuchs et al. |
| 9,000,347 B2 | 4/2015 | Woodward et al. |
| 9,041,136 B2 | 5/2015 | Chia |
| 9,048,370 B1 | 6/2015 | Urmson et al. |
| 9,063,549 B1 | 6/2015 | Pennecot et al. |
| 9,069,060 B1 | 6/2015 | Zbrozek et al. |
| 9,074,878 B2 | 7/2015 | Steffey et al. |
| 9,086,273 B1 | 7/2015 | Gruver et al. |
| 9,086,481 B1 | 7/2015 | Dowdall et al. |
| 9,091,754 B2 | 7/2015 | d'Aligny |
| 9,103,669 B2 | 8/2015 | Giacotto et al. |
| 9,121,703 B1 | 9/2015 | Droz et al. |
| 9,160,140 B2 | 10/2015 | Gusev et al. |
| 9,170,333 B2 | 10/2015 | Mheen et al. |
| 9,199,641 B2 | 12/2015 | Ferguson et al. |
| 9,213,085 B2 | 12/2015 | Kanter |
| 9,239,260 B2 | 1/2016 | Bayha et al. |
| 9,244,272 B2 | 1/2016 | Schultz |
| 9,246,041 B1 | 1/2016 | Clausen et al. |
| 9,285,464 B2 | 3/2016 | Pennecot et al. |
| 9,285,477 B1 | 3/2016 | Smith et al. |
| 9,297,901 B2 | 3/2016 | Bayha et al. |
| 9,299,731 B1 | 3/2016 | Lenius et al. |
| 9,304,154 B1 | 4/2016 | Droz et al. |
| 9,304,203 B1 | 4/2016 | Droz et al. |
| 9,304,316 B2 | 4/2016 | Weiss et al. |
| 9,310,471 B2 | 4/2016 | Sayyah et al. |
| 9,335,255 B2 | 5/2016 | Retterath et al. |
| 9,360,554 B2 | 6/2016 | Retterath et al. |
| 9,368,933 B1 | 6/2016 | Nijjar et al. |
| 9,383,201 B2 | 7/2016 | Jachman et al. |
| 9,383,445 B2 | 7/2016 | Lu et al. |
| 9,383,753 B1 | 7/2016 | Templeton et al. |
| 9,823,353 B2 | 11/2017 | Eichenholz et al. |
| RE46,672 E | 1/2018 | Hall |
| 9,857,468 B1 | 1/2018 | Eichenholz et al. |
| 9,869,754 B1 | 1/2018 | Campbell et al. |
| 9,874,635 B1 | 1/2018 | Eichenholz et al. |
| 9,897,687 B1 | 2/2018 | Campbell et al. |
| 9,958,545 B2 | 5/2018 | Eichenholz et al. |
| 2002/0041435 A1 | 4/2002 | Krummrich |
| 2002/0060784 A1 | 5/2002 | Pack et al. |
| 2003/0043058 A1 | 3/2003 | Jamieson et al. |
| 2005/0214690 A1 | 9/2005 | Verheijden et al. |
| 2006/0231771 A1 | 10/2006 | Lee et al. |
| 2006/0290920 A1 | 12/2006 | Kampchen et al. |
| 2007/0040121 A1 | 2/2007 | Kalayeh |
| 2007/0182949 A1 | 8/2007 | Niclass |
| 2008/0027591 A1 | 1/2008 | Lenser et al. |
| 2008/0074640 A1 | 3/2008 | Walsh et al. |
| 2008/0181266 A1 | 7/2008 | Deladurantaye et al. |
| 2008/0309913 A1 | 12/2008 | Fallon |
| 2009/0122295 A1 | 5/2009 | Eaton |
| 2009/0262760 A1 | 10/2009 | Krupkin et al. |
| 2009/0273770 A1 | 11/2009 | Bauhahn et al. |
| 2010/0128744 A1 | 5/2010 | Deladurantaye et al. |
| 2010/0231774 A1 | 9/2010 | Tashiro |
| 2010/0271615 A1 | 10/2010 | Sebastian et al. |
| 2011/0085149 A1 | 4/2011 | Nathan |
| 2012/0154785 A1* | 6/2012 | Gilliland ............... G01S 7/4813 356/5.01 |
| 2012/0168605 A1 | 7/2012 | Milanovic |
| 2012/0206712 A1 | 8/2012 | Chang et al. |
| 2012/0227263 A1 | 9/2012 | Leclair et al. |
| 2012/0268105 A1 | 10/2012 | Mann et al. |
| 2013/0010820 A1 | 1/2013 | Curtis |
| 2013/0033742 A1 | 2/2013 | Rogers et al. |
| 2013/0175435 A1 | 7/2013 | Drader |
| 2013/0282208 A1 | 10/2013 | Mendez-Rodriguez et al. |
| 2014/0111805 A1 | 4/2014 | Albert et al. |
| 2014/0146303 A1 | 5/2014 | Mitchell et al. |
| 2014/0168631 A1 | 6/2014 | Haslim et al. |
| 2014/0176933 A1 | 6/2014 | Haslim et al. |
| 2014/0211194 A1 | 7/2014 | Pacala et al. |
| 2014/0268098 A1 | 9/2014 | Schwartz |
| 2014/0268311 A1 | 9/2014 | Zhu |
| 2014/0293263 A1 | 10/2014 | Justice et al. |
| 2014/0293266 A1 | 10/2014 | Hsu et al. |
| 2014/0330479 A1 | 11/2014 | Dolgov |
| 2014/0376001 A1 | 12/2014 | Swanson |
| 2015/0092184 A1 | 4/2015 | Schultz |
| 2015/0109605 A1 | 4/2015 | Major, Jr. et al. |

(56) References Cited

U.S. PATENT DOCUMENTS

| | | |
|---|---|---|
| 2015/0131080 A1 | 5/2015 | Retterath et al. |
| 2015/0177368 A1 | 6/2015 | Bayha et al. |
| 2015/0185244 A1 | 7/2015 | Inoue et al. |
| 2015/0185313 A1 | 7/2015 | Zhu |
| 2015/0192676 A1 | 7/2015 | Kotelnikov et al. |
| 2015/0192677 A1 | 7/2015 | Yu et al. |
| 2015/0204978 A1 | 7/2015 | Hammes et al. |
| 2015/0214690 A1 | 7/2015 | Savage-Leuchs et al. |
| 2015/0219765 A1 | 8/2015 | Mead et al. |
| 2015/0285623 A1 | 10/2015 | Tachibana |
| 2015/0301182 A1 | 10/2015 | Geiger et al. |
| 2015/0316415 A1 | 11/2015 | Islam |
| 2015/0323654 A1 | 11/2015 | Jachmann et al. |
| 2015/0378023 A1 | 12/2015 | Rayo Rayo et al. |
| 2015/0378241 A1 | 12/2015 | Eldada |
| 2016/0025842 A1 | 1/2016 | Anderson et al. |
| 2016/0047896 A1 | 2/2016 | Dussan |
| 2016/0047901 A1 | 2/2016 | Pacala et al. |
| 2016/0047904 A1 | 2/2016 | Mellot |
| 2016/0049765 A1 | 2/2016 | Eldada |
| 2016/0139266 A1 | 5/2016 | Montoya et al. |
| 2016/0146926 A1 | 5/2016 | Jungwirth |
| 2016/0146939 A1 | 5/2016 | Shpunt et al. |
| 2016/0146940 A1 | 5/2016 | Koehler |
| 2016/0161600 A1 | 6/2016 | Eldada et al. |
| 2016/0245919 A1 | 8/2016 | Kalscheur et al. |
| 2016/0282468 A1* | 9/2016 | Gruver .................. G01S 7/4817 |
| 2017/0269215 A1* | 9/2017 | Hall ........................ G01S 17/42 |
| 2017/0307743 A1* | 10/2017 | Izzat ....................... G01S 13/04 |
| 2018/0032042 A1 | 2/2018 | Turpin et al. |
| 2018/0120433 A1 | 5/2018 | Eichenholz et al. |

FOREIGN PATENT DOCUMENTS

| | | |
|---|---|---|
| CN | 102621557 | 8/2012 |
| CN | 102922127 | 2/2013 |
| CN | 104101333 | 10/2014 |
| CN | 105659108 | 6/2016 |
| CN | 106127665 | 11/2016 |
| EP | 0717288 | 6/1996 |
| EP | 2833161 | 2/2015 |
| WO | 2017/095817 | 6/2017 |

OTHER PUBLICATIONS

International Search Report and Written Report dated Jun. 22, 2018 for PCT/US2018/023819.

Non-Final Office Action dated Jun. 20, 2017 for U.S. Appl. No. 15/466,702.

Non-Final Office Action datedDec. 28, 2018 for U.S. Appl. No. 15/871,687.

Communication Pursuant Article 94(3) EPC for European Application No. 18771263.3 dated Nov. 11, 2021.

Extended European Search Report for European Application No. 21185602.6 dated Nov. 15, 2021.

Extended European Search Report for European Application No. 18771263.3 dated Dec. 1, 2020.

* cited by examiner

SCAN PATTERNS FOR LIDAR SYSTEMS

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application is a continuation of U.S. patent application Ser. No. 15/871,687, filed Jan. 15, 2018, which is a continuation of U.S. patent application Ser. No. 15/466,702, filed Mar. 22, 2017 and issued Jan. 16, 2018 as U.S. Pat. No. 9,869,754, both of which are entitled "Scan Patterns for Lidar Systems," and both of which are incorporated herein by reference.

BACKGROUND

Technical Field

This disclosure generally relates to lidar systems.

Description of the Related Art

Light detection and ranging (lidar) is a technology that can be used to measure distances to remote targets. Typically, a lidar system includes a light source and an optical receiver. The light source can be, for example, a laser which emits light having a particular operating wavelength. The operating wavelength of a lidar system may lie, for example, in the infrared, visible, or ultraviolet portions of the electromagnetic spectrum. The light source emits light toward a target which then scatters the light. Some of the scattered light is received back at the receiver. The system determines the distance to the target based on one or more characteristics associated with the returned light. For example, the system may determine the distance to the target based on the time of flight of a returned light pulse.

DETAILED DESCRIPTION

Figure 1:
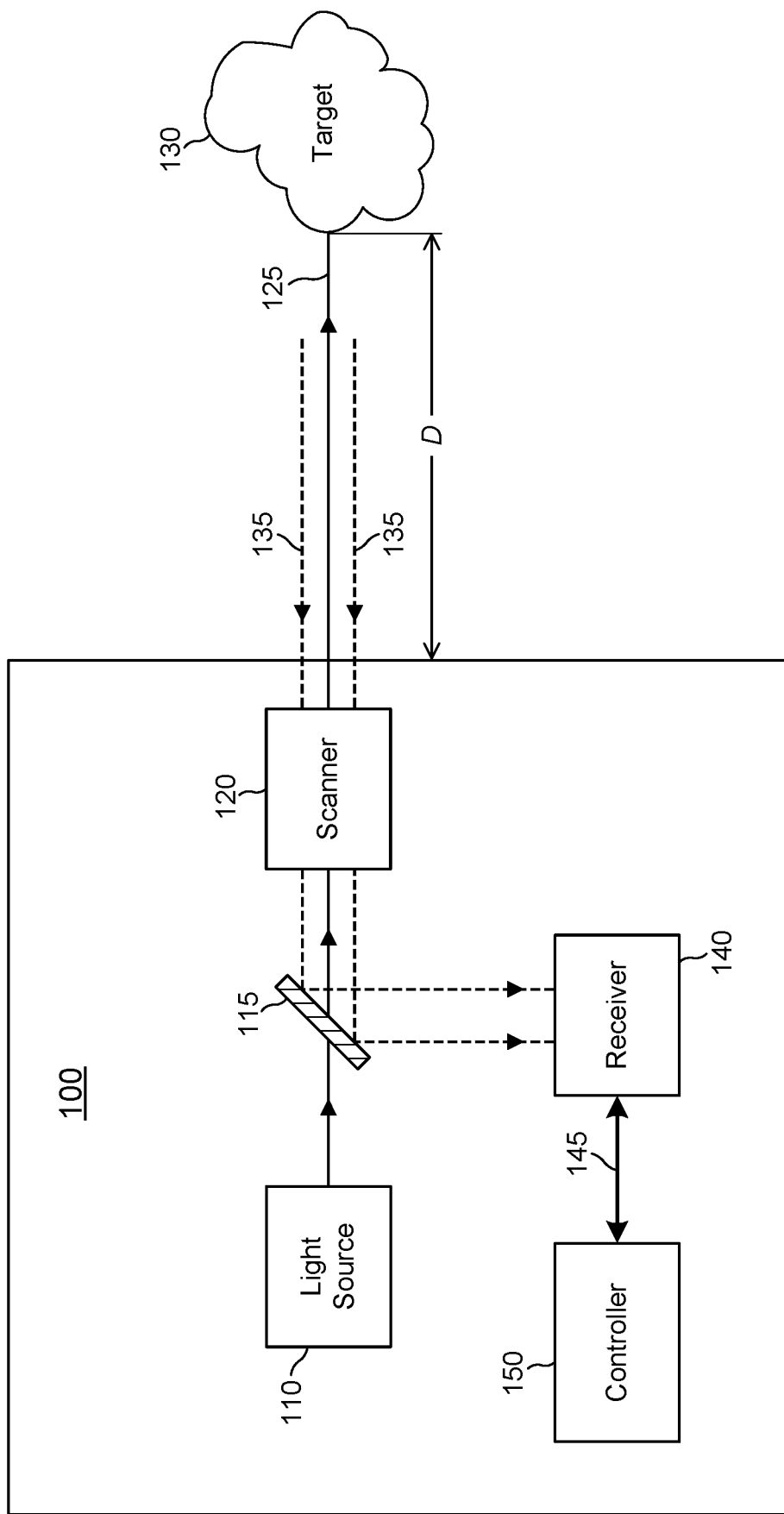
FIG. 1 illustrates an example light detection and ranging (lidar) system.

FIG. 1 illustrates an example light detection and ranging (lidar) system 100. In particular embodiments, a lidar system 100 may be referred to as a laser ranging system, a laser radar system, a LIDAR system, a lidar sensor, or a laser detection and ranging (LADAR or ladar) system. In particular embodiments, a lidar system 100 may include a light source 110, mirror 115, scanner 120, receiver 140, or controller 150. The light source 110 may be, for example, a laser which emits light having a particular operating wavelength in the infrared, visible, or ultraviolet portions of the electromagnetic spectrum. As an example, light source 110 may include a laser with an operating wavelength between approximately 1.2 μm and 1.7 μm. The light source 110 emits an output beam of light 125 which may be continuous-wave, pulsed, or modulated in any suitable manner for a given application. The output beam of light 125 is directed downrange toward a remote target 130. As an example, the remote target 130 may be located a distance D of approximately 1 m to 1 km from the lidar system 100.

Once the output beam 125 reaches the downrange target 130, the target may scatter or reflect at least a portion of light from the output beam 125, and some of the scattered or reflected light may return toward the lidar system 100. In the example of FIG. 1, the scattered or reflected light is represented by input beam 135, which passes through scanner 120 and is directed by mirror 115 to receiver 140. In particular embodiments, a relatively small fraction of the light from output beam 125 may return to the lidar system 100 as input beam 135. As an example, the ratio of input beam 135 average power, peak power, or pulse energy to output beam 125 average power, peak power, or pulse energy may be approximately $10^{-1}$, $10^{-2}$, $10^{-3}$, $10^{-4}$, $10^{-5}$, $10^{-6}$, $10^{-7}$, $10^{-8}$, $10^{-9}$, $10^{-10}$, $10^{-11}$, or $10^{-12}$. As another example, if a pulse of output beam 125 has a pulse energy of 1 microjoule (μJ), then the pulse energy of a corresponding pulse of input beam 135 may have a pulse energy of approximately 10 nanojoules (nJ), 1 nJ, 100 picojoules (pJ), 10 pJ, 1 pJ, 100 femtojoules (fJ), 10 fJ, 1 fJ, 100 attojoules (aJ), 10 aJ, or 1 aJ. In particular embodiments, output beam 125 may be referred to as a laser beam, light beam, optical beam, emitted beam, or beam. In particular embodiments, input beam 135 may be referred to as a return beam, received beam, return light, received light, input light, scattered light, or reflected light. As used herein, scattered light may refer to light that is scattered or reflected by a target 130. As an example, an input beam 135 may include: light from the output beam 125 that is scattered by target 130; light from the output beam 125 that is reflected by target 130; or a combination of scattered and reflected light from target 130.

In particular embodiments, receiver 140 may receive or detect photons from input beam 135 and generate one or more representative signals. For example, the receiver 140 may generate an output electrical signal 145 that is representative of the input beam 135. This electrical signal 145 may be sent to controller 150. In particular embodiments, controller 150 may include a processor, computing system (e.g., an ASIC or FPGA), or other suitable circuitry configured to analyze one or more characteristics of the electrical signal 145 from the receiver 140 to determine one or more characteristics of the target 130, such as its distance downrange from the lidar system 100. This can be done, for example, by analyzing the time of flight or phase modulation for a beam of light 125 transmitted by the light source 110. If lidar system 100 measures a time of flight of T (e.g., T represents a round-trip time of flight for an emitted pulse of light to travel from the lidar system 100 to the target 130 and back to the lidar system 100), then the distance D from the target 130 to the lidar system 100 may be expressed as D=c·T/2, where c is the speed of light (approximately $3.0 \times 10^8$ m/s). As an example, if a time of flight is measured to be T=300 ns, then the distance from the target 130 to the lidar system 100 may be determined to be approximately D=45.0 m. As another example, if a time of flight is measured to be T=1.33 µs, then the distance from the target 130 to the lidar system 100 may be determined to be approximately D=199.5 m. In particular embodiments, a distance D from lidar system 100 to a target 130 may be referred to as a distance, depth, or range of target 130. As used herein, the speed of light c refers to the speed of light in any suitable medium, such as for example in air, water, or vacuum. As an example, the speed of light in vacuum is approximately $2.9979 \times 10^8$ m/s, and the speed of light in air (which has a refractive index of approximately 1.0003) is approximately $2.9970 \times 10^8$ m/s.

In particular embodiments, light source 110 may include a pulsed laser. As an example, light source 110 may be a pulsed laser configured to produce or emit pulses of light with a pulse duration or pulse width of approximately 10 picoseconds (ps) to 20 nanoseconds (ns). As another example, light source 110 may be a pulsed laser that produces pulses with a pulse duration of approximately 200-400 ps. As another example, light source 110 may be a pulsed laser that produces pulses at a pulse repetition frequency of approximately 100 kHz to 5 MHz or a pulse period (e.g., a time between consecutive pulses) of approximately 200 ns to 10 µs. In particular embodiments, light source 110 may have a substantially constant pulse repetition frequency, or light source 110 may have a variable or adjustable pulse repetition frequency. As an example, light source 110 may be a pulsed laser that produces pulses at a substantially constant pulse repetition frequency of approximately 640 kHz (e.g., 640,000 pulses per second), corresponding to a pulse period of approximately 1.56 µs. As another example, light source 110 may have a pulse repetition frequency that can be varied from approximately 500 kHz to 3 MHz. As used herein, a pulse of light may be referred to as an optical pulse, a light pulse, or a pulse.

In particular embodiments, light source 110 may produce a free-space output beam 125 having any suitable average optical power, and the output beam 125 may have optical pulses with any suitable pulse energy or peak optical power. As an example, output beam 125 may have an average power of approximately 1 mW, 10 mW, 100 mW, 1 W, 10 W, or any other suitable average power. As another example, output beam 125 may include pulses with a pulse energy of approximately 0.1 µJ, 1 µJ, 10 µJ, 100 µJ, 1 mJ, or any other suitable pulse energy. As another example, output beam 125 may include pulses with a peak power of approximately 10 W, 100 W, 1 kW, 5 kW, 10 kW, or any other suitable peak power. An optical pulse with a duration of 400 ps and a pulse energy of 1 µJ has a peak power of approximately 2.5 kW. If the pulse repetition frequency is 500 kHz, then the average power of an output beam 125 with 1-µJ pulses is approximately 0.5 W.

In particular embodiments, light source 110 may include a laser diode, such as for example, a Fabry-Perot laser diode, a quantum well laser, a distributed Bragg reflector (DBR) laser, a distributed feedback (DFB) laser, or a vertical-cavity surface-emitting laser (VCSEL). As an example, light source 110 may include an aluminum-gallium-arsenide (AlGaAs) laser diode, an indium-gallium-arsenide (InGaAs) laser diode, or an indium-gallium-arsenide-phosphide (InGaAsP) laser diode. In particular embodiments, light source 110 may include a pulsed laser diode with a peak emission wavelength of approximately 1400-1600 nm. As an example, light source 110 may include a laser diode that is current modulated to produce optical pulses. In particular embodiments, light source 110 may include a pulsed laser diode followed by one or more optical-amplification stages. As an example, light source 110 may be a fiber-laser module that includes a current-modulated laser diode with a peak wavelength of approximately 1550 nm followed by a single-stage or a multi-stage erbium-doped fiber amplifier (EDFA). As another example, light source 110 may include a continuous-wave (CW) or quasi-CW laser diode followed by an external optical modulator (e.g., an electro-optic modulator), and the output of the modulator may be fed into an optical amplifier.

In particular embodiments, an output beam of light 125 emitted by light source 110 may be a collimated optical beam with any suitable beam divergence, such as for example, a divergence of approximately 0.1 to 3.0 milliradian (mrad). A divergence of output beam 125 may refer to an angular measure of an increase in beam size (e.g., a beam radius or beam diameter) as output beam 125 travels away from light source 110 or lidar system 100. In particular embodiments, output beam 125 may have a substantially circular cross section with a beam divergence characterized by a single divergence value. As an example, an output beam 125 with a circular cross section and a divergence of 1 mrad may have a beam diameter or spot size of approximately 10 cm at a distance of 100 m from lidar system 100. In particular embodiments, output beam 125 may be an astigmatic beam or may have a substantially elliptical cross section and may be characterized by two divergence values. As an example, output beam 125 may have a fast axis and a slow axis, where the fast-axis divergence is greater than the slow-axis divergence. As another example, output beam 125 may be an astigmatic beam with a fast-axis divergence of 2 mrad and a slow-axis divergence of 0.5 mrad.

In particular embodiments, an output beam of light 125 emitted by light source 110 may be unpolarized or randomly polarized, may have no specific or fixed polarization (e.g., the polarization may vary with time), or may have a particular polarization (e.g., output beam 125 may be linearly polarized, elliptically polarized, or circularly polarized). As an example, light source 110 may produce linearly polarized light, and lidar system 100 may include a quarter-wave plate that converts this linearly polarized light into circularly polarized light. The circularly polarized light may be transmitted as output beam 125, and lidar system 100 may receive input beam 135, which may be substantially or at least partially circularly polarized in the same manner as the output beam 125 (e.g., if output beam 125 is right-hand circularly polarized, then input beam 135 may also be right-hand circularly polarized). The input beam 135 may pass through the same quarter-wave plate (or a different quarter-wave plate) resulting in the input beam 135 being converted to linearly polarized light which is orthogonally polarized (e.g., polarized at a right angle) with respect to the linearly polarized light produced by light source 110. As another example, lidar system 100 may employ polarization-diversity detection where two polarization components are detected separately. The output beam 125 may be linearly polarized, and the lidar system 100 may split the input beam 135 into two polarization components (e.g., s-polarization and p-polarization) which are detected separately by two photodiodes (e.g., a balanced photoreceiver that includes two photodiodes).

In particular embodiments, lidar system 100 may include one or more optical components configured to condition, shape, filter, modify, steer, or direct the output beam 125 or the input beam 135. As an example, lidar system 100 may include one or more lenses, mirrors, filters (e.g., bandpass or interference filters), beam splitters, polarizers, polarizing beam splitters, wave plates (e.g., half-wave or quarter-wave plates), diffractive elements, or holographic elements. In particular embodiments, lidar system 100 may include a telescope, one or more lenses, or one or more mirrors to expand, focus, or collimate the output beam 125 to a desired beam diameter or divergence. As an example, the lidar system 100 may include one or more lenses to focus the input beam 135 onto an active region of receiver 140. As another example, the lidar system 100 may include one or more flat mirrors or curved mirrors (e.g., concave, convex, or parabolic mirrors) to steer or focus the output beam 125 or the input beam 135. For example, the lidar system 100 may include an off-axis parabolic mirror to focus the input beam 135 onto an active region of receiver 140. As illustrated in FIG. 1, the lidar system 100 may include mirror 115 (which may be a metallic or dielectric mirror), and mirror 115 may be configured so that light beam 125 passes through the mirror 115. As an example, mirror 115 (which may be referred to as an overlap mirror, superposition mirror, or beam-combiner mirror) may include a hole, slot, or aperture which output light beam 125 passes through. As another example, mirror 115 may be configured so that at least 80% of output beam 125 passes through mirror 115 and at least 80% of input beam 135 is reflected by mirror 115. In particular embodiments, mirror 115 may provide for output beam 125 and input beam 135 to be substantially coaxial so that the two beams travel along substantially the same optical path (albeit in opposite directions).

In particular embodiments, lidar system 100 may include a scanner 120 to steer the output beam 125 in one or more directions downrange. As an example, scanner 120 may include one or more scanning mirrors that are configured to rotate, tilt, pivot, or move in an angular manner about one or more axes. In particular embodiments, a flat scanning mirror may be attached to a scanner actuator or mechanism which scans the mirror over a particular angular range. As an example, scanner 120 may include a galvanometer scanner, a resonant scanner, a piezoelectric actuator, a polygonal scanner, a rotating-prism scanner, a voice coil motor, a DC motor, a stepper motor, or a microelectromechanical systems (MEMS) device, or any other suitable actuator or mechanism. In particular embodiments, scanner 120 may be configured to scan the output beam 125 over a 5-degree angular range, 20-degree angular range, 30-degree angular range, 60-degree angular range, or any other suitable angular range. As an example, a scanning mirror may be configured to periodically rotate over a 15-degree range, which results in the output beam 125 scanning across a 30-degree range (e.g., a Θ-degree rotation by a scanning mirror results in a 2Θ-degree angular scan of output beam 125). In particular embodiments, a field of regard (FOR) of a lidar system 100 may refer to an area, region, or angular range over which the lidar system 100 may be configured to scan or capture distance information. As an example, a lidar system 100 with an output beam 125 with a 30-degree scanning range may be referred to as having a 30-degree angular field of regard. As another example, a lidar system 100 with a scanning mirror that rotates over a 30-degree range may produce an output beam 125 that scans across a 60-degree range (e.g., a 60-degree FOR). In particular embodiments, lidar system 100 may have a FOR of approximately 10°, 20°, 40°, 60°, 120°, or any other suitable FOR. In particular embodiments, a FOR may be referred to as a scan region.

In particular embodiments, scanner 120 may be configured to scan the output beam 125 horizontally and vertically, and lidar system 100 may have a particular FOR along the horizontal direction and another particular FOR along the vertical direction. As an example, lidar system 100 may have a horizontal FOR of 10° to 120° and a vertical FOR of 2° to 45°. In particular embodiments, scanner 120 may include a first mirror and a second mirror, where the first mirror directs the output beam 125 toward the second mirror, and the second mirror directs the output beam 125 downrange. As an example, the first mirror may scan the output beam 125 along a first direction, and the second mirror may scan the output beam 125 along a second direction that is substantially orthogonal to the first direction. As another example, the first mirror may scan the output beam 125 along a substantially horizontal direction, and the second mirror may scan the output beam 125 along a substantially vertical direction (or vice versa). In particular embodiments, scanner 120 may be referred to as a beam scanner, optical scanner, or laser scanner.

In particular embodiments, one or more scanning mirrors may be communicatively coupled to controller 150 which may control the scanning mirror(s) so as to guide the output beam 125 in a desired direction downrange or along a desired scan pattern. In particular embodiments, a scan pattern (which may be referred to as an optical scan pattern, optical scan path, or scan path) may refer to a pattern or path along which the output beam 125 is directed. As an example, scanner 120 may include two scanning mirrors configured to scan the output beam 125 across a 60° horizontal FOR and a 20° vertical FOR. The two scanner mirrors may be controlled to follow a scan path that substantially covers the 60°×20° FOR. As an example, the scan path may result in a point cloud with pixels that substantially cover the 60°×20° FOR. The pixels may be approximately evenly distributed across the 60°×20° FOR. Alternately, the pixels may have a particular nonuniform distribution (e.g., the pixels may be distributed across all or a portion of the 60°×20° FOR, and the pixels may have a higher density in one or more particular regions of the 60°×20° FOR).

In particular embodiments, a light source 110 may emit pulses of light which are scanned by scanner 120 across a FOR of lidar system 100. One or more of the emitted pulses of light may be scattered by a target 130 located downrange from the lidar system 100, and a receiver 140 may detect at least a portion of the pulses of light scattered by the target 130. In particular embodiments, receiver 140 may be referred to as a photoreceiver, optical receiver, optical sensor, detector, photodetector, or optical detector. In particular embodiments, lidar system 100 may include a receiver 140 that receives or detects at least a portion of input beam 135 and produces an electrical signal that corresponds to input beam 135. As an example, if input beam 135 includes an optical pulse, then receiver 140 may produce an electrical current or voltage pulse that corresponds to the optical pulse detected by receiver 140. As another example, receiver 140 may include one or more avalanche photodiodes (APDs) or one or more single-photon avalanche diodes (SPADs). As another example, receiver 140 may include one or more PN photodiodes (e.g., a photodiode structure formed by a p-type semiconductor and a n-type semiconductor) or one or more PIN photodiodes (e.g., a photodiode structure formed by an undoped intrinsic semiconductor region located between p-type and n-type regions). Receiver 140 may have an active region or an avalanche-multiplication region that includes silicon, germanium, or InGaAs. The active region of receiver 140 may have any suitable size, such as for example, a diameter or width of approximately 50-500 µm. In particular embodiments, receiver 140 may include circuitry that performs signal amplification, sampling, filtering, signal conditioning, analog-to-digital conversion, time-to-digital conversion, pulse detection, threshold detection, rising-edge detection, or falling-edge detection. As an example, receiver 140 may include a transimpedance amplifier that converts a received photocurrent (e.g., a current produced by an APD in response to a received optical signal) into a voltage signal. The voltage signal may be sent to pulse-detection circuitry that produces an analog or digital output signal 145 that corresponds to one or more characteristics (e.g., rising edge, falling edge, amplitude, or duration) of a received optical pulse. As an example, the pulse-detection circuitry may perform a time-to-digital conversion to produce a digital output signal 145. The electrical output signal 145 may be sent to controller 150 for processing or analysis (e.g., to determine a time-of-flight value corresponding to a received optical pulse).

In particular embodiments, controller 150 may be electrically coupled or communicatively coupled to light source 110, scanner 120, or receiver 140. As an example, controller 150 may receive electrical trigger pulses or edges from light source 110, where each pulse or edge corresponds to the emission of an optical pulse by light source 110. As another example, controller 150 may provide instructions, a control signal, or a trigger signal to light source 110 indicating when light source 110 should produce optical pulses. Controller 150 may send an electrical trigger signal that includes electrical pulses, where each electrical pulse results in the emission of an optical pulse by light source 110. In particular embodiments, the frequency, period, duration, pulse energy, peak power, average power, or wavelength of the optical pulses produced by light source 110 may be adjusted based on instructions, a control signal, or trigger pulses provided by controller 150. In particular embodiments, controller 150 may be coupled to light source 110 and receiver 140, and controller 150 may determine a time-of-flight value for an optical pulse based on timing information associated with when the pulse was emitted by light source 110 and when a portion of the pulse (e.g., input beam 135) was detected or received by receiver 140. In particular embodiments, controller 150 may include circuitry that performs signal amplification, sampling, filtering, signal conditioning, analog-to-digital conversion, time-to-digital conversion, pulse detection, threshold detection, rising-edge detection, or falling-edge detection.

In particular embodiments, a lidar system 100 may be used to determine the distance to one or more downrange targets 130. By scanning the lidar system 100 across a field of regard, the system can be used to map the distance to a number of points within the field of regard. Each of these depth-mapped points may be referred to as a pixel. A collection of pixels captured in succession (which may be referred to as a depth map, a point cloud, or a frame) may be rendered as an image or may be analyzed to identify or detect objects or to determine a shape or distance of objects within the FOR. As an example, a depth map may cover a field of regard that extends 60° horizontally and 15° vertically, and the depth map may include a frame of 100-2000 pixels in the horizontal direction by 4-400 pixels in the vertical direction.

In particular embodiments, lidar system 100 may be configured to repeatedly capture or generate point clouds of a field of regard at any suitable frame rate between approximately 0.1 frames per second (FPS) and approximately 1,000 FPS. As an example, lidar system 100 may generate point clouds at a frame rate of approximately 0.1 FPS, 0.5 FPS, 1 FPS, 2 FPS, 5 FPS, 10 FPS, 20 FPS, 100 FPS, 500 FPS, or 1,000 FPS. As another example, lidar system 100 may be configured to produce optical pulses at a rate of $5 \times 10^5$ pulses/second (e.g., the system may determine 500,000 pixel distances per second) and scan a frame of 1000×50 pixels (e.g., 50,000 pixels/frame), which corresponds to a point-cloud frame rate of 10 frames per second (e.g., 10 point clouds per second). In particular embodiments, a point-cloud frame rate may be substantially fixed, or a point-cloud frame rate may be dynamically adjustable. As an example, a lidar system 100 may capture one or more point clouds at a particular frame rate (e.g., 1 Hz) and then switch to capture one or more point clouds at a different frame rate (e.g., 10 Hz). A slower frame rate (e.g., 1 Hz) may be used to capture one or more high-resolution point clouds, and a faster frame rate (e.g., 10 Hz) may be used to rapidly capture multiple lower-resolution point clouds.

In particular embodiments, a lidar system 100 may be configured to sense, identify, or determine distances to one or more targets 130 within a field of regard. As an example, a lidar system 100 may determine a distance to a target 130, where all or part of the target 130 is contained within a field of regard of the lidar system 100. All or part of a target 130 being contained within a FOR of the lidar system 100 may refer to the FOR overlapping, encompassing, or enclosing at least a portion of the target 130. In particular embodiments, target 130 may include all or part of an object that is moving or stationary relative to lidar system 100. As an example, target 130 may include all or a portion of a person, vehicle, motorcycle, truck, train, bicycle, wheelchair, pedestrian, animal, road sign, traffic light, lane marking, road-surface marking, parking space, pylon, guard rail, traffic barrier, pothole, railroad crossing, obstacle in or near a road, curb, stopped vehicle on or beside a road, utility pole, house, building, trash can, mailbox, tree, any other suitable object, or any suitable combination of all or part of two or more objects.

In particular embodiments, one or more lidar systems 100 may be integrated into a vehicle. As an example, multiple lidar systems 100 may be integrated into a car to provide a complete 360-degree horizontal FOR around the car. As another example, 6-10 lidar systems 100, each system having a 45-degree to 90-degree horizontal FOR, may be combined together to form a sensing system that provides a point cloud covering a 360-degree horizontal FOR. The lidar systems 100 may be oriented so that adjacent FORs have an amount of spatial or angular overlap to allow data from the multiple lidar systems 100 to be combined or stitched together to form a single or continuous 360-degree point cloud. As an example, the FOR of each lidar system 100 may have approximately 1-15 degrees of overlap with an adjacent FOR. In particular embodiments, a vehicle may refer to a mobile machine configured to transport people or cargo. For example, a vehicle may include, may take the form of, or may be referred to as a car, automobile, motor vehicle, truck, bus, van, trailer, off-road vehicle, farm vehicle, lawn mower, construction equipment, golf cart, motorhome, taxi, motorcycle, scooter, bicycle, skateboard, train, snowmobile, watercraft (e.g., a ship or boat), aircraft (e.g., a fixed-wing aircraft, helicopter, or dirigible), or spacecraft. In particular embodiments, a vehicle may include an internal combustion engine or an electric motor that provides propulsion for the vehicle.

In particular embodiments, one or more lidar systems 100 may be included in a vehicle as part of an advanced driver assistance system (ADAS) to assist a driver of the vehicle in the driving process. For example, a lidar system 100 may be part of an ADAS that provides information or feedback to a driver (e.g., to alert the driver to potential problems or hazards) or that automatically takes control of part of a vehicle (e.g., a braking system or a steering system) to avoid collisions or accidents. A lidar system 100 may be part of a vehicle ADAS that provides adaptive cruise control, automated braking, automated parking, collision avoidance, alerts the driver to hazards or other vehicles, maintains the vehicle in the correct lane, or provides a warning if an object or another vehicle is in a blind spot.

In particular embodiments, one or more lidar systems 100 may be integrated into a vehicle as part of an autonomous-vehicle driving system. As an example, a lidar system 100 may provide information about the surrounding environment to a driving system of an autonomous vehicle. An autonomous-vehicle driving system may include one or more computing systems that receive information from a lidar system 100 about the surrounding environment, analyze the received information, and provide control signals to the vehicle's driving systems (e.g., steering wheel, accelerator, brake, or turn signal). As an example, a lidar system 100 integrated into an autonomous vehicle may provide an autonomous-vehicle driving system with a point cloud every 0.1 seconds (e.g., the point cloud has a 10 Hz update rate, representing 10 frames per second). The autonomous-vehicle driving system may analyze the received point clouds to sense or identify targets 130 and their respective locations, distances, or speeds, and the autonomous-vehicle driving system may update control signals based on this information. As an example, if lidar system 100 detects a vehicle ahead that is slowing down or stopping, the autonomous-vehicle driving system may send instructions to release the accelerator and apply the brakes.

In particular embodiments, an autonomous vehicle may be referred to as an autonomous car, driverless car, self-driving car, robotic car, or unmanned vehicle. In particular embodiments, an autonomous vehicle may refer to a vehicle configured to sense its environment and navigate or drive with little or no human input. As an example, an autonomous vehicle may be configured to drive to any suitable location and control or perform all safety-critical functions (e.g., driving, steering, braking, parking) for the entire trip, with the driver not expected to control the vehicle at any time. As another example, an autonomous vehicle may allow a driver to safely turn their attention away from driving tasks in particular environments (e.g., on freeways), or an autonomous vehicle may provide control of a vehicle in all but a few environments, requiring little or no input or attention from the driver.

In particular embodiments, an autonomous vehicle may be configured to drive with a driver present in the vehicle, or an autonomous vehicle may be configured to operate the vehicle with no driver present. As an example, an autonomous vehicle may include a driver's seat with associated controls (e.g., steering wheel, accelerator pedal, and brake pedal), and the vehicle may be configured to drive with no one seated in the driver's seat or with little or no input from a person seated in the driver's seat. As another example, an autonomous vehicle may not include any driver's seat or associated driver's controls, and the vehicle may perform substantially all driving functions (e.g., driving, steering, braking, parking, and navigating) without human input. As another example, an autonomous vehicle may be configured to operate without a driver (e.g., the vehicle may be configured to transport human passengers or cargo without a driver present in the vehicle). As another example, an autonomous vehicle may be configured to operate without any human passengers (e.g., the vehicle may be configured for transportation of cargo without having any human passengers onboard the vehicle).

Figure 2:
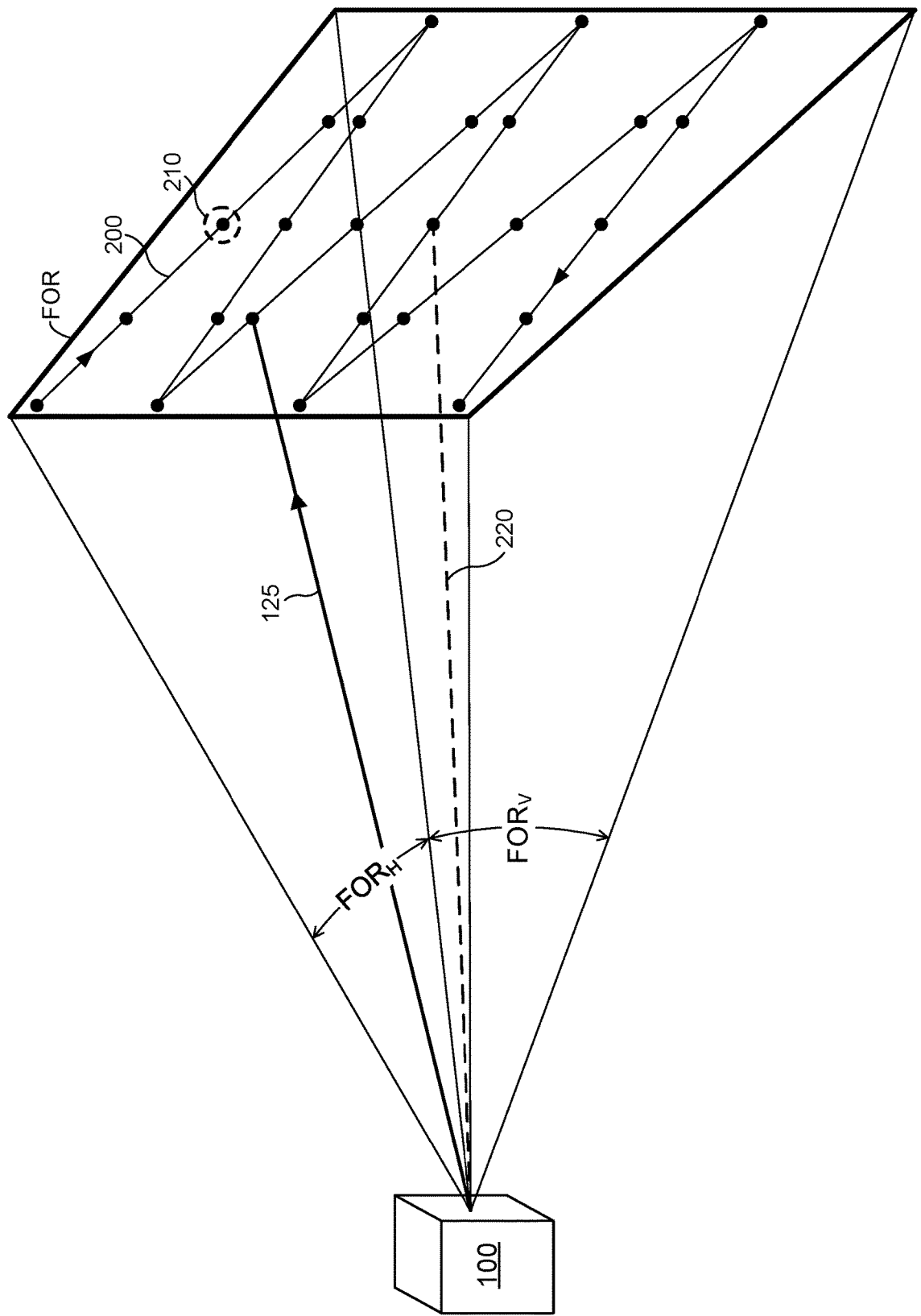
FIG. 2 illustrates an example scan pattern produced by a lidar system.

FIG. 2 illustrates an example scan pattern 200 produced by a lidar system 100. In particular embodiments, a lidar system 100 may be configured to scan output optical beam 125 along one or more particular scan patterns 200. In particular embodiments, a scan pattern 200 may scan across any suitable field of regard (FOR) having any suitable horizontal FOR ($FOR_H$) and any suitable vertical FOR ($FOR_V$). For example, a scan pattern 200 may have a field of regard represented by angular dimensions (e.g., $FOR_H \times FOR_V$) 40°×30°, 90°×40°, or 60°×15°. As another example, a scan pattern 200 may have a $FOR_H$ greater than or equal to 10°, 25°, 30°, 40°, 60°, 90°, or 120°. As another example, a scan pattern 200 may have a $FOR_V$ greater than or equal to 2°, 5°, 10°, 15°, 20°, 30°, or 45°. In the example of FIG. 2, reference line 220 represents a center of the field of regard of scan pattern 200. In particular embodiments, reference line 220 may have any suitable orientation, such as for example, a horizontal angle of 0° (e.g., reference line 220 may be oriented straight ahead) and a vertical angle of 0° (e.g., reference line 220 may have an inclination of 0°), or reference line 220 may have a nonzero horizontal angle or a nonzero inclination (e.g., a vertical angle of +10° or −10°). In FIG. 2, if the scan pattern 200 has a 60°×15° field of regard, then scan pattern 200 covers a ±30° horizontal range with respect to reference line 220 and a ±7.5° vertical range with respect to reference line 220. Additionally, optical beam 125 in FIG. 2 has an orientation of approximately −15° horizontal and +3° vertical with respect to reference line 220. Optical beam 125 may be referred to as having an azimuth of −15° and an altitude of +3° relative to reference line 220. In particular embodiments, an azimuth (which may be referred to as an azimuth angle) may represent a horizontal angle with respect to reference line 220, and an altitude (which may be referred to as an altitude angle, elevation, or elevation angle) may represent a vertical angle with respect to reference line 220.

In particular embodiments, a scan pattern 200 may include multiple pixels 210, and each pixel 210 may be associated with one or more laser pulses and one or more corresponding distance measurements. In particular embodiments, a cycle of scan pattern 200 may include a total of $P_x \times P_y$ pixels 210 (e.g., a two-dimensional distribution of $P_x$ by $P_y$ pixels). As an example, scan pattern 200 may include a distribution with dimensions of approximately 100-2,000 pixels 210 along a horizontal direction and approximately 4-400 pixels 210 along a vertical direction. As another example, scan pattern 200 may include a distribution of 1,000 pixels 210 along the horizontal direction by 64 pixels 210 along the vertical direction (e.g., the frame size is 1000×64 pixels) for a total of 64,000 pixels per cycle of scan pattern 200. In particular embodiments, the number of pixels 210 along a horizontal direction may be referred to as a horizontal resolution of scan pattern 200, and the number of pixels 210 along a vertical direction may be referred to as a vertical resolution. As an example, scan pattern 200 may have a horizontal resolution of greater than or equal to 100 pixels 210 and a vertical resolution of greater than or equal to 4 pixels 210. As another example, scan pattern 200 may have a horizontal resolution of 100-2,000 pixels 210 and a vertical resolution of 4-400 pixels 210.

In particular embodiments, each pixel 210 may be associated with a distance (e.g., a distance to a portion of a target 130 from which an associated laser pulse was scattered) or one or more angular values. As an example, a pixel 210 may be associated with a distance value and two angular values (e.g., an azimuth and altitude) that represent the angular location of the pixel 210 with respect to the lidar system 100. A distance to a portion of target 130 may be determined based at least in part on a time-of-flight measurement for a corresponding pulse. An angular value (e.g., an azimuth or altitude) may correspond to an angle (e.g., relative to reference line 220) of output beam 125 (e.g., when a corresponding pulse is emitted from lidar system 100) or an angle of input beam 135 (e.g., when an input signal is received by lidar system 100). In particular embodiments, an angular value may be determined based at least in part on a position of a component of scanner 120. As an example, an azimuth or altitude value associated with a pixel 210 may be determined from an angular position of one or more corresponding scanning mirrors of scanner 120.

Figure 3:
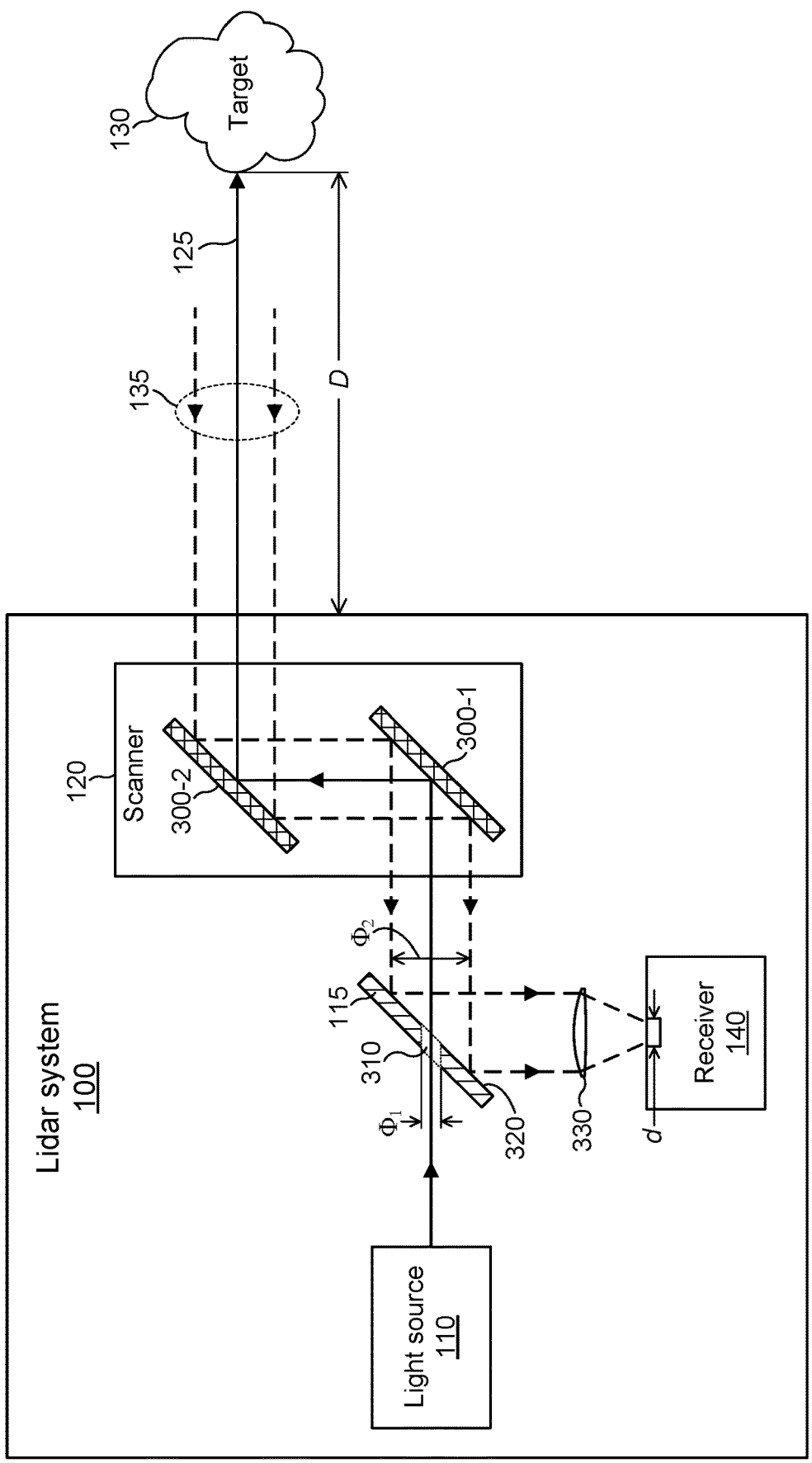
FIG. 3 illustrates an example lidar system with an example overlap mirror.

FIG. 3 illustrates an example lidar system 100 with an example overlap mirror 115. In particular embodiments, a lidar system 100 may include a light source 110 configured to emit pulses of light and a scanner 120 configured to scan at least a portion of the emitted pulses of light across a field of regard. As an example, the light source 110 may include a pulsed solid-state laser or a pulsed fiber laser, and the optical pulses produced by the light source 110 may be directed through aperture 310 of overlap mirror 115 and then coupled to scanner 120. In particular embodiments, a lidar system 100 may include a receiver 140 configured to detect at least a portion of the scanned pulses of light scattered by a target 130 located a distance D from the lidar system 100. As an example, one or more pulses of light that are directed downrange from lidar system 100 by scanner 120 (e.g., as part of output beam 125) may scatter off a target 130, and a portion of the scattered light may propagate back to the lidar system 100 (e.g., as part of input beam 135) and be detected by receiver 140.

In particular embodiments, lidar system 100 may include one or more processors (e.g., controller 150) configured to determine a distance D from the lidar system 100 to a target 130 based at least in part on a round-trip time of flight for an emitted pulse of light to travel from the lidar system 100 to the target 130 and back to the lidar system 100. The target 130 may be at least partially contained within a field of regard of the lidar system 100 and located a distance D from the lidar system 100 that is less than or equal to a maximum range $R_{MAX}$ of the lidar system 100. In particular embodiments, a maximum range (which may be referred to as a maximum distance) of a lidar system 100 may refer to the maximum distance over which the lidar system 100 is configured to sense or identify targets 130 that appear in a field of regard of the lidar system 100. The maximum range of lidar system 100 may be any suitable distance, such as for example, 25 m, 50 m, 100 m, 200 m, 500 m, or 1 km. As an example, a lidar system 100 with a 200-m maximum range may be configured to sense or identify various targets 130 located up to 200 m away from the lidar system 100. For a lidar system 100 with a 200-m maximum range ($R_{MAX}$=200 m), the time of flight corresponding to the maximum range is approximately $2 \cdot R_{MAX}/c \cong 1.33$ μs.

In particular embodiments, light source 110, scanner 120, and receiver 140 may be packaged together within a single housing, where a housing may refer to a box, case, or enclosure that holds or contains all or part of a lidar system 100. As an example, a lidar-system enclosure may contain a light source 110, overlap mirror 115, scanner 120, and receiver 140 of a lidar system 100. Additionally, the lidar-system enclosure may include a controller 150, or a controller 150 may be located remotely from the enclosure. The lidar-system enclosure may also include one or more electrical connections for conveying electrical power or electrical signals to or from the enclosure.

In particular embodiments, light source 110 may include an eye-safe laser. An eye-safe laser may refer to a laser with an emission wavelength, average power, peak power, peak intensity, pulse energy, beam size, beam divergence, or exposure time such that emitted light from the laser presents little or no possibility of causing damage to a person's eyes. As an example, light source 110 may be classified as a Class 1 laser product (as specified by the 60825-1 standard of the International Electrotechnical Commission (IEC)) or a Class I laser product (as specified by Title 21, Section 1040.10 of the United States Code of Federal Regulations (CFR)) that is safe under all conditions of normal use. In particular embodiments, light source 110 may include an eye-safe laser (e.g., a Class 1 or a Class I laser) configured to operate at any suitable wavelength between approximately 1400 nm and approximately 2100 nm. As an example, light source 110 may include an eye-safe laser with an operating wavelength between approximately 1400 nm and approximately 1600 nm. As another example, light source 110 may include an eye-safe laser with an operating wavelength between approximately 1530 nm and approximately 1560 nm. As another example, light source 110 may include an eye-safe fiber laser or solid-state laser with an operating wavelength between approximately 1400 nm and approximately 1600 nm.

In particular embodiments, scanner 120 may include one or more mirrors, where each mirror is mechanically driven by a galvanometer scanner, a resonant scanner, a MEMS device, a voice coil motor, or any suitable combination thereof. A galvanometer scanner (which may be referred to as a galvanometer actuator) may include a galvanometer-based scanning motor with a magnet and coil. When an electrical current is supplied to the coil, a rotational force is applied to the magnet, which causes a mirror attached to the galvanometer scanner to rotate. The electrical current supplied to the coil may be controlled to dynamically change the position of the galvanometer mirror. A resonant scanner (which may be referred to as a resonant actuator) may include a spring-like mechanism driven by an actuator to produce a periodic oscillation at a substantially fixed frequency (e.g., 1 kHz). A MEMS-based scanning device may include a mirror with a diameter between approximately 1 and 10 mm, where the mirror is rotated using electromagnetic or electrostatic actuation. A voice coil motor (which may be referred to as a voice coil actuator) may include a magnet and coil. When an electrical current is supplied to the coil, a translational force is applied to the magnet, which causes a mirror attached to the magnet to move or rotate.

In particular embodiments, a scanner 120 may include any suitable number of mirrors driven by any suitable number of mechanical actuators. As an example, a scanner 120 may include a single mirror configured to scan an output beam 125 along a single direction (e.g., a scanner 120 may be a one-dimensional scanner that scans along a horizontal or vertical direction). The mirror may be driven by one actuator (e.g., a galvanometer) or two actuators configured to drive the mirror in a push-pull configuration. As another example, a scanner 120 may include a single mirror that scans an output beam 125 along two directions (e.g., horizontal and vertical). The mirror may be driven by two actuators, where each actuator provides rotational motion along a particular direction or about a particular axis. As another example, a scanner 120 may include two mirrors, where one mirror scans an output beam 125 along a substantially horizontal direction and the other mirror scans the output beam 125 along a substantially vertical direction. In the example of FIG. 3, scanner 120 includes two mirrors, mirror 300-1 and mirror 300-2. Mirror 300-1 may scan output beam 125 along a substantially horizontal direction, and mirror 300-2 may scan the output beam 125 along a substantially vertical direction (or vice versa).

In particular embodiments, a scanner 120 may include two mirrors, where each mirror is driven by a corresponding galvanometer scanner. As an example, scanner 120 may include a galvanometer actuator that scans mirror 300-1 along a first direction (e.g., vertical), and scanner 120 may include another galvanometer actuator that scans mirror 300-2 along a second direction (e.g., horizontal). In particular embodiments, a scanner 120 may include two mirrors, where one mirror is driven by a galvanometer actuator and the other mirror is driven by a resonant actuator. As an example, a galvanometer actuator may scan mirror 300-1 along a first direction, and a resonant actuator may scan mirror 300-2 along a second direction. The first and second scanning directions may be substantially orthogonal to one another. As an example, the first direction may be substantially vertical, and the second direction may be substantially horizontal, or vice versa. In particular embodiments, a scanner 120 may include one mirror driven by two actuators which are configured to scan the mirror along two substantially orthogonal directions. As an example, one mirror may be driven along a substantially horizontal direction by a resonant actuator or a galvanometer actuator, and the mirror may also be driven along a substantially vertical direction by a galvanometer actuator. As another example, a mirror may be driven along two substantially orthogonal directions by two resonant actuators.

In particular embodiments, a scanner 120 may include a mirror configured to be scanned along one direction by two actuators arranged in a push-pull configuration. Driving a mirror in a push-pull configuration may refer to a mirror that is driven in one direction by two actuators. The two actuators may be located at opposite ends or sides of the mirror, and the actuators may be driven in a cooperative manner so that when one actuator pushes on the mirror, the other actuator pulls on the mirror, and vice versa. As an example, a mirror may be driven along a horizontal or vertical direction by two voice coil actuators arranged in a push-pull configuration. In particular embodiments, a scanner 120 may include one mirror configured to be scanned along two axes, where motion along each axis is provided by two actuators arranged in a push-pull configuration. As an example, a mirror may be driven along a horizontal direction by two resonant actuators arranged in a horizontal push-pull configuration, and the mirror may be driven along a vertical direction by another two resonant actuators arranged in a vertical push-pull configuration.

In particular embodiments, a scanner 120 may include two mirrors which are driven synchronously so that the output beam 125 is directed along any suitable scan pattern 200. As an example, a galvanometer actuator may drive mirror 300-2 with a substantially linear back-and-forth motion (e.g., the galvanometer may be driven with a substantially sinusoidal or triangle-shaped waveform) that causes output beam 125 to trace a substantially horizontal back-and-forth pattern. Additionally, another galvanometer actuator may scan mirror 300-1 along a substantially vertical direction. For example, the two galvanometers may be synchronized so that for every 64 horizontal traces, the output beam 125 makes a single trace along a vertical direction. As another example, a resonant actuator may drive mirror 300-2 along a substantially horizontal direction, and a galvanometer actuator or a resonant actuator may scan mirror 300-1 along a substantially vertical direction.

In particular embodiments, a scanner 120 may include one mirror driven by two or more actuators, where the actuators are driven synchronously so that the output beam 125 is directed along a particular scan pattern 200. As an example, one mirror may be driven synchronously along two substantially orthogonal directions so that the output beam 125 follows a scan pattern 200 that includes substantially straight lines. In particular embodiments, a scanner 120 may include two mirrors driven synchronously so that the synchronously driven mirrors trace out a scan pattern 200 that includes substantially straight lines. As an example, the scan pattern 200 may include a series of substantially straight lines directed substantially horizontally, vertically, or along any other suitable direction. The straight lines may be achieved by applying a dynamically adjusted deflection along a vertical direction (e.g., with a galvanometer actuator) as an output beam 125 is scanned along a substantially horizontal direction (e.g., with a galvanometer or resonant actuator). If a vertical deflection is not applied, the output beam 125 may trace out a curved path as it scans from side to side. By applying a vertical deflection as the mirror is scanned horizontally, a scan pattern 200 that includes substantially straight lines may be achieved. In particular embodiments, a vertical actuator may be used to apply both a dynamically adjusted vertical deflection as the output beam 125 is scanned horizontally as well as a discrete vertical offset between each horizontal scan (e.g., to step the output beam 125 to a subsequent row of a scan pattern 200).

In the example of FIG. 3, lidar system 100 produces an output beam 125 and receives light from an input beam 135. The output beam 125, which includes at least a portion of the pulses of light emitted by light source 110, may be scanned across a field of regard. The input beam 135 may include at least a portion of the scanned pulses of light which are scattered by one or more targets 130 and detected by receiver 140. In particular embodiments, output beam 125 and input beam 135 may be substantially coaxial. The input and output beams being substantially coaxial may refer to the beams being at least partially overlapped or sharing a common propagation axis so that input beam 135 and output beam 125 travel along substantially the same optical path (albeit in opposite directions). As output beam 125 is scanned across a field of regard, the input beam 135 may follow along with the output beam 125 so that the coaxial relationship between the two beams is maintained.

In particular embodiments, a lidar system 100 may include an overlap mirror 115 configured to overlap the input beam 135 and output beam 125 so that they are substantially coaxial. In FIG. 3, the overlap mirror 115 includes a hole, slot, or aperture 310 which the output beam 125 passes through and a reflecting surface 320 that reflects at least a portion of the input beam 135 toward the receiver 140. The overlap mirror 115 may be oriented so that input beam 135 and output beam 125 are at least partially overlapped. In particular embodiments, input beam 135 may pass through a lens 330 which focuses the beam onto an active region of the receiver 140. The active region may refer to an area over which receiver 140 may receive or detect input light. The active region may have any suitable size or diameter d, such as for example, a diameter of approximately 25 µm, 50 µm, 80 µm, 100 µm, 200 µm, 500 µm, 1 mm, 2 mm, or 5 mm. In particular embodiments, overlap mirror 115 may have a reflecting surface 320 that is substantially flat or the reflecting surface 320 may be curved (e.g., mirror 115 may be an off-axis parabolic mirror configured to focus the input beam 135 onto an active region of the receiver 140).

In particular embodiments, aperture 310 may have any suitable size or diameter $\Phi_1$, and input beam 135 may have any suitable size or diameter $\Phi_2$, where $\Phi_2$ is greater than $\Phi_1$. As an example, aperture 310 may have a diameter $\Phi_1$ of approximately 0.2 mm, 0.5 mm, 1 mm, 2 mm, 3 mm, 5 mm, or 10 mm, and input beam 135 may have a diameter $\Phi_2$ of approximately 2 mm, 5 mm, 10 mm, 15 mm, 20 mm, 30 mm, 40 mm, or 50 mm. In particular embodiments, reflective surface 320 of overlap mirror 115 may reflect greater than or equal to 70% of input beam 135 toward the receiver 140. As an example, if reflective surface 320 has a reflectivity R at an operating wavelength of the light source 110, then the fraction of input beam 135 directed toward the receiver 140 may be expressed as $R \times [-(\Phi_1/\Phi_2)^2]$. For example, if R is 95%, $\Phi_1$ is 2 mm, and $\Phi_2$ is 10 mm, then approximately 91% of input beam 135 may be directed toward the receiver 140 by reflective surface 320.

Figure 4:
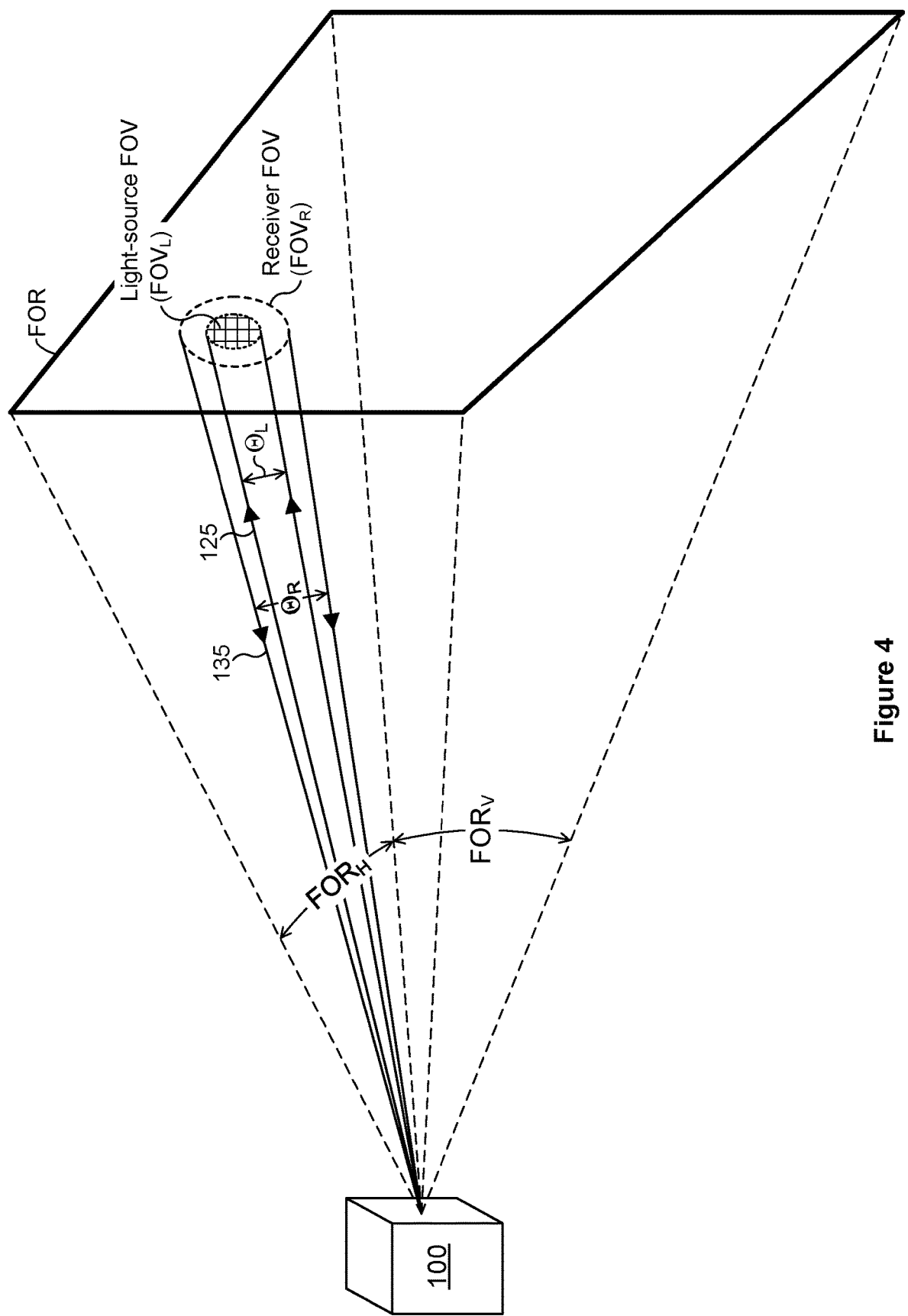
FIG. 4 illustrates an example light-source field of view and receiver field of view for a lidar system.

FIG. 4 illustrates an example light-source field of view ($FOV_L$) and receiver field of view ($FOV_R$) for a lidar system 100. A light source 110 of lidar system 100 may emit pulses of light as the $FOV_L$ and $FOV_R$ are scanned by scanner 120 across a field of regard (FOR). In particular embodiments, a light-source field of view may refer to an angular cone illuminated by the light source 110 at a particular instant of time. Similarly, a receiver field of view may refer to an angular cone over which the receiver 140 may receive or detect light at a particular instant of time, and any light outside the receiver field of view may not be received or detected. As an example, as the light-source field of view is scanned across a field of regard, a portion of a pulse of light emitted by the light source 110 may be sent downrange from lidar system 100, and the pulse of light may be sent in the direction that the $FOV_L$ is pointing at the time the pulse is emitted. The pulse of light may scatter off a target 130, and the receiver 140 may receive and detect a portion of the scattered light that is directed along or contained within the $FOV_R$.

In particular embodiments, scanner 120 may be configured to scan both a light-source field of view and a receiver field of view across a field of regard of the lidar system 100. Multiple pulses of light may be emitted and detected as the scanner 120 scans the $FOV_L$ and $FOV_R$ across the field of regard of the lidar system 100 while tracing out a scan pattern 200. In particular embodiments, the light-source field of view and the receiver field of view may be scanned synchronously with respect to one another, so that as the $FOV_L$ is scanned across a scan pattern 200, the $FOV_R$ follows substantially the same path at the same scanning speed. Additionally, the $FOV_L$ and $FOV_R$ may maintain the same relative position to one another as they are scanned across the field of regard. As an example, the $FOV_L$ may be substantially overlapped with or centered inside the $FOV_R$ (as illustrated in FIG. 4), and this relative positioning between $FOV_L$ and $FOV_R$ may be maintained throughout a scan. As another example, the $FOV_R$ may lag behind the $FOV_L$ by a particular, fixed amount throughout a scan (e.g., the $FOV_R$ may be offset from the $FOV_L$ in a direction opposite the scan direction).

In particular embodiments, the $FOV_L$ may have an angular size or extent $\Theta_L$ that is substantially the same as or that corresponds to the divergence of the output beam 125, and the $FOV_R$ may have an angular size or extent $\Theta_R$ that corresponds to an angle over which the receiver 140 may receive and detect light. In particular embodiments, the receiver field of view may be any suitable size relative to the light-source field of view. As an example, the receiver field of view may be smaller than, substantially the same size as, or larger than the angular extent of the light-source field of view. In particular embodiments, the light-source field of view may have an angular extent of less than or equal to 50 milliradians, and the receiver field of view may have an angular extent of less than or equal to 50 milliradians. The $FOV_L$ may have any suitable angular extent $\Theta_L$, such as for example, approximately 0.1 mrad, 0.2 mrad, 0.5 mrad, 1 mrad, 1.5 mrad, 2 mrad, 3 mrad, 5 mrad, 10 mrad, 20 mrad, 40 mrad, or 50 mrad. Similarly, the $FOV_R$ may have any suitable angular extent $\Theta_R$, such as for example, approximately 0.1 mrad, 0.2 mrad, 0.5 mrad, 1 mrad, 1.5 mrad, 2 mrad, 3 mrad, 5 mrad, 10 mrad, 20 mrad, 40 mrad, or 50 mrad. In particular embodiments, the light-source field of view and the receiver field of view may have approximately equal angular extents. As an example, $\Theta_L$ and $\Theta_R$ may both be approximately equal to 1 mrad, 2 mrad, or 3 mrad. In particular embodiments, the receiver field of view may be larger than the light-source field of view, or the light-source field of view may be larger than the receiver field of view. As an example, $\Theta_L$ may be approximately equal to 1.5 mrad, and $\Theta_R$ may be approximately equal to 3 mrad.

In particular embodiments, a pixel 210 may represent or may correspond to a light-source field of view. As the output beam 125 propagates from the light source 110, the diameter of the output beam 125 (as well as the size of the corresponding pixel 210) may increase according to the beam divergence $\Theta_L$. As an example, if the output beam 125 has a $\Theta_L$ of 2 mrad, then at a distance of 100 m from the lidar system 100, the output beam 125 may have a size or diameter of approximately 20 cm, and a corresponding pixel 210 may also have a corresponding size or diameter of approximately 20 cm. At a distance of 200 m from the lidar system 100, the output beam 125 and the corresponding pixel 210 may each have a diameter of approximately 40 cm.

Figure 5:
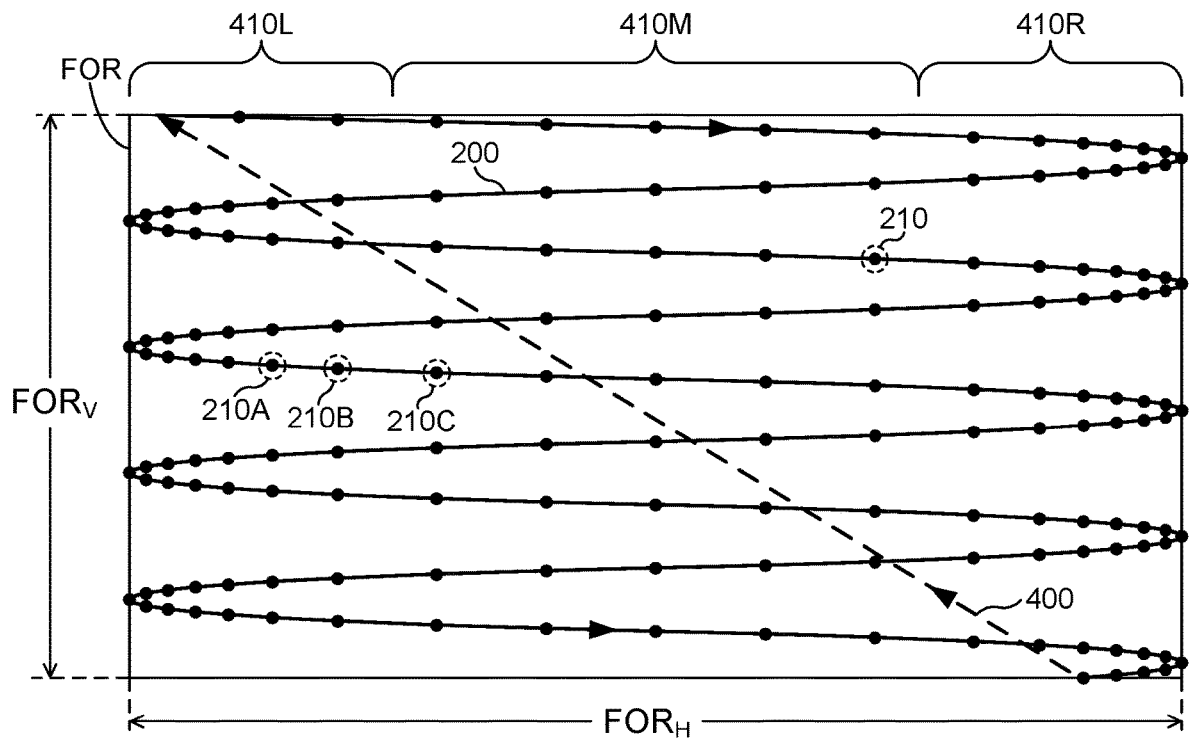
FIG. 5 illustrates an example sinusoidal scan pattern.

FIG. 5 illustrates an example sinusoidal scan pattern 200. In particular embodiments, a scan pattern 200 may be a closed or continuous scan pattern 200 that continually scans without performing a retrace operation, or a scan pattern 200 may be an open scan pattern 200 that includes a retrace. A retrace operation may occur when scanner 120 resets from an end point of a scan 200 back to a starting point of the scan 200. In particular embodiments, lidar system 100 may not send out pulses or acquire distance data during a retrace, or lidar system 100 may acquire distance data during a retrace (e.g., a retrace path may include one or more pixels 210). In the example of FIG. 5, scan pattern 200 includes retrace 400 represented by a dashed diagonal line that connects the end of scan pattern 200 to the beginning.

In particular embodiments, the pixels 210 of a scan pattern 200 may be substantially evenly spaced with respect to time or angle. As an example, each pixel 210 (and its associated pulse) may be separated from an immediately preceding or following pixel 210 by any suitable time interval, such as for example a time interval of approximately 0.5 µs, 1.0 µs, 1.4 µs, or 2.0 µs. In FIG. 5, pixels 210A, 210B, and 210C may be associated with pulses that were emitted with a 1.6 µs fixed time interval between the pulses. As another example, each pixel 210 (and its associated pulse) may be separated from an immediately preceding or following pixel 210 by any suitable angle, such as for example an angle of approximately 0.01°, 0.02°, 0.05°, 0.1°, 0.2°, 0.3°, or 0.5°. In FIG. 5, pixels 210A and 210B may have an angular separation of approximately 0.1° (e.g., pixels 210A and 210B may each be associated with optical beams separated by an angle of 0.1°). In particular embodiments, the pixels 210 of a scan pattern 200 may have an adjustable spacing with respect to time or angle. As an example, a time interval or angle separating two successive pixels 210 may be dynamically varied during a scan or from one scan to a subsequent scan.

In particular embodiments, lidar system 100 may include a scanner 120 configured to direct output 125 along any suitable scan pattern 200. As an example, all or part of scan pattern 200 may follow a substantially sinusoidal path, triangle-wave path, square-wave path, sawtooth path, piecewise linear path, periodic-function path, or any other suitable path or combination of paths. In the example of FIG. 5, scan pattern 200 corresponds to an approximately sinusoidal path, where pixels 210 are arranged along a sinusoidal curve. In particular embodiments, scan pattern 200 may include any suitable integral number of cycles of a particular periodic function (e.g., 1, 2, 5, 10, 20, 50, or 100 cycles) or any suitable non-integral number of cycles (e.g., 9.7, 13.33, or 53.5 cycles). In FIG. 5, scan pattern 200 includes just over four periods or cycles of a sinusoidal function. In particular embodiments, scan pattern 200 may include a periodic function having any suitable alignment or orientation, such as for example, horizontal, vertical, oriented at 33 degrees, or oriented along a 45-degree axis. In the example of FIG. 5, scan pattern 200 is a sinusoidal curve oriented horizontally where the peaks and valleys of the sinusoidal curve are aligned substantially horizontally.

In particular embodiments, pixels 210 may be substantially evenly distributed across scan pattern 200, or pixels 210 may have a distribution or density that varies across a FOR of scan pattern 200. In the example of FIG. 5, pixels 210 have a greater density toward the left edge 410L and right edge 410R of scan 200, and the pixel density in the middle region 410M of scan 200 is lower compared to the edges. As an example, pixels 210 may be distributed so that ≥40% of the pixels 210 are located in the left 25% of the FOR of scan pattern 200 (e.g., region 410L), ≥40% of the pixels 210 are located in the right 25% of the FOR (e.g., region 410R), and the remaining <20% of the pixels 210 are located in the middle 50% of the FOR (e.g., region 410M). In particular embodiments, a time interval or angle between pixels 210 may be dynamically adjusted during a scan so that a scan pattern 200 has a particular distribution of pixels 210 (e.g., a higher density of pixels 210 in one or more particular regions). As an example, the scan pattern 200 may be configured to have a higher density of pixels 210 in a middle or central region of scan 200 or toward one or more edges of scan 200 (e.g., a middle region or a left, right, upper, or lower edge that includes approximately 5%, 10%, 20%, 30%, or any other suitable percentage of the FOR of scan pattern 200). For example, pixels 210 may be distributed so that ≥40% of the pixels 210 are locate in a central, left, or right region of scan pattern 200 with the remaining <60% of the pixels 210 distributed throughout the rest of scan pattern 200. As another example, a scan pattern 200 may have a higher density of pixels along a right edge of the scan pattern 200 than along a left edge of the scan pattern 200.

In particular embodiments, a distribution of pixels 210 in a scan pattern 200 may be determined, at least in part, by a pulse period of light source 110, a scanning speed provided by scanner 120, or a shape or path followed by scan pattern 200. As an example, the pulse period of light source 110 may be a substantially fixed value, or the pulse period may be adjusted dynamically during a scan to vary the density of pixels 210 across the scan region. As another example, an angular speed with which the scanner 120 rotates may be substantially fixed or may vary during a scan. As another example, a scan pattern 200 may provide for a varying distribution of pixels 210 based on the shape of the pattern. For example, a triangle-wave scan pattern 200 (combined with a substantially constant pulse period and angular speed) may provide a substantially uniform distribution of pixels 210 along the horizontal direction, while a sinusoidal scan pattern 200 may result in a higher density of pixels 210 along the left edge 410L and right edge 410R and a lower density of pixels 210 in the middle region 410M. Additionally, two or more scan parameters may be selected or adjusted to optimize or adjust the density of pixels 210 in a scan pattern 200. As an example, a sinusoidal scan pattern 200 may be combined with a dynamically adjusted pulse period of light source 100 to provide for a higher density of pixels 210 along the right edge 410R and a lower density of pixels 210 in the middle region 410M and left edge 410L.

In particular embodiments, a particular scan pattern 200 may be repeated from one scan to the next, or one or more parameters of a scan pattern 200 may be adjusted or varied from one scan to another. As an example, a time interval or angle between pixels 210 may be varied from one scan to another scan. A relatively long time interval may be applied in an initial scan to produce a moderate-density point cloud, and a relatively short time interval may be applied in a subsequent scan to produce a high-density point cloud. As another example, a time interval or angle between pixels 210 may be varied within a particular scan pattern 200. For a particular region of a scan pattern 200, a time interval may be decreased to produce a higher density of pixels 210 within that particular region.

Figure 6:
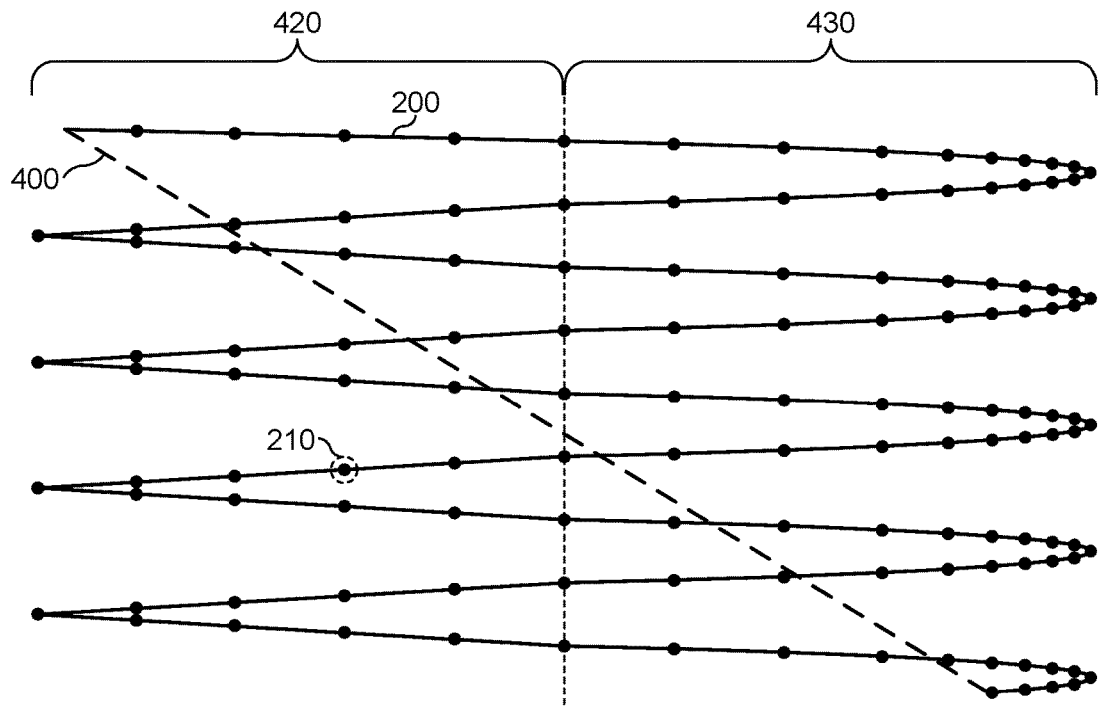
FIG. 6 illustrates an example hybrid scan pattern.

FIG. 6 illustrates an example hybrid scan pattern 200. In particular embodiments, a hybrid scan pattern 200 may be formed by combining portions of two or more scan patterns into a single scan pattern. As an example, a hybrid scan pattern 200 may include any suitable combination of two or more shapes or patterns, such as for example, a sinusoidal shape, triangle-wave shape, square-wave shape, sawtooth shape, circular shape, piecewise linear shape, spiral shape, or any suitable arbitrary shape. In the example of FIG. 6, hybrid scan pattern 200 is a combination of a substantially triangle-wave shape (region 420) and a substantially sinusoidal shape (region 430). The triangle-wave shape in region 420 is formed by straight-line segments, and the sinusoidal shape in region 430 is formed by half-sinusoidal shapes joined to the straight-line segments. In particular embodiments, each particular shape or pattern of a hybrid scan pattern 200 may cover any suitable portion of a scan FOR. As an example, a straight-line region 420 may cover 40%, 60%, or 80% of a FOR, and a sinusoidal region 430 may cover the remaining 60%, 40%, or 20%, respectively, of the FOR. In the example of FIG. 6, straight-line region 420 covers the left 50% of the FOR of scan pattern 200, and sinusoidal region 430 covers the right 50% of the FOR.

In particular embodiments, pixels 210 for a hybrid scan pattern 200 may be distributed along the scan pattern 200 in any suitable uniform or nonuniform manner. In the example of FIG. 6, the pixels 210 in the triangle-wave portion 420 and on the left side of the sinusoidal portion 430 have a relatively low-density distribution, and the pixels 210 on the right side of the sinusoidal portion 430 have a relatively high-density distribution. The hybrid scan pattern 200 of FIG. 6 may be used to scan a region where the pixels 210 on the right side of the scan pattern 200 are more important or have a higher relevance than the pixels 210 in the middle or on the left side. As an example, a hybrid scan pattern 200 may be configured so that a particular region (e.g., approximately 10%, 20%, or 30% of the area on the right side of the FOR) includes ≥50% of the pixels 210 and the rest of the scan region (e.g., the remaining 90%, 80%, or 70%, respectively, of the FOR) includes the remaining <50% of the pixels 210.

Figure 7:
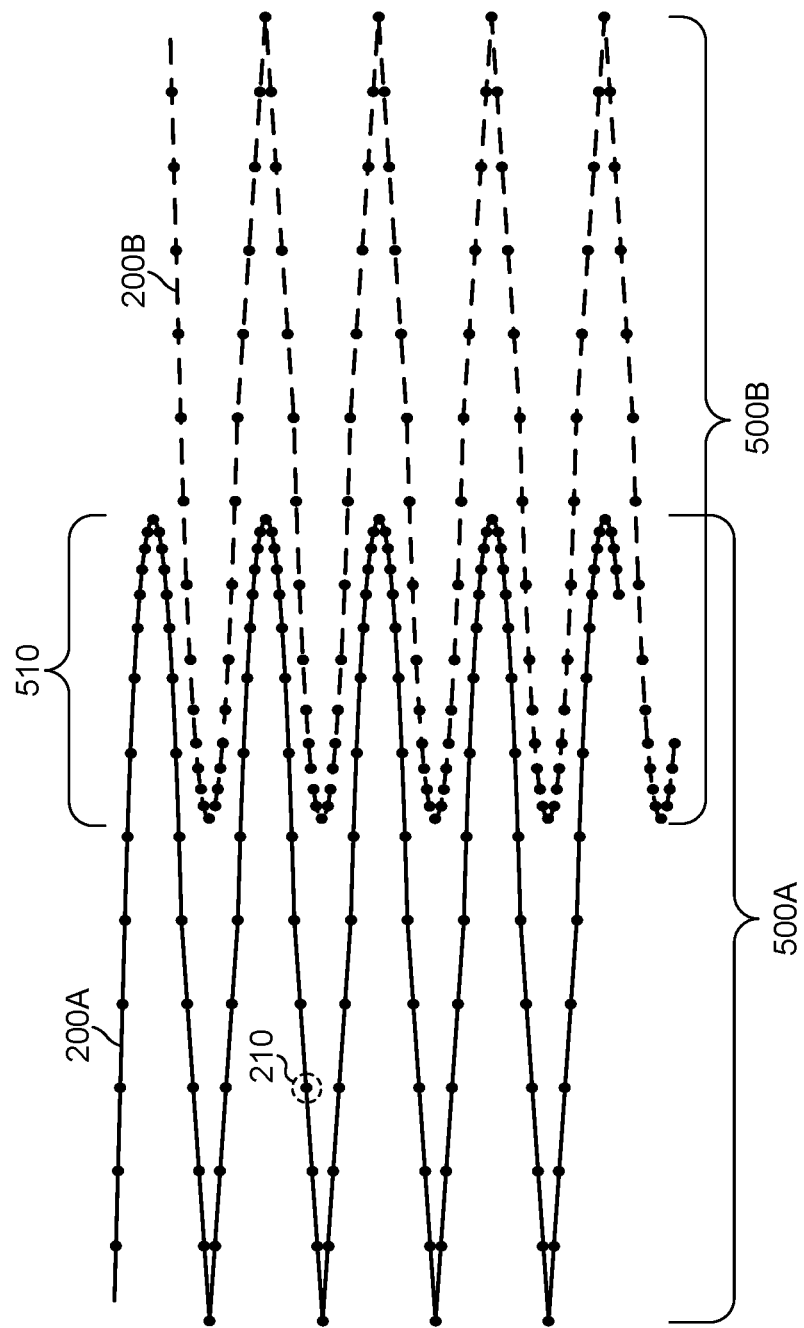
FIG. 7 illustrates two example overlapping scan patterns.

FIG. 7 illustrates two example overlapping scan patterns 200A and 200B. In the example of FIG. 7, scan pattern 200A is configured to scan across scan region 500A, and scan pattern 200B is configured to scan across scan region 500B. As an example, scan patterns 200A and 200B may each cover a 60°×15° FOR. In particular embodiments, two or more scan patterns 200 (where each scan pattern is associated with a particular lidar system 100) may be configured to scan across two or more respective regions that are at least partially overlapping. As an example, three overlapping scan patterns 200 may be located adjacent to one another (e.g., a first scan region may overlap with a second scan region, and the second scan region may also overlap with a third scan region). In the example of FIG. 7, the right portion of scan region 500A overlaps the left portion of scan region 500B, and scan patterns 200A and 200B overlap in middle region 510. In particular embodiments, overlapping scan patterns 200A and 200B may each include any suitable type of scan pattern having any suitable FOR. In FIG. 7, scan pattern 200A corresponds to hybrid scan pattern 200 in FIG. 6, and scan pattern 200B corresponds to a reversed version of scan pattern 200A (e.g., with respect to scan pattern 200A, scan pattern 200B is flipped about a vertical axis). Scan pattern 200A has a relatively high density of pixels 210 on the right side of its FOR, and scan pattern 200B has a relatively high density of pixels 210 on the left side of its FOR. In the example of FIG. 7, a retrace path 400 is not included for clarity of visualizing the details of the scan patterns 200A and 200B. A scan pattern 200 illustrated in other figures described herein may not include a retrace path 400, even though in practice the scan pattern 200 may operate with a retrace path 400 that connects the end of the scan pattern 200 to its beginning.

In particular embodiments, two scan patterns 200 may be configured to overlap in an overlap region 510 where the overlap region 510 has a higher density of pixels 210 than the portions of the scan patterns 200 located outside the overlap region. As an example, an overlap region 510 may include approximately 1%, 5%, 10%, 20%, 30%, or any other suitable portion of scan region 500A and scan region 500B. As another example, an overlap region 510 may include approximately 1°, 10°, 20°, or any other suitable angular portion of scan region 500A and 500B. If scan regions 500A and 500B each have a 60° $FOR_H$ and a horizontal angular overlap of approximately 3°, then scan regions 500A and 500B may be referred to as having an overlap of approximately 5%. An overlap region 510 may include a higher density of pixels 210 based at least in part on the overlap of the two scan patterns 200A and 200B. As an example, if each scan pattern 200A and 200B has a substantially uniform density of pixels 210 across their respective scan region 500A and 500B, then the density of pixels 210 in the overlap region 510 may be approximately twice the pixel density outside the overlap region 510. Additionally, an overlap region 510 may also include a higher density of pixels 210 based on a nonuniform distribution of pixels 210 for each of the scan patterns 200A and 200B. As illustrated in FIG. 7, each scan pattern 200A and 200B may be configured to have a higher density of pixels 210 within the overlap region 510. As an example, if each scan pattern 200A and 200B has a higher density of pixels 210 within an overlap region 510, then the density of pixels in the overlap region 510 may be greater than twice the average pixel density outside the overlap region 510. As an example, an overlap region may have 3×, 4×, 5×, or any other suitable factor of higher pixel density inside an overlap region 510 than an average pixel density outside the overlap region 510. As another example, an overlap region 510 may include an overlap between 1%, 5%, 10%, 20%, or any other suitable percentage of scan regions 500A and 500B, and the overlap region 510 may include 20%, 30%, 40%, 50%, or any other suitable percentage of the total number of pixels 210 of scan patterns 200A and 200B.

Figure 8:
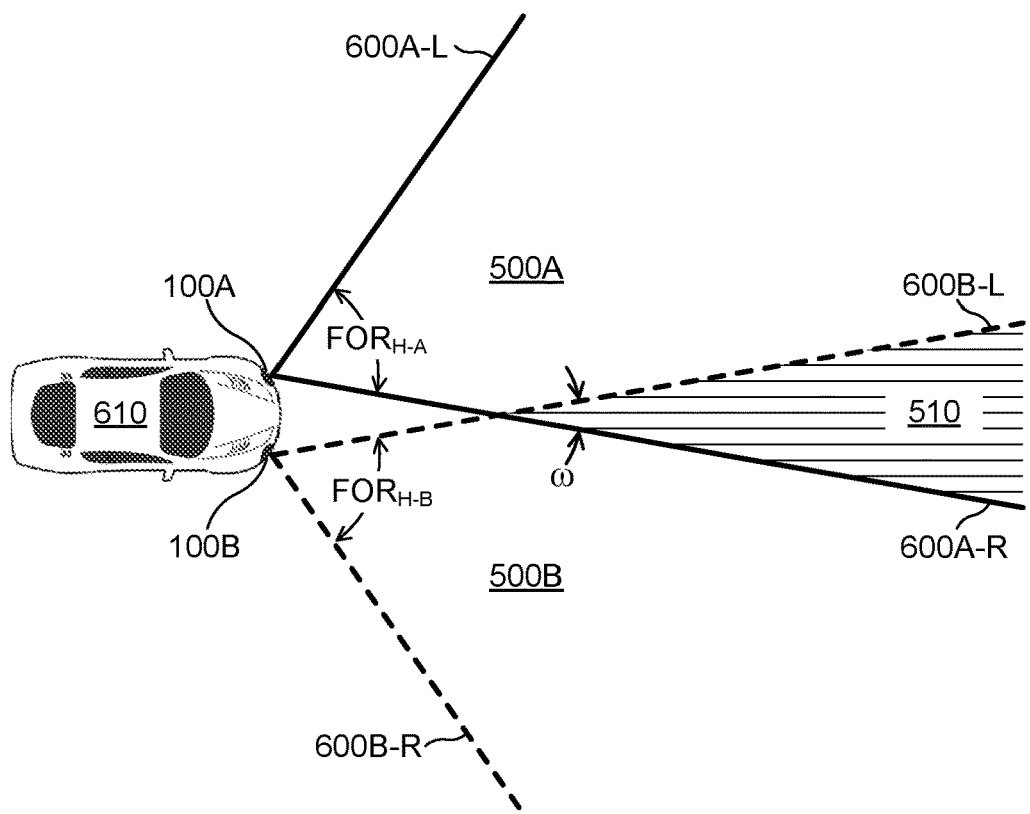
FIGS. 8-9 each illustrate a top view of a vehicle with two lidar systems that produce two example overlapping scan patterns.
Figure 9:
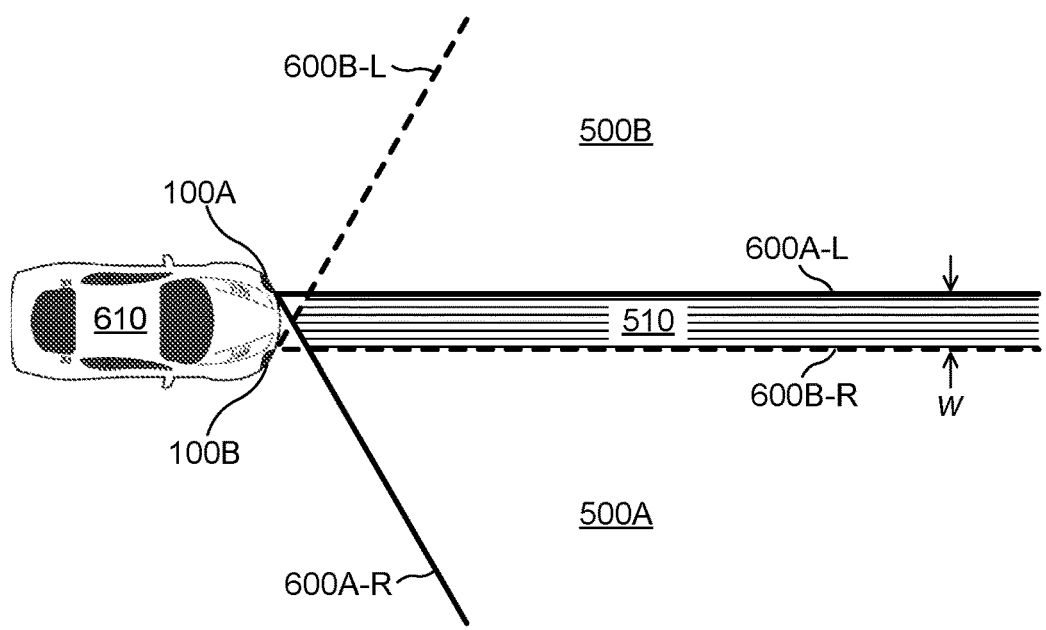

FIGS. 8-9 each illustrate a top view of a vehicle 610 with two lidar systems 100A and 100B that produce two example overlapping scan patterns. Scan region 500A corresponds to a FOR of lidar system 100A, and scan region 500B corresponds to a FOR of lidar system 100B. Scan region 500A is bordered by lines 600A-L and 600A-R, and the angle between lines 600A-L and 600A-R corresponds to $FOR_{H-A}$, the horizontal FOR of scan region 500A. Similarly, scan region 500B is bordered by lines 600B-L and 600B-R, and the angle between lines 600B-L and 600B-R corresponds to $FOR_{H-B}$, the horizontal FOR of scan region 500B. Scan region 500A and scan region 500B are overlapped in overlap region 510. In FIG. 8, overlap region 510 is bordered by lines 600A-R and 600B-L. In FIG. 9, overlap region 510 is bordered by lines 600A-L and 600B-R.

In particular embodiments, an overlap region 510 may provide a higher density of pixels 210 which may result in a higher-density point cloud within the overlap region 510. Additionally, the relatively high-density parts of scan patterns 200A and 200B may be configured to coincide approximately with the overlap region 510, resulting in a further increase in pixel density within the overlap region 510. In particular embodiments, an overlap region 510 may be aimed in a direction with relatively high importance or relevance (e.g., a forward-looking portion of a vehicle), or an overlap region 510 may provide a redundant back-up for an important portion of a FOR. As an example, lidar sensors 100A and 100B may be configured to overlap across region 510, and if one of the lidar sensors (e.g., lidar sensor 100A) experiences a problem or failure, the other lidar sensor (e.g., lidar sensor 100B) may continue to scan and produce a point cloud that covers the particular region of interest.

In the example of FIG. 8, scan regions 500A and 500B are overlapped to produce an angularly overlapping scan region 510 that has an overlap angle of ω. The overlap angle ω corresponds to the angle between lines 600A-R and 600B-L, where each line (which may be referred to as a borderline or an edge line) represents a border or end of the scan regions 500A and 500B, respectively. In particular embodiments, the overlap angle ω between two scan regions may be any suitable angle, such as for example, approximately 0°, 1°, 5°, 10°, 20°, or 40°. As an example, two scan regions each having a 60° $FOR_H$ and an overlap angle ω of 5° may form a combined scan region with an overall $FOR_H$ of 115°. In the example of FIG. 8, the overlap angle w between scan regions 500A and 500B is approximately 20°.

In the example of FIG. 9, scan regions 500A and 500B are overlapped to produce a translationally overlapping scan region 510 that has an overlap distance of w. In particular embodiments, a translationally overlapping scan region 510 may refer to an overlapping scan region 510 that results from translating scan region 500A with respect to 500B. In particular embodiments, the overlap distance w between two scan regions may be any suitable value, such as for example, approximately 0 cm, 1 cm, 5 cm, 10 cm, 100 cm, 1 m, 2 m, or 5 m. In the example of FIG. 9, scan regions 500A and 500B each have a 60° FOR and an overlap angle ω of 0°, and the two scan regions together form a combined scan region with an overall FOR of 120°. In particular embodiments, scan regions 500A and 500B may be angularly overlapped as well as translationally overlapped. As an example, scan regions 500A and 500B may have any suitable overlap distance w (e.g., approximately 10 cm) and a nonzero overlap angle ω (e.g., approximately 3°).

In particular embodiments, scan regions 500A and 500B may be overlapped in a crossing or non-crossing manner, depending on the positions of lidar systems 100A and 100B and their respective scan regions 500A and 500B. In FIGS. 8 and 9, lidar system 100A is located on the left side of vehicle 610, and lidar system 100B is located on the right side of vehicle 610. In FIG. 8, scan region 500A is directed toward the left of vehicle 610, and scan region 500B is directed toward the right. In FIG. 9, the scan regions 500A and 500B are reversed with respect to FIG. 8; scan region 500A is directed toward the right, and scan region 500B is directed toward the left. In the example of FIG. 8, scan regions 500A and 500B are overlapped in a non-crossing manner where lidar system 100A and scan region 500A are both located on the same side of vehicle 610 (the left side), and lidar system 100B and scan region 500B are both located on the other side of vehicle 610 (the right side). In the example of FIG. 9, scan regions 500A and 500B are overlapped in a crossing manner where lidar system 100A and scan region 500A are located on opposite sides of vehicle 610 (e.g., lidar system 100A is located on the left side of vehicle 610, and scan region 500A is directed toward the right of vehicle 610), and lidar system 100B and scan region 500B are also located on opposite sides of vehicle 610. Two lidar systems may be non-crossing if they each have one borderline that does not cross either borderline of the other system. The two lidar systems 100A and 100B in FIG. 8 are in a non-crossing configuration since borderline 600A-L does not cross borderline 600B-L or 600B-R, and borderline 600B-R does not cross borderline 600A-L or 600A-R. Two lidar systems may be overlapped in a crossing manner if the two borderlines for one lidar system each cross at least one borderline of the other lidar system. The two lidar systems 100A and 100B in FIG. 9 are in a crossing configuration since borderline 600A-L crosses borderline 600B-L and borderline 600A-R crosses both borderlines 600B-L and 600B-R.

Figure 10:
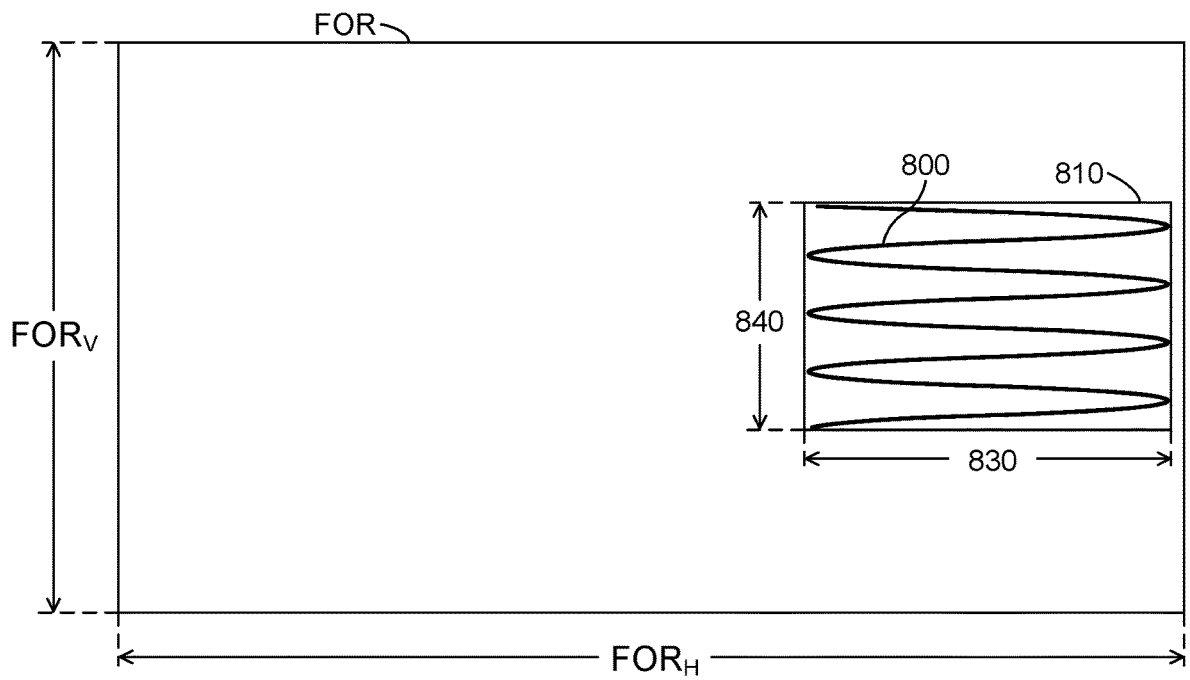
FIG. 10 illustrates an example targeted scan region.

FIG. 10 illustrates an example targeted scan region 810. In particular embodiments, lidar system 100 may be configured to perform a targeted scan 800 over a particular targeted scan region 810 within a particular field of regard $FOR_H \times FOR_V$. In the example of FIG. 10, targeted scan pattern 800 has a horizontal field of regard 830 contained within $FOR_H$ and a vertical field of regard 840 contained within $FOR_V$. As an example, a full field of regard (e.g., $FOR_H \times FOR_V$) may cover 50°×10°, and the targeted scan region 810 may have a field of regard that covers any suitable portion of the full field of regard (e.g., 2°×1°, 5°×2°, or 10°×4°). In particular embodiments, lidar system 100 may perform a scan that covers a full field of regard, and then, in a subsequent scan, lidar system 100 may perform a targeted scan 800 to investigate a particular sub-region (e.g., targeted scan region 810) of the full field of regard. As an example, during a scan that covers the full field of regard, one or more particular regions of interest may be identified (e.g., there may be a target 130 located in a region of interest), and lidar system 100 may then perform a targeted scan 800 to gain additional information about the target 130. As another example, lidar system 100 may alternate between performing one or more scans that cover a full field of regard and one or more targeted scans 800 that cover one or more particular sub-regions of the full field of regard.

In particular embodiments, a targeted scan 800 may have a higher pixel density than a scan that covers a full field of regard. In particular embodiments, a targeted scan 800 may cover a targeted scan region 810 having any suitable shape, such as for example, rectangular (as illustrated in FIG. 10), square, circular, elliptical, polygonal, or arbitrarily-shaped. In particular embodiments, lidar system 100 may perform a single targeted scan 800 of one region 810 (e.g., as illustrated in FIG. 10), or lidar system 100 may perform multiple, separate targeted scans 800. As an example, lidar system 100 may perform two or more targeted scans 800, where each targeted scan 800 has a particular shape, a particular location within the FOR, a particular scan pattern 800, or a particular pixel density.

Figure 11:
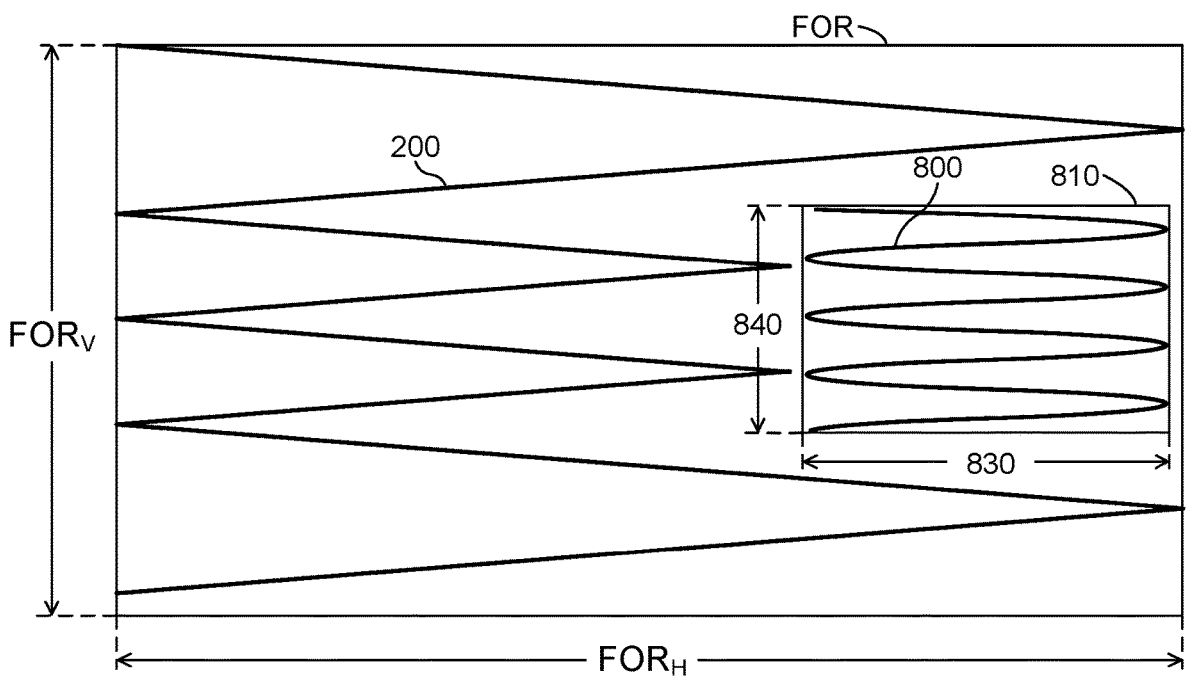
FIG. 11 illustrates an example scan pattern that includes an example targeted scan region.

FIG. 11 illustrates an example scan pattern 200 that includes an example targeted scan region 810. In FIGS. 10 and 11, pixels are not shown in the scan patterns for clarity of illustrating the scan patterns. In particular embodiments, a lidar system 100 may combine a scan pattern 200 that includes all or part of a full field of regard (e.g., $FOR_H \times FOR_V$) with a targeted scan 800. In the example of FIG. 11, scan pattern 200 may have a relatively low density of pixels 210, and targeted scan 800 may have a relatively high density of pixels. As an example, the average pixel density of the targeted scan 800 may be 2×, 3×, 5×, 10×, or any other suitable factor greater than the average pixel density of scan pattern 200. In particular embodiments, an average pixel density of a particular scan region may be expressed as $M/(FOR_H \times FOR_V)$, where M is the number of pixels 210 within the scan region, and the product of $FOR_H$ and $FOR_V$ corresponds to the solid angle of the scan region in units of square degrees ($deg^2$). As an example, a scan region with $M=10^6$ pixels and a 50°×20° field of regard has an average pixel density of $10^6/(50\times20)$, or 1,000 pixels/$deg^2$.

In particular embodiments, lidar system 100 may perform a standard scan that covers a full field of regard, and then, in a subsequent scan, lidar system 100 may perform a combined standard/targeted scan that includes a scan pattern 200 with a lower density of pixels 210 and a targeted scan 800 with a higher density of pixels 210. A combined standard/targeted scan (e.g., as illustrated in FIG. 11) may be performed in two separate steps (e.g., a standard scan pattern 200 may be followed or preceded by a targeted scan 800), or a combined standard/targeted scan may be performed in one operation (e.g., all or part of the targeted scan 800 may be performed during or interleaved within the standard scan pattern 200). In particular embodiments, a combined standard/targeted scan may include one or more distinct or separate targeted scan patterns 800. As an example, a combined standard/targeted scan may include a single targeted scan pattern 800 (e.g., as illustrated in FIG. 11), or a combined standard/targeted scan may include two or more targeted scan patterns 800.

Figure 12:
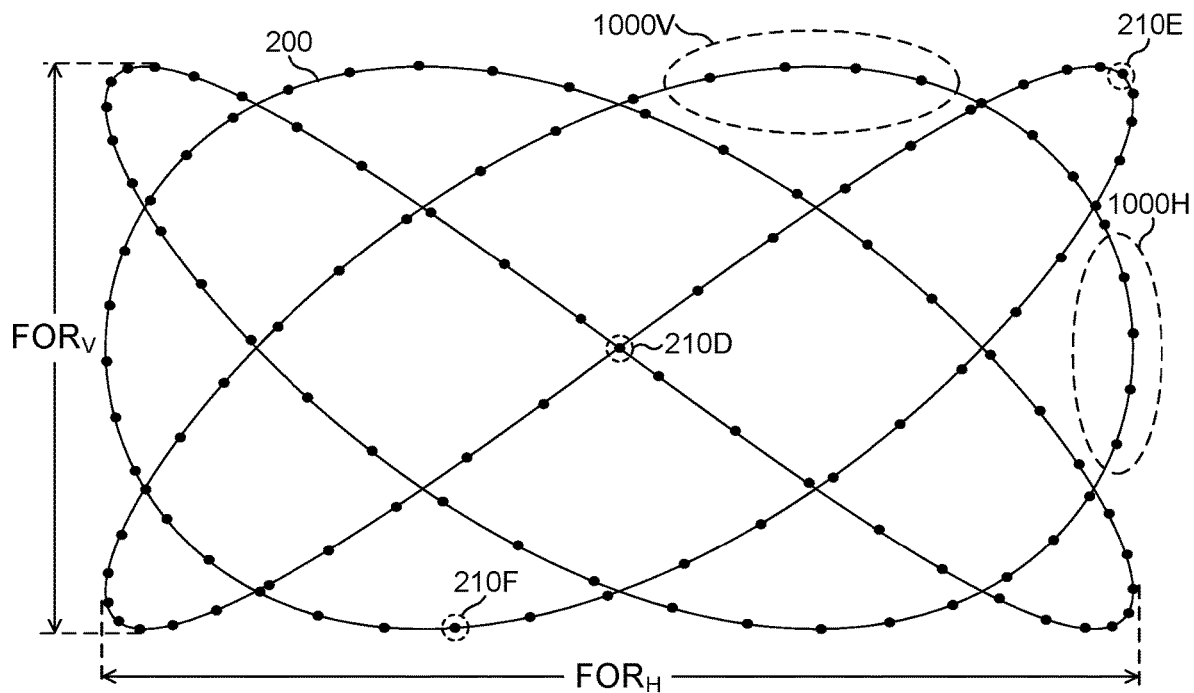
FIGS. 12-13 each illustrate an example Lissajous scan pattern.
Figure 13:
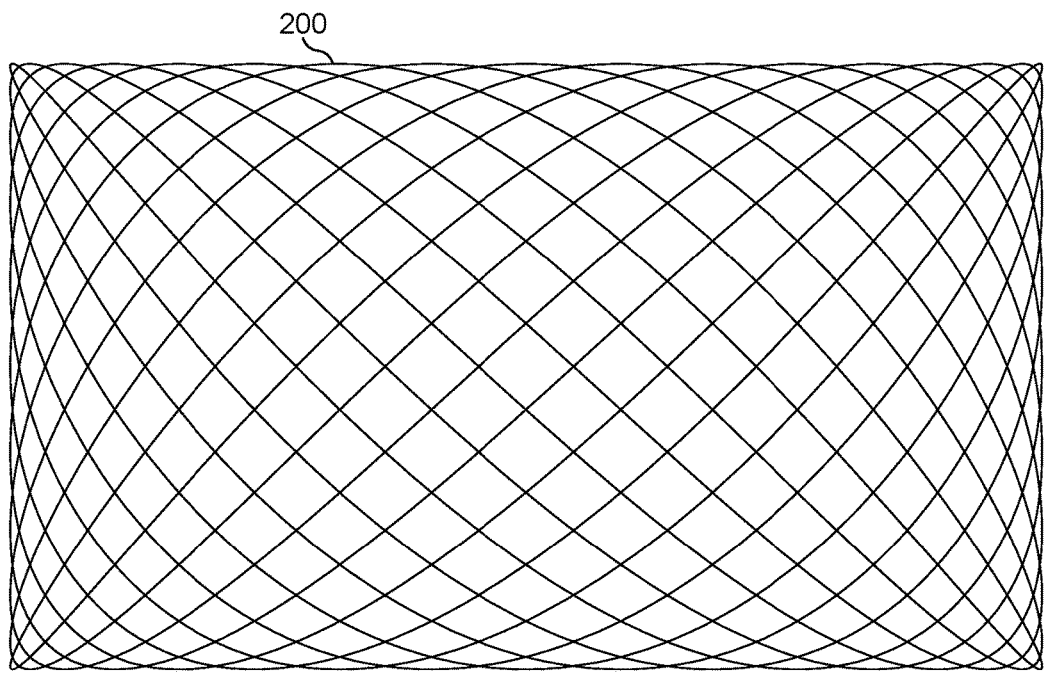

FIGS. 12-13 each illustrate an example Lissajous scan pattern 200. In particular embodiments, a Lissajous scan pattern 200 may refer to a scan pattern 200 that at least partially follows or that is based at least in part on a Lissajous curve. As an example, scanner 120 may direct output beam 125 to follow a Lissajous scan pattern 200 where the pattern is based on a Lissajous curve. A Lissajous curve (which may be referred to as a Lissajous figure, a Lissajous pattern, or a Lissajous scan pattern) describes a two-dimensional harmonic motion or pattern and may be written as a system of two parametric equations. As an example, a Lissajous scan pattern 200 may be expressed as $\Theta_x(n) = A \sin(2\pi a \cdot n/N)$ and $\Theta_y(n) = B \sin(2\pi b \cdot n/N + \delta)$, where $\Theta_x(n)$ and $\Theta_y(n)$ represent a pair of horizontal and vertical angles (each angle depends on the parameter n, where n is an integer that corresponds to the nth pixel 210 in a scan pattern 200); A and B represent horizontal and vertical amplitudes; a and b correspond to a number of horizontal and vertical lobes in the pattern; N is the number of pixels 210 in the scan pattern 200; and $\delta$ is a phase factor that represents a phase difference between $\Theta_x$ and $\Theta_y$.

The angles $\Theta_x(n)$ and $\Theta_y(n)$ correspond to an angular location or coordinates of the nth pixel 210 in a scan pattern 200, and n is an integer that varies from 0 to N−1. The parameter N represents the number of pixels 210 in one cycle of the Lissajous scan pattern 200, and N may be any suitable integer, such as for example, $10^2$, $10^3$, $10^4$, $10^5$, $10^6$, or $10^7$. In the example of FIG. 12, the number of pixels 210 in the scan pattern 200 is approximately N=125. In particular embodiments, a Lissajous scan pattern 200 may traverse a complete scan-pattern cycle that includes N pixels 210, and then, the Lissajous scan pattern 200 may repeat back on itself and repeatedly retrace approximately the same scan pattern 200. Each of the Lissajous scan patterns 200 illustrated in FIGS. 12-13 is a closed scan pattern that repeats back on itself and does not include a retrace operation. In particular embodiments, a pair of angular coordinates ($\Theta_x$, $\Theta_y$) may represent a location of a particular pixel 210 and may correspond to a pointing direction of output beam 125. In the example of FIG. 12, if the field of regard $FOR_H \times FOR_V$ is 60°×16°, then the angular coordinates ($\Theta_x$, $\Theta_y$) have ranges of (±30°, ±8°). For example, for a 60°×16° field of regard, pixel 210D (which is associated with the parameter n=0) has angular coordinates of approximately (0°, 0°), pixel 210E (associated with n=9) has angular coordinates of approximately (29.3°, 7.8°), and pixel 210F (associated with n=23) has angular coordinates of approximately (−9.6°, −8.0°).

In particular embodiments, the horizontal amplitude A may be an angle that corresponds to one half of the horizontal field of regard $FOR_H$, and the vertical amplitude B may be an angle that corresponds to one half of the vertical field of regard $FOR_V$. The amplitudes A and B may each have any suitable angular value, such as for example, 0.5°, 1°, 2°, 5°, 7.5°, 10°, 15°, 20°, 30°, or 60°. In the example of FIG. 12, if the field of regard $FOR_H \times FOR_V$ is 60°×16°, then A is 30° and B is 8°. The phase factor $\delta$ represents a relative phase shift between the two expressions for $\Theta_x(n)$ and $\Theta_y(n)$, and $\delta$ may have any suitable angular value, such as for example, 0°, 5°, 10°, 45°, 90°, or 180°.

In particular embodiments, the values a and b (which may be referred to as spatial-frequency parameters) may correspond to a number of horizontal lobes and a number of vertical lobes, respectively, in a Lissajous pattern 200. As an example, if a is 33, then the Lissajous scan pattern 200 may have 33 horizontal lobes (arrayed along a vertical edge of the pattern 200), and if b is 13, then the Lissajous scan pattern 200 may have 13 vertical lobes (arrayed along a horizontal edge). A lobe corresponds to an arc of the Lissajous pattern 200 that protrudes along one edge of the pattern 200 (e.g., a left edge, right edge, upper edge, or lower edge). In the example of FIG. 12, lobe 1000H is a horizontal lobe, and lobe 1000V is a vertical lobe. In FIG. 12, a is 3 and b is 4, and the Lissajous scan pattern 200 has 3 horizontal lobes and 4 vertical lobes. In FIG. 13, a is 11 and b is 17, and the Lissajous scan pattern 200 has 11 horizontal lobes and 17 vertical lobes. In particular embodiments, the values a and b may correspond to a number of horizontal and vertical cycles, respectively, in a Lissajous pattern 200. As an example, if a=12 and b=5, then each traversal of the corresponding Lissajous pattern 200 may include 12 sinusoidal cycles along a horizontal direction and 5 sinusoidal cycles along a vertical direction (e.g., for each traversal of the Lissajous pattern 200, a horizontal scanning mirror may undergo 12 periodic cycles, and a vertical scanning mirror may undergo 5 periodic cycles). As another example, if a=64 and b=9, then each traversal of the corresponding Lissajous pattern 200 may include 64 cycles along a horizontal direction and 9 cycles along a vertical direction. The scan pattern 200 illustrated in FIG. 12 includes a=3 horizontal cycles and b=4 vertical cycles, and the scan pattern 200 illustrated in FIG. 13 includes a=11 horizontal cycles and b=17 vertical cycles. In the example of FIG. 13, pixels 210 are not included in the Lissajous scan pattern 200 for clarity of illustrating the scan pattern. Similarly, scan patterns 200 illustrated in other figures described herein may not include pixels for clarity of illustrating the scan pattern.

In particular embodiments, the spatial-frequency parameters a and b for a Lissajous scan pattern 200 may each have any suitable integer value (e.g., 2, 10, 53, 113, or 200) or any suitable non-integer value (e.g., 5.3, 37.1, or 113.7). In particular embodiments, a and b may each have an integer value, where a and b do not have any common factors. As an example, valid (a, b) pairs may include (2, 7), (3, 8), (11, 14), or (17, 32), and non-valid (a, b) pairs that have common factors may include (2, 6), (3, 9), or (11, 33).

In particular embodiments, a Lissajous scan pattern 200 may be a static-pixel pattern where each pixel 210 of the scan pattern 200 has substantially the same angular coordinates ($\Theta_x$, $\Theta_y$) from one scan cycle to the next. As an example, in FIG. 12, the pixel 210F associated with n=23 may have substantially the same angular coordinates (−9.6°, −8.0°) for each cycle of a Lissajous scan pattern 200. In particular embodiments, a Lissajous scan pattern 200 may be a dynamic-pixel pattern where the pixels 210 of the scan pattern 200 have angular coordinates ($\Theta_x$, $\Theta_y$) that vary from one scan cycle to the next. The pixels 210 may all be located on a curve corresponding to the Lissajous scan pattern 200, but from one cycle to the next, each pixel 210 may advance along the scan-pattern curve 200 by an amount that depends on a phase-advancement factor. As an example, a Lissajous scan pattern 200 with dynamic pixels 210 may be expressed as $\Theta_x(n,C) = A \sin(2\pi a \cdot n/N + aC\Phi)$ and $\Theta_y(n) = B \sin(2\pi b \cdot n/N + \delta + bC\Phi)$, where C is a cycle-count parameter and $\Phi$ represents the phase-advancement factor. The cycle parameter C is an integer that represents the number of Lissajous-curve scan cycles that have been traversed, and the parameter C increments by 1 for each successive cycle. As an example, for an initial scan cycle, C is 0, and for the next cycle C is 1. The phase-advancement factor $\Phi$ represents an amount of phase increase from one scan cycle to the next and corresponds to an amount of movement along a scan-pattern curve from one scan to the next. The phase advancement factor Φ may have any suitable angular value, such as for example, 0.001°, 0.01°, 0.05°, 0.1°, 0.5°, 1°, 5°, or 10°. The locations of the pixels 210 illustrated in FIG. 12 may correspond to pixel locations for an initial scan cycle (e.g., C=0), and the pixels 210 may advance along the scan-pattern curve 200 for each subsequent scan cycle by an amount based on the value of the phase-advancement factor Φ. As an example, for an initial scan cycle, pixel 210D may have a location of approximately (0°, 0°). If the phase-advancement factor Φ is approximately 0.5°, then pixel 210D may have locations of approximately (0.8°, 0.3°) for C=1, (1.6°, 0.6°) for C=2, and (2.4°, 0.8°) for C=3. The other pixels 210 of the scan pattern 200 may advance along the scan-pattern curve in a similar fashion.

In particular embodiments, a Lissajous scan pattern 200 may be expressed in terms of a time parameter as $\Theta_x(t)=A \sin(2\pi aft)$ and $\Theta_y(t)=B \sin(2\pi bft+\delta)$, where f is a frame rate of the lidar system 100. The angles $\Theta_x(t)$ and $\Theta_y(t)$ correspond to the angular location or coordinates of output beam 125 at a time t. The frame rate f (which may be expressed in units of frames per second, or hertz) may be any suitable value, such as for example, 0.1 Hz, 1 Hz, 5 Hz, 10 Hz, 20 Hz, 40 Hz, 60 Hz, 100 Hz, or 400 Hz. Additionally, the product a×f corresponds to the oscillation frequency of the output beam 125 along an x-axis (which may be represented by $F_x$). Similarly, the product b×f corresponds the oscillation frequency of the output beam 125 along a y-axis (which may be represented by $F_y$). In particular embodiments, the phase difference δ between the angles $\Theta_x(t)$ and $\Theta_y(t)$ may be any suitable fixed or adjustable angular value. As an example, two scanning mirrors of scanner 120 may each oscillate at a particular frequency (e.g., $F_x$ and $F_y$), and the two scanning mirrors may be synchronized with respect to one another so that there is a substantially fixed phase difference δ delta between their oscillations.

In particular embodiments, a galvanometer scanner or a resonant-mirror scanner may be configured to scan an output beam 125 along any suitable direction (e.g., horizontally or vertically) at any suitable frequency, such as for example, approximately 1 Hz, 5 Hz, 10 Hz, 20 Hz, 40 Hz, 60 Hz, 100 Hz, 500 Hz, 1 kHz, 2 kHz, 5 kHz, or 10 kHz. As an example, a lidar system 100 may operate with a frame rate f of approximately 10 Hz. If a=64 and b=5, then the output beam 125 may oscillate at approximately $F_x$=640 Hz along the x-axis and approximately $F_y$=50 Hz along the y-axis. As another example, a scanner 120 may include a resonant scanner that scans the output beam 125 horizontally at a resonant frequency of 640 Hz. Additionally, the scanner 120 may include a galvanometer or a resonant scanner that scans the output beam 125 vertically at 50 Hz. As another example, if a=100 and f=10 Hz, then the output beam 125 may oscillate at approximately $F_x$=1 kHz along a substantially horizontal direction. In particular embodiments, a scanner 120 may include a first mirror (e.g., mirror 300-1 in FIG. 3) configured to scan an output beam 125 along a substantially vertical direction and a second mirror (e.g., mirror 300-2) configured to scan the output beam 125 along a substantially horizontal direction (or vice versa). The first or second mirror may each be driven by any suitable type of actuator, such as for example, a galvanometer scanner, a resonant scanner, a voice coil motor, or a MEMS device. As an example, the first and second mirrors may each be driven by a resonant scanner configured to oscillate at a particular resonant frequency (e.g., the first mirror may be driven at approximately 1-100 Hz and the second mirror may be driven at approximately 500-1,000 Hz). As another example, the first mirror may be driven by a galvanometer scanner, and the second mirror may be driven by a resonant scanner. As another example, the first and second mirrors may each be driven by a galvanometer scanner.

Figure 14:
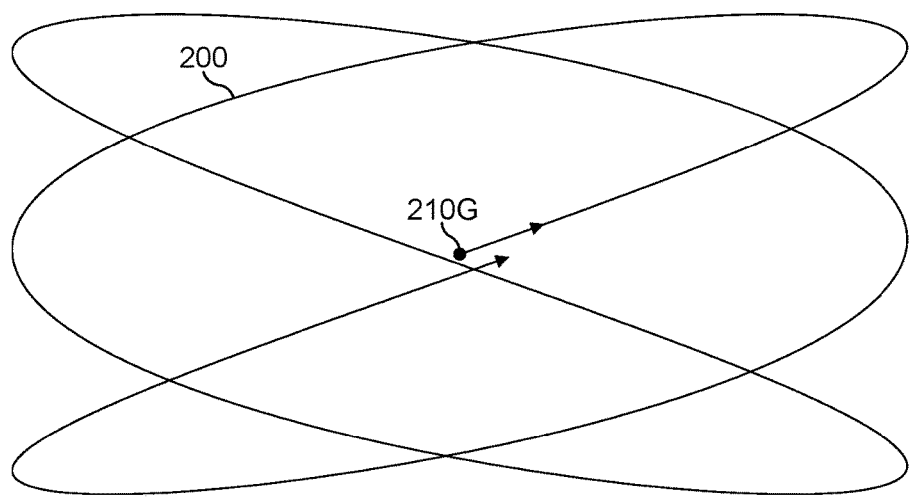
FIGS. 14-16 illustrate three successive stages of an example quasi-non-repeating Lissajous scan pattern.
Figure 15:
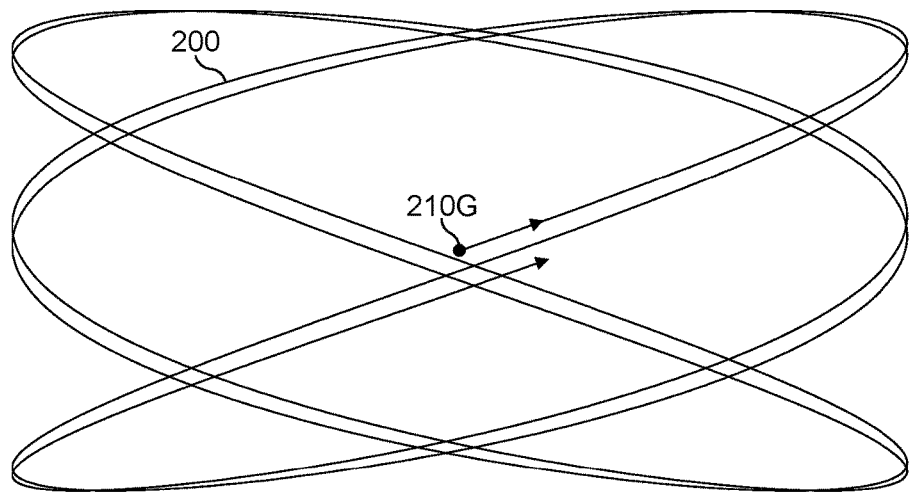
Figure 16:
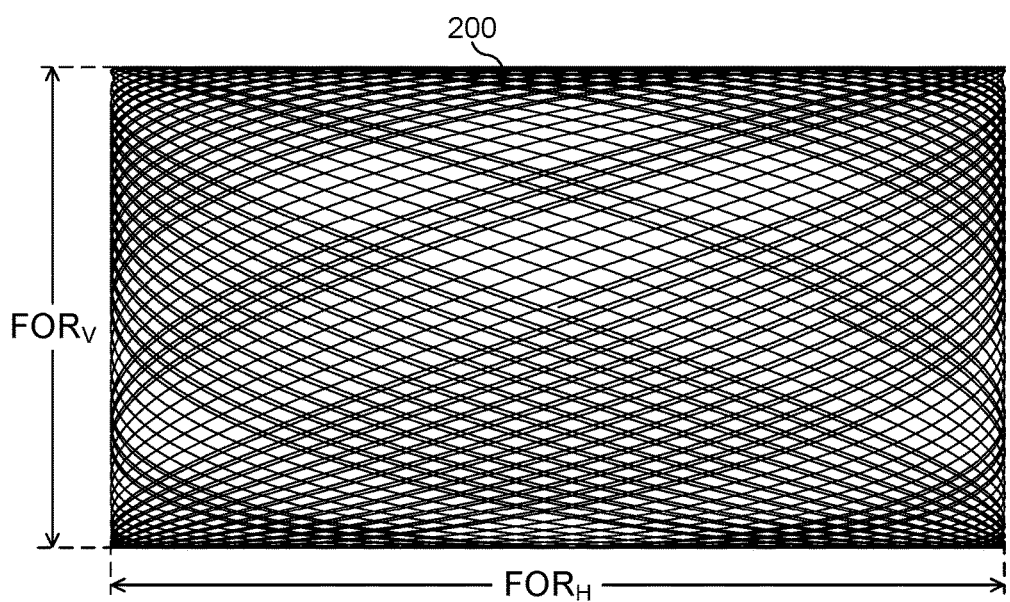

FIGS. 14-16 illustrate three successive stages of an example quasi-non-repeating Lissajous scan pattern 200. In particular embodiments, if the values a and b are each rational numbers, then a corresponding Lissajous scan pattern 200 may be closed (e.g., the pattern repeats back on itself after a finite number of cycles). The Lissajous scan patterns 200 illustrated in FIGS. 12-13 are closed scan patterns (e.g., the Lissajous scan patterns 200 in FIGS. 12-13 repeat and do not include a retrace operation). As an example, Lissajous scan pattern 200 in FIG. 12 starts at pixel 210D, and after completing one full cycle of the scan pattern 200, the pattern returns to the pixel 210D starting point and begins another scan cycle (each scan cycle includes N pixels 210). In particular embodiments, if a or b is an irrational number (e.g., a=π), then the corresponding Lissajous scan pattern 200 may be non-repeating (e.g., the pattern never repeats back on itself).

In particular embodiments, for particular Lissajous scan patterns 200 that have particular non-integer rational-number values for a or b, the scan patterns 200 may be closed, but the pattern may require a significant number of scan cycles before repeating back on itself. As an example, a Lissajous scan pattern 200 that takes greater than or equal to 5, 10, 20, 30, 50, 100, 1000, or any other suitable number of scan cycles before repeating back on itself may be referred to as a quasi-non-repeating Lissajous scan pattern 200. As an example, a quasi-non-repeating Lissajous scan pattern 200 may have a pair of values (a, b) such as (5.01, 4), (17.3, 13), or (11.3, 117.07), where at least one of the values of a or b is a non-integer rational number.

In particular embodiments, a quasi-non-repeating Lissajous scan pattern 200 may require M scan cycles before repeating back on itself, where M is the smallest integer such that M×a is an integer and M×b is an integer. As an example, a quasi-non-repeating Lissajous scan pattern 200 with a pair of spatial-frequency parameters (3.04, 2.2) may require M=25 scan cycles before repeating back on itself. As another example, a quasi-non-repeating Lissajous scan pattern 200 with a pair of spatial-frequency parameters (3.025, 2) may require M=40 scan cycles before repeating back on itself. As another example, a quasi-non-repeating Lissajous scan pattern 200 with a pair of spatial-frequency parameters (3.2, 2.6) may require M=5 scan cycles before repeating back on itself. In particular embodiments, a quasi-non-repeating Lissajous scan pattern 200 may be used to provide a more complete coverage of a scan region than a closed scan pattern or may be used to provide a scan pattern where the pixels 210 do not remain fixed in the same location from one scan cycle to another.

FIGS. 14-16 illustrate a quasi-non-repeating Lissajous scan pattern 200 where a is 3.02 and b is 2. For the pair of spatial-frequency parameters (3.02, 2), the quasi-non-repeating Lissajous scan pattern 200 will require M=50 scan cycles before it repeats. FIG. 14 illustrates the quasi-non-repeating Lissajous scan pattern 200 after approximately one scan cycle. The scan cycle begins at pixel 210G and proceeds to scan in the direction of the arrows. FIG. 15 illustrates the quasi-non-repeating Lissajous scan pattern 200 after approximately two scan cycles. FIG. 16 illustrates the quasi-non-repeating Lissajous scan pattern 200 after approximately 20 scan cycles. In particular embodiments, a quasi-non-repeating Lissajous scan pattern 200 may be expressed in terms of a time parameter as $\Theta_x(t)=A\sin(2\pi a ft)$ and $\Theta_y(t)=B\sin(2\pi b ft+\delta)$, where f is a frame rate of the lidar system 100, and at least one of the values of a or b is a non-integer rational number. As an example, for a frame rate f of approximately 10 Hz, if a is approximately 64 and b is approximately 5.2, then the output beam 125 may be configured to oscillate at approximately $F_x=640$ Hz along the x-axis and approximately $F_y=52$ Hz along the y-axis. Additionally, the output beam 125 may follow a quasi-non-repeating Lissajous scan pattern 200 which repeats back on itself after M=5 scan cycles (e.g., since 5×5.2 is an integer).

Figure 17:
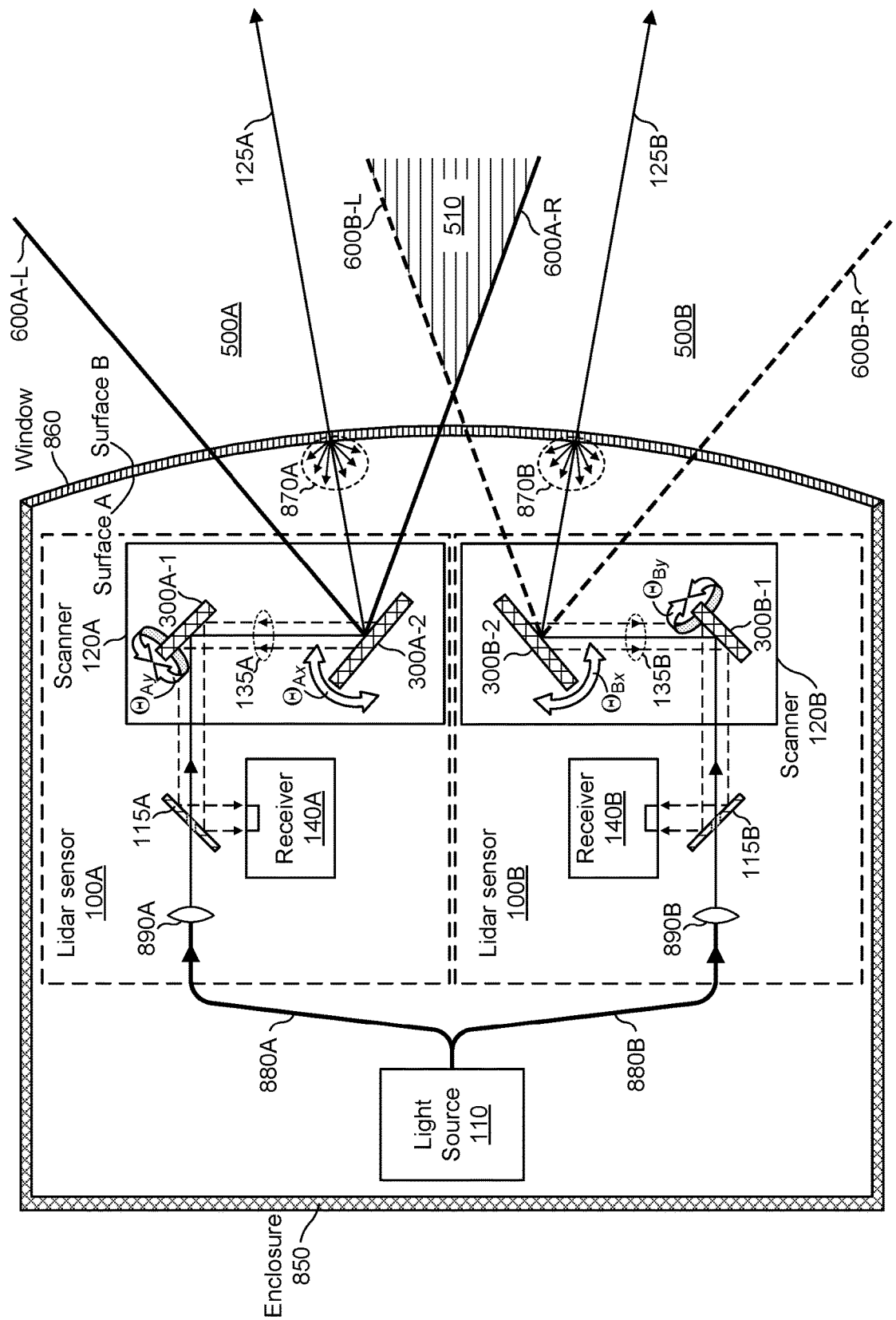
FIGS. 17-18 each illustrate an example enclosure that contains two lidar sensors.
Figure 18:
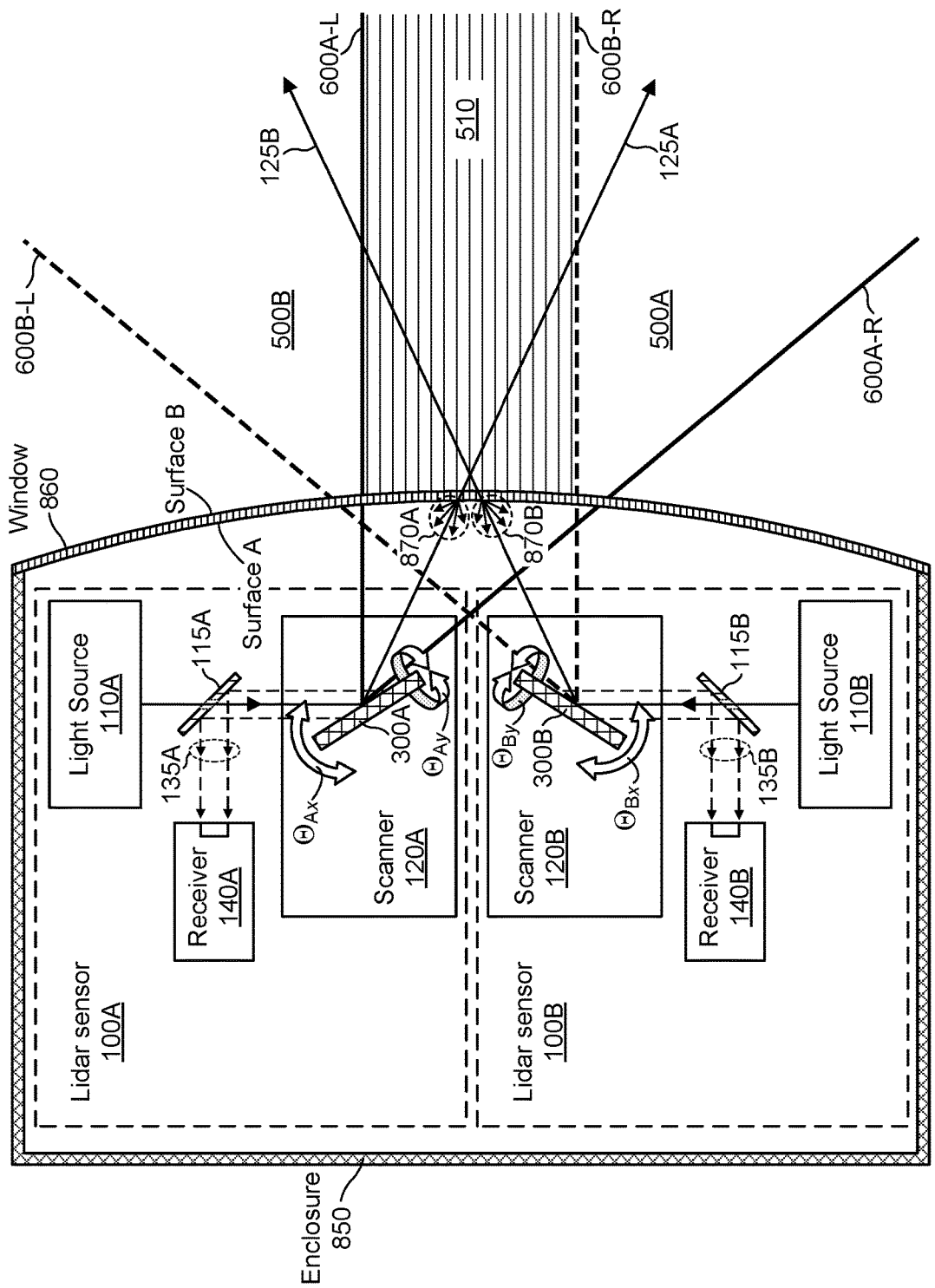

FIGS. 17-18 each illustrate an example enclosure 850 that contains two lidar sensors 100A and 100B. In particular embodiments, an enclosure 850 that includes two or more lidar sensors (e.g., lidar sensors 100A and 100B) may be referred to collectively as a lidar system, lidar module, or lidar-system module. In FIG. 17, the enclosure 850 contains light source 110, and light from the light source 110 is directed to lidar sensor 100A and lidar sensor 100B by fiber-optic cables 880A and 880B, respectively. Fiber-optic cable 880A is terminated by lens 890A, which produces free-space beam 125A. Similarly, fiber-optic cable 880B is terminated by lens 890B, which produces free-space beam 125B. Lens 890A may be a fiber-optic collimator that receives light from fiber-optic cable 880A and produces a free-space optical beam 125A that is directed through mirror 115A and to scanner 120A. Similarly, lens 890B may be a fiber-optic collimator that receives light from fiber-optic cable 880B and produces a free-space optical beam 125B. In FIG. 18, each lidar sensor 100A and 100B includes a dedicated light source 110A and 110B, respectively.

In FIGS. 17 and 18, the output beam 125A passes through a hole in overlap mirror 115A and is directed to scanner 120A, and the output beam 125B passes through a hole in overlap mirror 115B and is directed to scanner 120B. Scanners 120A and 120B scan output beams 125A and 125B, respectively, along particular scan patterns. The enclosures 850 in FIGS. 17 and 18 each include a window 860 which output beams 125A and 125B pass through. Scattered light 135A from output beam 125A (e.g., light that is scattered by a target 130) travels back through window 860 and scanner 120A and is then reflected by mirror 115A toward receiver 140A. Similarly, scattered light 135B from output beam 125B travels back through window 860 and scanner 120B and is then reflected by mirror 115B toward receiver 140B.

In FIG. 17, scanner 120A includes scanning mirrors 300A-1 and 300A-2, and scanner 120B includes scanning mirrors 300B-1 and 300B-2. Scanning mirror 300A-1 is rotated to scan output beam 125A vertically (e.g., output beam 125A performs an elevation scan along an angle $\Theta_{Ay}$), and scanning mirror 300A-2 is rotated to scan output beam 125A horizontally (e.g., output beam 125A performs an azimuthal scan along an angle $\Theta_{Ax}$). Similarly, scanning mirror 300B-1 is rotated to scan output beam 125B vertically (e.g., output beam 125B performs an elevation scan along an angle $\Theta_{By}$), and scanning mirror 300B-2 is rotated to scan output beam 125B horizontally (e.g., output beam 125B performs an azimuthal scan along an angle $\Theta_{Bx}$). In FIG. 18, each scanner includes a single scanning mirror configured to rotate about two substantially orthogonal axes. Scanner 120A includes scanning mirror 300A, which scans output beam 125A vertically and horizontally by scanning along angles $\Theta_{Ay}$ and $\Theta_{Ax}$, respectively. Similarly, scanner 120B includes scanning mirror 300B, which scans output beam 125B vertically and horizontally by scanning along angles $\Theta_{By}$ and $\Theta_{Bx}$, respectively.

The lidar sensors 100A and 100B illustrated in FIG. 17 or 18 may be similar to the lidar sensors 100A and 100B illustrated in FIG. 8 or 9. In the example of FIG. 17, scan regions 500A and 500B are overlapped in a non-crossing manner (similar to scan regions 500A and 500B illustrated in FIG. 8). In the example of FIG. 18, scan regions 500A and 500B are overlapped in a crossing manner (similar to scan regions 500A and 500B illustrated in FIG. 9).

In particular embodiments, a lidar system may include 2, 3, 4, or any other suitable number of lidar sensors. As an example, a lidar system may include two lidar sensors (e.g., lidar sensors 100A and 100B) which are packaged in one enclosure 850. As another example, a lidar system may include three lidar sensors packaged in one enclosure 850. An enclosure 850 may refer to a housing, box, or case that contains two or more lidar sensors. An enclosure 850 may be an airtight or watertight structure that prevents water vapor, liquid water, dirt, dust, or other contaminants from getting inside the enclosure 850. An enclosure 850 may be filled with a dry or inert gas, such as for example, dry air, nitrogen, or argon. Each lidar sensor 100 contained within an enclosure 850 may include a scanner 120 configured to scan pulses of light (e.g., output beam 125) along a particular scan pattern 200 and a receiver 140 configured to detect scattered light 135 from the scanned pulses of light. Additionally, the enclosure 850 may include a window 860 which the output beam 125 and scattered light 135 for each lidar sensor are transmitted through.

In particular embodiments, a lidar system with multiple lidar sensors may produce multiple respective scan patterns which are at least partially overlapped. As an example, a lidar system may include two lidar sensors 100A and 100B that produce two scan patterns 200A and 200B, respectively, where scan patterns 200A and 200B are at least partially overlapped (e.g., in a crossing or a non-crossing manner). As another example, a lidar system may include three lidar sensors that produce three respective scan patterns (e.g., a first, second, and third scan pattern) which are at least partially overlapped (e.g., the first and second scan patterns are at least partially overlapped, and the second and third scan patterns are at least partially overlapped).

In particular embodiments, a lidar system may include one or more light sources 110 configured to provide optical pulses to two or more lidar sensors. As an example, a single light source 110 may be used to supply optical pulses to multiple lidar sensors within an enclosure 850. In FIG. 17, light source 110 produces optical pulses that are split and supplied to lidar sensors 100A and 100B. As an example, optical pulses produced by light source 110 may pass through a 1×2 optical-power splitter that splits each pulse emitted by light source 110 into two pulses which are sent to lidar sensor 100A and lidar sensor 100B, respectively. As another example, optical pulses produced by light source 110 may pass through a 1×2 optical switch that switches between lidar sensor 100A and lidar sensor 100B so that every other emitted pulse is supplied to one of the lidar sensors (e.g., pulses 1, 3, 5, etc. are supplied to lidar sensor 100A, and pulses 2, 4, 6, etc. are supplied to lidar sensor 100B). As another example, optical pulses produced by light source 110 may pass through a 1×N optical splitter or switch that supplies the pulses to N lidar sensors 100 located within an enclosure 850. In particular embodiments, a lidar system may include multiple light sources 110 configured to provide optical pulses to multiple respective lidar sensors 100. As an example, each lidar sensor 100 within a lidar-system enclosure 850 may have a dedicated light source 110. In FIG. 18, light source 110A supplies optical pulses for lidar sensor 100A, and light source 110B supplies optical pulses for lidar sensor 100B.

In particular embodiments, a lidar-system enclosure 850 with multiple lidar sensors 100 may produce multiple output beams 125 having one or more particular wavelengths. In the example of FIG. 17, output beams 125A and 125B may include pulses having substantially the same wavelength (e.g., approximately 1550 nm). In the example of FIG. 18, output beams 125A and 125B may have different wavelengths. For example, light source 110A may produce pulses with a wavelength of approximately 1550 nm, and light source 110B may produce pulses with a wavelength of approximately 1555 nm. Additionally, lidar sensor 100A may include an optical filter that transmits light at the wavelength of light source 110A and blocks light at the wavelength of light source 110B. Similarly, lidar sensor 100B may include an optical filter that transmits light at the wavelength of light source 110B and blocks light at the wavelength of light source 110A. For example, each receiver 140A and 140B may have an optical filter located at or near the input to the receiver. The optical filter may be configured to block light from the other light source to reduce optical cross-talk between lidar sensor 100A and 100B (e.g., to reduce the amount of scattered light from light source 110B that is detected by receiver 140A). An optical filter may be an absorptive filter, dichroic filter, long-pass filter, short-pass filter, band-pass filter, or any other suitable type of optical filter.

In particular embodiments, each output beam 125 emitted from an enclosure 850 may be incident on window 860 at a nonzero angle of incidence (AOI). A beam that is incident at 0° AOI may be approximately orthogonal to surface A or surface B of window 860. In FIGS. 17 and 18, output beams 125A and 125B may each be incident on window 860 at a nonzero AOI (e.g., output beams 125A and 125B are each non-orthogonal to surface A and surface B of window 860 as the beams are scanned). Output beams 125A and 125B may each have an AOI with window 860 that is greater than or equal to approximately 0.5°, 1°, 2°, 5°, 10°, 20°, or any other suitable AOI. If output beam 125A strikes window 860 at 0° AOI, then a portion of the beam 125A reflected at surface A or surface B may propagate back along approximately the same path as the incident beam 125A. This specular reflection may be detected by receiver 140A (e.g., the specular reflection may result in an unwanted pulse-detection event). If output beam 125A has a nonzero AOI on window 860 as the beam is scanned, then the magnitude of an unwanted specular reflection from window 860 detected by receiver 140A may be significantly reduced since the off-axis specular reflection will not propagate directly back on the path of the incident beam 125A. Similarly, if output beam 125B has a nonzero AOI on window 860, then the magnitude of an unwanted specular reflection from window 860 detected by receiver 140B may be significantly reduced.

In particular embodiments, an output beam 125 may produce scattered light when the output beam 125 is incident on window 860. The scattered light may result from surface roughness, imperfections, impurities, or inhomogeneities located in window 860 or on surface A or surface B. In the example of FIG. 17, output beams 125A and 125B produce scattered light 870A and 870B, respectively, at window 860. Scattered light 870A or 870B may be produced from surface A, surface B, or from the bulk material of window 860, and scattered light 870A and 870B may be emitted over a wide range of directions. A portion of scattered light 870A may be detected by receiver 140B, resulting in unwanted cross-talk from lidar sensor 100A to lidar sensor 100B. Similarly, a portion of scattered light 870B may be detected by receiver 140A, resulting in unwanted optical cross-talk from lidar sensor 100B to lidar sensor 100A. In particular embodiments, an amount of optical cross-talk between lidar sensors may be reduced by performing scans in an out-of-synchronization manner, as described herein.

In particular embodiments, window 860 may be made from any suitable substrate material, such as for example, glass or plastic (e.g., polycarbonate, acrylic, cyclic-olefin polymer, or cyclic-olefin copolymer). In particular embodiments, window 860 may include an interior surface (surface A) and an exterior surface (surface B), and surface A or surface B may include a dielectric coating having particular reflectivity values at particular wavelengths. A dielectric coating (which may be referred to as a thin-film coating, interference coating, or coating) may include one or more thin-film layers of dielectric materials (e.g., $SiO_2$, $TiO_2$, $Al_2O_3$, $Ta_2O_5$, $MgF_2$, $LaF_3$, or $AlF_3$) having particular thicknesses (e.g., thickness less than 1 μm) and particular refractive indices. A dielectric coating may be deposited onto surface A or surface B of window 860 using any suitable deposition technique, such as for example, sputtering or electron-beam deposition.

In particular embodiments, a dielectric coating may have a high reflectivity at a particular wavelength or a low reflectivity at a particular wavelength. A high-reflectivity (HR) dielectric coating may have any suitable reflectivity value (e.g., a reflectivity greater than or equal to 80%, 90%, 95%, or 99%) at any suitable wavelength or combination of wavelengths. A low-reflectivity dielectric coating (which may be referred to as an anti-reflection (AR) coating) may have any suitable reflectivity value (e.g., a reflectivity less than or equal to 5%, 2%, 1%, 0.5%, or 0.2%) at any suitable wavelength or combination of wavelengths. In particular embodiments, a dielectric coating may be a dichroic coating with a particular combination of high or low reflectivity values at particular wavelengths. As an example, a dichroic coating may have a reflectivity of less than or equal to 0.5% at approximately 1550-1560 nm and a reflectivity of greater than or equal to 90% at approximately 800-1500 nm.

In particular embodiments, surface A or surface B may have a dielectric coating that is anti-reflecting at an operating wavelength of one or more light sources 110 contained within enclosure 850. An AR coating on surface A and surface B may increase the amount of light at an operating wavelength of light source 110 that is transmitted through window 860. Additionally, an AR coating at an operating wavelength of light source 110 may reduce the amount of incident light from output beam 125A or 125B that is reflected by window 860 back into the enclosure 850. In FIG. 17, surface A and surface B may each have an AR coating with reflectivity less than 0.5% at an operating wavelength of light source 110. As an example, if light source 110 has an operating wavelength of approximately 1550 nm, then surface A and surface B may each have an AR coating with a reflectivity that is less than 0.5% from approximately 1547 nm to approximately 1553 nm. In FIG. 18, surface A and surface B may each have an AR coating with reflectivity less than 1% at the operating wavelengths of light sources 110A and 110B. As an example, if light source 110A emits pulses at a wavelength of approximately 1535 nm and light source 110B emits pulses at a wavelength of approximately 1540 nm, then surface A and surface B may each have an AR coating with reflectivity less than 1% from approximately 1530 nm to approximately 1545 nm.

In particular embodiments, window 860 may have an optical transmission that is greater than any suitable value for one or more wavelengths of one or more light sources 110 contained within enclosure 850. As an example, window 860 may have an optical transmission of greater than or equal to 70%, 80%, 90%, 95%, or 99% at a wavelength of light source 110. In FIG. 17, window 860 may transmit greater than or equal to 95% of light at an operating wavelength of light source 110. In FIG. 18, window 860 may transmit greater than or equal to 90% of light at the operating wavelengths of light sources 110A and 110B.

In particular embodiments, surface A or surface B may have a dichroic coating that is anti-reflecting at one or more operating wavelengths of one or more light sources 110 and high-reflecting at wavelengths away from the one or more operating wavelengths. As an example, surface A may have an AR coating for an operating wavelength of light source 110, and surface B may have a dichroic coating that is AR at the light-source operating wavelength and HR for wavelengths away from the operating wavelength. A coating that is HR for wavelengths away from a light-source operating wavelength may prevent most incoming light at unwanted wavelengths from being transmitted through window 860. In FIG. 17, if light source 110 emits optical pulses with a wavelength of approximately 1550 nm, then surface A may have an AR coating with a reflectivity of less than or equal to 0.5% from approximately 1546 nm to approximately 1554 nm. Additionally, surface B may have a dichroic coating that is AR at approximately 1546-1554 nm and HR (e.g., reflectivity of greater than or equal to 90%) at approximately 800-1500 nm and approximately 1580-1700 nm.

In particular embodiments, surface B of window 860 may include a coating that is oleophobic, hydrophobic, or hydrophilic. A coating that is oleophobic (or, lipophobic) may repel oils (e.g., fingerprint oil or other non-polar material) from the exterior surface (surface B) of window 860. A coating that is hydrophobic may repel water from the exterior surface. As an example, surface B may be coated with a material that is both oleophobic and hydrophobic. A coating that is hydrophilic attracts water so that water may tend to wet and form a film on the hydrophilic surface (rather than forming beads of water as may occur on a hydrophobic surface). If surface B has a hydrophilic coating, then water (e.g., from rain) that lands on surface B may form a film on the surface. The surface film of water may result in less distortion, deflection, or occlusion of an output beam 125 than a surface with a non-hydrophilic coating or a hydrophobic coating.

Figure 19:
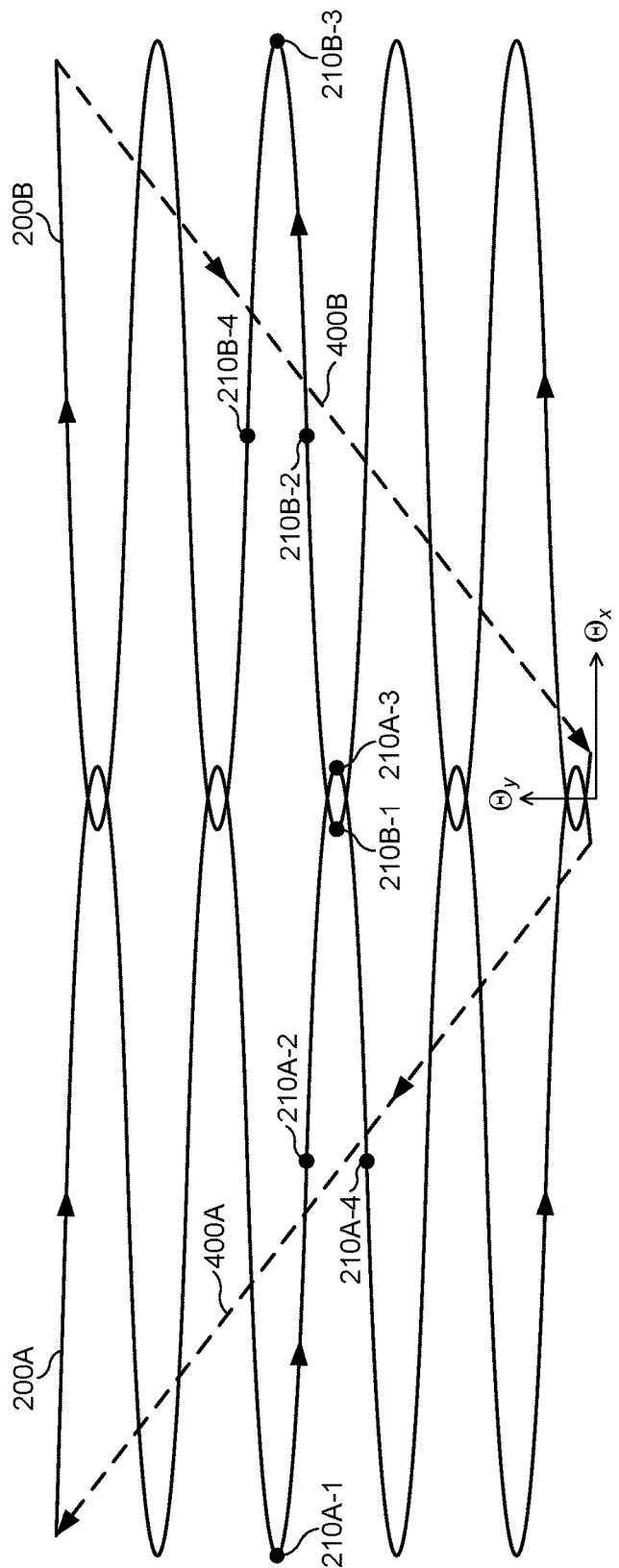
FIG. 19 illustrates two example scan patterns which are out of synchronization with respect to one another.

FIG. 19 illustrates two example scan patterns 200A and 200B which are out of synchronization with respect to one another. In particular embodiments, a lidar system may include two or more lidar sensors 100 that produce two or more respective scan patterns 200 which are scanned out of synchronization with respect to one another. As an example, a lidar system that includes two lidar sensors 100A and 100B (e.g., the lidar system illustrated in FIG. 17 or 18) may produce two scan patterns 200A and 200B which are out of synchronization with respect to one another. In particular embodiments, two or more scan patterns 200 that are out of synchronization may be referred to as scan patterns 200 that are non-synchronous, non-coincident, inverted, offset, or out of phase.

In the example of FIG. 19, scan patterns 200A and 200B each include a substantially sinusoidal back-and-forth scanning portion followed by a diagonal retrace 400A and 400B, respectively, that connects the end of a scan pattern with the beginning. Scan patterns 200A and 200B perform scans in an inverted sense with respect to one another. Scan pattern 200A scans from top to bottom (e.g., scan pattern 200A traces across the following pixels in order: 210A-1, 210A-2, 210A-3, and 210A-4), and retrace 400A is directed upward (from bottom to top). Scan pattern 200B, which is inverted with respect to scan pattern 200A, scans from bottom to top (e.g., scan pattern 200B traces across the following pixels in order: 210B-1, 210B-2, 210B-3, and 210B-4), and retrace 400B is directed downward. Scan patterns 200A and 200B in FIG. 19 may each include additional pixels 210 which are not illustrated in the figure.

In particular embodiments, scan patterns 200 that are scanned out of synchronization with respect to one another may be associated with a reduced amount of optical cross-talk between lidar sensors 100. A portion of cross-talk between lidar sensors 100 may be caused by light that is reflected or scattered at window 860 (e.g., a portion of scattered light 870A from lidar sensor 100A may be detected by receiver 140B, or a portion of scattered light 870B from lidar sensor 100B may be detected by receiver 140A). By scanning output beams 125A and 125B out of synchronization, the two output beams (and their associated receiver FOVs) may be directed at locations on window 860 that are mostly non-coincident or non-overlapping, which may reduce the amount of cross-talk light between the two lidar sensors. In FIG. 18, little to none of the scattered light 870A from output beam 125A may be detected by receiver 140B, since the FOV of receiver 140B may be directed at a different location on window 860 than the FOV of light source 110A. Similarly, little to none of the scattered light 870B from output beam 125B may be detected by receiver 140A.

In particular embodiments, scan patterns 200A and 200B being scanned out of synchronization with respect to one another may be associated with receiver 140A detecting substantial cross-talk light from output beam 125B for less than a particular amount of pixels 210 in scan pattern 200A. Additionally, receiver 140B may detect substantial cross-talk light from output beam 125A for less than a particular amount of pixels 210 in scan pattern 200B. As an example, the amount of pixels 210 for which substantial cross-talk light is detected may be less than or equal to approximately 1, 10, 100, 1,000, or any other suitable number of pixels 210. As another example, the amount of pixels 210 for which substantial cross-talk light is detected may be less than or equal to approximately 10%, 1%, 0.1%, 0.01%, 0.001%, or any other suitable percentage of pixels 210 in a scan pattern 200. If scan pattern 200A includes 50,000 pixels 210, and approximately 0.1% of the pixels 210 include a substantial amount of cross-talk light from output beam 125B, then approximately 50 pixels 210 (out of the 50,000 pixels 210) may include substantial cross-talk light.

In particular embodiments, detection of substantial cross-talk light by receiver 140A may refer to the receiver 140A detecting an amount of light from output beam 125B that is above a particular threshold value. As an example, receiver 140A may have a particular threshold value that corresponds to a valid detection of a pulse of light. If a voltage signal produced by receiver 140A (e.g., in response to detecting a pulse of light) exceeds a particular threshold voltage, then the voltage signal may correspond to a valid pulse-detection event (e.g., detection of a pulse of light that is scattered by a target 130). Detection of substantial cross-talk light (e.g., an invalid pulse-detection event) may result from receiver 140A detecting cross-talk light from lidar sensor 100B that exceeds the particular detection-threshold voltage. Similarly, receiver 140B detecting substantial cross-talk light may result from receiver 140B detecting cross-talk light from lidar sensor 100A that exceeds the particular detection-threshold voltage.

In particular embodiments, a scan pattern 200 may include a scan-pattern x-component ($\Theta_x$) and a scan-pattern y-component ($\Theta_y$). The x-component may correspond to a horizontal (or, azimuthal) angular scan, and the y-component may correspond to a vertical (or, elevation) angular scan. In FIG. 19, scan pattern 200A includes a scan-pattern x-component ($\Theta_{Ax}$) and a scan-pattern y-component ($\Theta_{Ay}$), and scan pattern 200B includes a scan-pattern x-component ($\Theta_{Bx}$) and a scan-pattern y-component ($\Theta_{By}$). As an example, the scan patterns 200A and 200B in FIG. 19 may be produced by the lidar system in FIG. 17, where mirror 300A-1 produces the $\Theta_{Ay}$ scan component, mirror 300A-2 produces the $\Theta_{Ax}$ scan component, mirror 300B-1 produces the $\Theta_{By}$ scan component, and mirror 300B-2 produces the $\Theta_{Bx}$ scan component.

Figure 20:
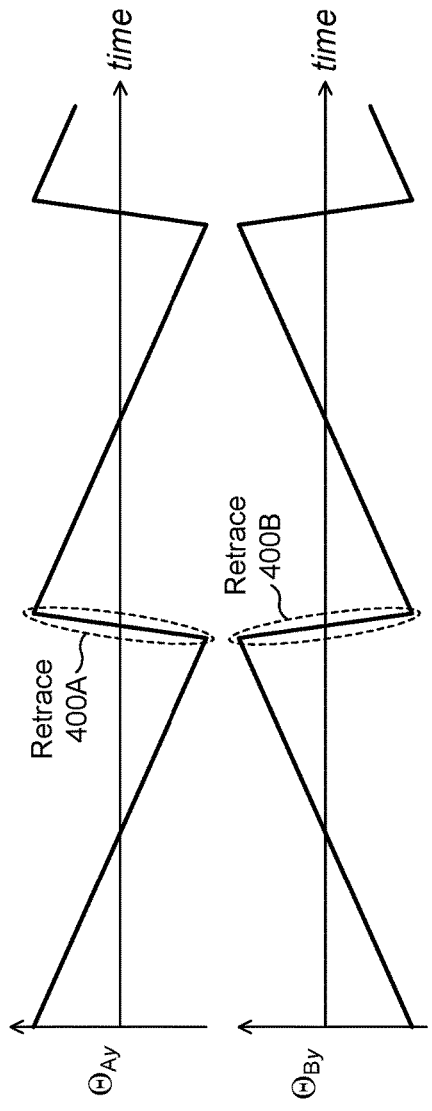
FIG. 20 illustrates two example scan-pattern y-components which are inverted with respect to one another.

FIG. 20 illustrates two example scan-pattern y-components $\Theta_{Ay}$ and $\Theta_{By}$ which are inverted with respect to one another. In particular embodiments, two scan patterns 200 being scanned out of synchronization may include one scan-pattern y-component ($\Theta_{Ay}$) being inverted with respect to the other scan-pattern y-component ($\Theta_{By}$). The $\Theta_{Ay}$ component in FIG. 20 corresponds to the vertical scan component of scan pattern 200A in FIG. 19, and the $\Theta_{By}$ component in FIG. 20 corresponds to the vertical scan component of scan pattern 200B in FIG. 19. The scan patterns 200A and 200B are inverted in the sense that scan pattern 200A scans from top to bottom, and scan pattern 200B scans in the opposite direction (from bottom to top). For the®Ay component in FIG. 20, the fast, positive ramp corresponds to retrace 400A, and the slow, negative ramp corresponds to the top-to-bottom scan of scan pattern 200A in FIG. 19. For the $\Theta_{By}$ component in FIG. 20, the fast, negative ramp corresponds to retrace 400B, and the slow, positive ramp corresponds to the bottom-to-top scan of scan pattern 200B in FIG. 19. By scanning scan patterns 200A and 200B in an inverted manner, the overlap between output beams 125A and 125B (and their corresponding receiver FOVs) may be minimized, which may be associated with a reduction in optical cross-talk between lidar sensors 100A and 100B. As an example, in FIG. 19, output beams 125A and 125B traversing inverted scan patterns 200A and 200B, respectively, may only be overlapped, if at all, in a region near pixel 210B-1 or 210A-3.

Figure 21:
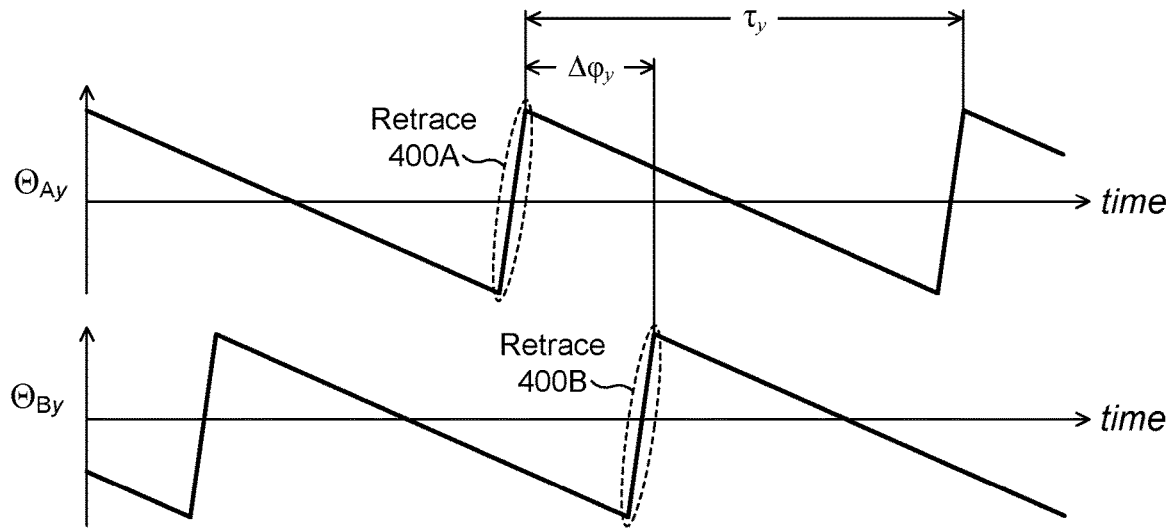
FIG. 21 illustrates two example scan-pattern y-components which are offset from one another by a phase shift $\Delta\varphi_y$.

FIG. 21 illustrates two example scan-pattern y-components $\Theta_{Ay}$ and $\Theta_{By}$ which are offset from one another by a phase shift $\Delta\varphi_y$. In particular embodiments, two scan patterns 200 being scanned out of synchronization may include one scan-pattern y-component ($\Theta_{Ay}$) having a particular phase shift $\Delta\varphi_y$ relative to the other scan-pattern y-component ($\Theta_{By}$). As an example, each scan-pattern y-component ($\Theta_{Ay}$ and $\Theta_{By}$) may be a periodic function with a period $\tau_y$, and the two components may have any suitable phase shift $\Delta\varphi_y$, such as for example, a phase shift of approximately 0°, 45°, 90°, 180°, or 270°. In the example of FIG. 20, the two y-components $\Theta_{Ay}$ and $\Theta_{By}$ are inverted and have a relative phase shift of approximately 0°. In the example of FIG. 21, the two y-components $\Theta_{Ay}$ and $\Theta_{By}$ are not inverted (e.g., they both correspond to a top-to-bottom scan) and have a phase shift $\Delta\varphi_y$ of approximately 105°. While the two y-components $\Theta_{Ay}$ and $\Theta_{By}$ in FIG. 21 may correspond to two scan patterns with a similar top-to-bottom scan trajectory, the relative phase shift $\Delta\varphi_y$ between the two scan patterns may ensure that there is little or no optical cross-talk between the associated lidar sensors.

Figure 22:
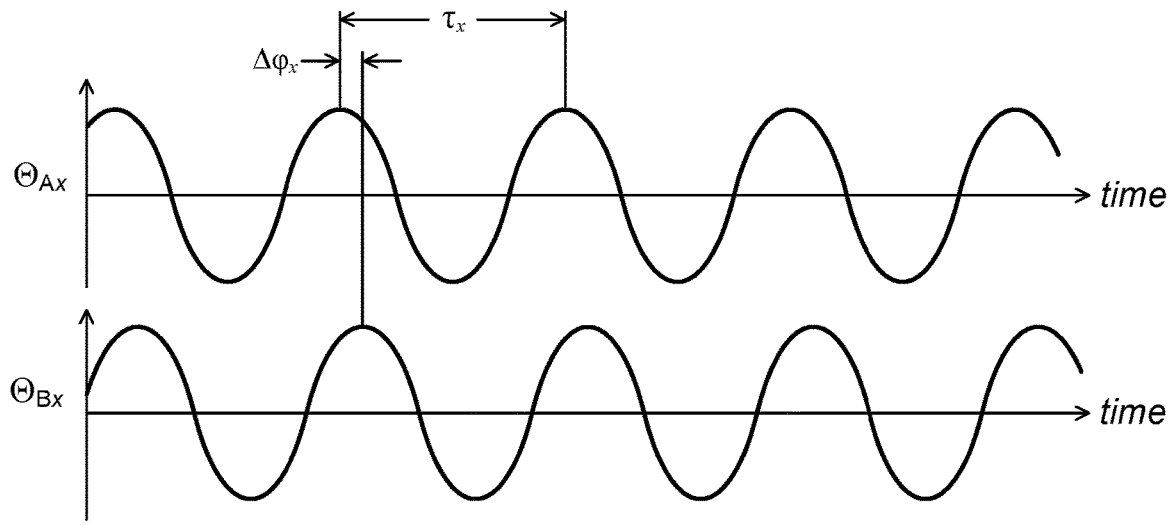
FIG. 22 illustrates two example scan-pattern x-components which are offset from one another by a phase shift $\Delta\varphi_x$.

FIG. 22 illustrates two example scan-pattern x-components $\Theta_{Ax}$ and $\Theta_{Bx}$ which are offset from one another by a phase shift $\Delta\varphi_x$. In particular embodiments, two scan patterns 200 being scanned out of synchronization may include one scan-pattern x-component ($\Theta_{Ax}$) having a particular phase shift $\Delta\varphi_x$ relative to the other scan-pattern x-component ($\Theta_{Bx}$). As an example, each scan-pattern x-component ($\Theta_{Ax}$ and $\Theta_{Bx}$) may be a periodic function with a period $\tau_x$, and the two components may have any suitable phase shift $\Delta\varphi_x$, such as for example, a phase shift of approximately 0°, 45°, 90°, 180°, or 270°. In the example of FIG. 22, the two x-components $\Theta_{Ax}$ and $\Theta_{Bx}$ have a phase shift $\Delta\varphi_x$ of approximately 33°. In the example of FIG. 19, if the two x-components $\Theta_{Ax}$ and $\Theta_{Bx}$ have a phase shift $\Delta\varphi_x$ of approximately 0°, then when lidar system 100A is measuring pixel 210A-1, lidar system 100B may be measuring pixel 210B-1. Similarly, when lidar system 100A is measuring pixels 210A-2, 210A-3, and 210A-4, then lidar system 100B may be measuring pixels 210B-2, 210B-3, and 210B-4, respectively. In the example of FIG. 19, if the two x-components $\Theta_{Ax}$ and $\Theta_{Bx}$ have a phase shift $\Delta\varphi_x$ of approximately 90° (e.g., $\Theta_{Bx}$ leads $\Theta_{Ax}$ by 90°), then when lidar system 100A is measuring pixel 210A-1, lidar system 100B may be measuring pixel 210B-2. Similarly, when lidar system 100A is measuring pixels 210A-2 and 210A-3, then lidar system 100B may be measuring pixels 210B-3 and 210B-4, respectively. In particular embodiments, two scan patterns 200 being scanned out of synchronization may include one scan-pattern x-component ($\Theta_{Ax}$) being inverted with respect to the other scan-pattern x-component ($\Theta_{Bx}$).

In particular embodiments, a y-component scan period Ty may correspond to a time to capture a single scan pattern 200 and may be related to a frame rate of a lidar sensor 100. As an example, a scan period $\tau_y$ of approximately 100 ms may correspond to a lidar-sensor frame rate of approximately 10 Hz. In particular embodiments, an x-component scan period $\tau_x$ may correspond to a period of one back-and-forth azimuthal motion of an output beam 125. As an example, if scan pattern 200 includes M back-and-forth axial motions for each traversal of the scan pattern, then scan periods $\tau_x$ and $\tau_y$ may be approximately related by the expression $\tau_y = M\tau_x$. For example, if M is approximately 64 and scan period $\tau_y$ is approximately 100 ms (corresponding to a 10-Hz frame rate), then scan period $\tau_x$ is approximately 1.56 ms (corresponding to a horizontal oscillation frequency of approximately 640 Hz).

In particular embodiments, two scan patterns 200A and 200B being scanned out of synchronization may include any suitable combination of x- or y-components being inverted or having any suitable phase shift. As an example, two scan patterns 200A and 200B may have y-components $\Theta_{Ay}$ and $\Theta_{By}$ that are inverted and that also have a nonzero relative phase shift. As another example, two scan patterns 200A and 200B may have y-components $\Theta_{Ay}$ and $\Theta_{By}$ that are inverted and x-components $\Theta_{Ax}$ and $\Theta_{Bx}$ that have a nonzero relative phase shift.

In particular embodiments, a lidar system may include three or more lidar sensors 100 which produce scan patterns 200 that are scanned out of synchronization with respect to one another. As an example, a lidar system with three lidar sensors 100 may produce three scan patterns 200 with three respective sets of x-components (e.g., $\Theta_{Ax}$, $\Theta_{Bx}$, and $\Theta_{Cx}$) and three respective sets of y-components (e.g., $\Theta_{Ay}$, $\Theta_{By}$, and $\Theta_{Cy}$). The x- and y-components may have any suitable combination of phase shift or inversion with respect to one another. As an example, y-components $\Theta_{Ay}$ and $\Theta_{Cy}$ may both be inverted with respect to y-component $\Theta_{By}$. As another example, x-component $\Theta_{Ax}$ may have a +45° phase shift with respect to x-component $\Theta_{Bx}$, and x-component $\Theta_{Cx}$ may have a −45° phase shift with respect to x-component $\Theta_{Bx}$.

Figure 23:
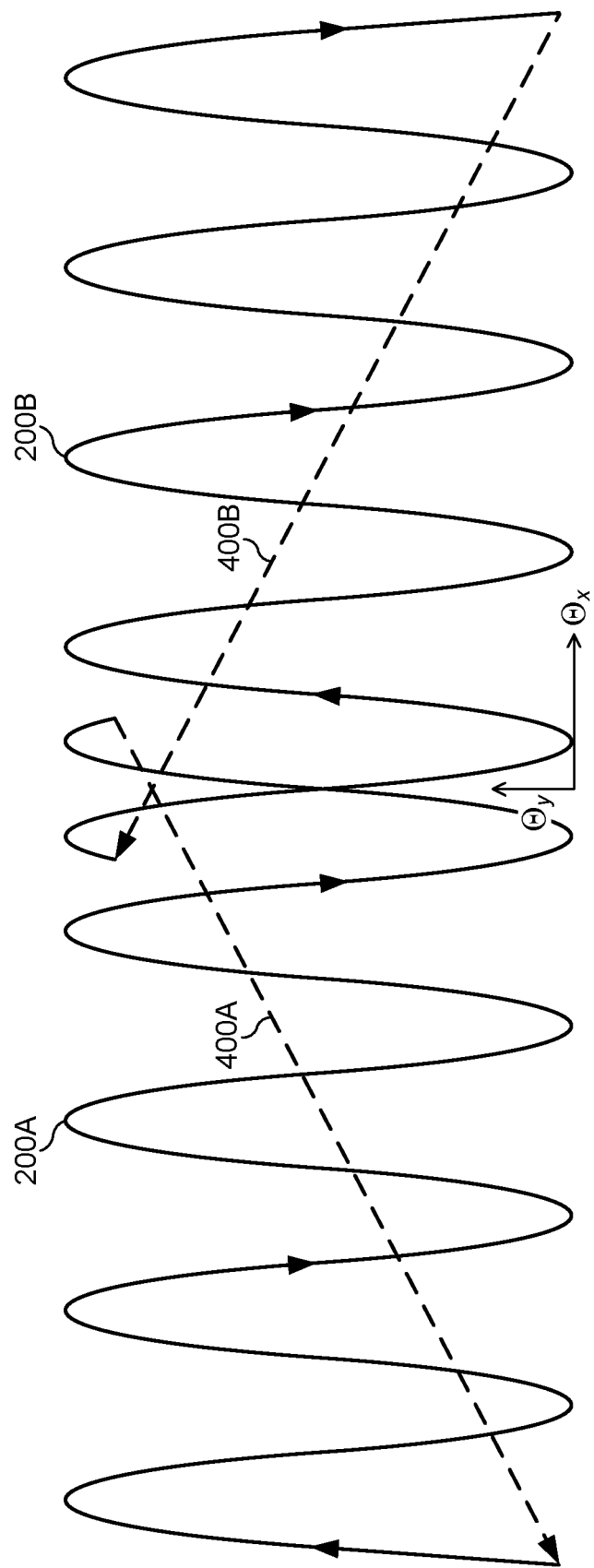
FIG. 23 illustrates two example scan patterns.

FIG. 23 illustrates two example scan patterns 200A and 200B. The scan patterns 200A and 200B illustrated in FIG. 23 may be out of synchronization with respect to one another. In particular embodiments, a scan pattern 200 may include a back-and-forth portion that is aligned along any suitable direction, such as for example, horizontal, vertical, or along any suitable angle. In the example of FIG. 19, scan patterns 200A and 200B each include a substantially sinusoidal back-and-forth portion that is aligned along a substantially horizontal direction. In particular embodiments, a scan pattern 200 may include a back-and-forth portion that is aligned along a substantially vertical direction. In the example of FIG. 23, scan patterns 200A and 200B each include a substantially sinusoidal back-and-forth portion that is aligned along a substantially vertical direction. The scan patterns 200A and 200B illustrated in FIG. 23 each include an x-component ($\Theta_{Ax}$ and $\Theta_{Bx}$, respectively) and a y-component ($\Theta_{Ay}$ and $\Theta_{By}$, respectively). The x-components may be inverted or have any suitable phase shift with respect to one another, and the y-components may be inverted or have any suitable phase shift respect to one another. The scan patterns 200A and 200B illustrated in FIG. 23 correspond to the scan patterns 200A and 200B illustrated in FIG. 19 with the x- and y-axes interchanged. As an example, the x-components of scan patterns 200A and 200B in FIG. 23 may be similar to the y-components illustrated in FIG. 20 or 21. Similarly, the y-components of scan patterns 200A and 200B in FIG. 23 may be similar to the x-components illustrated in FIG. 22.

Figure 24:
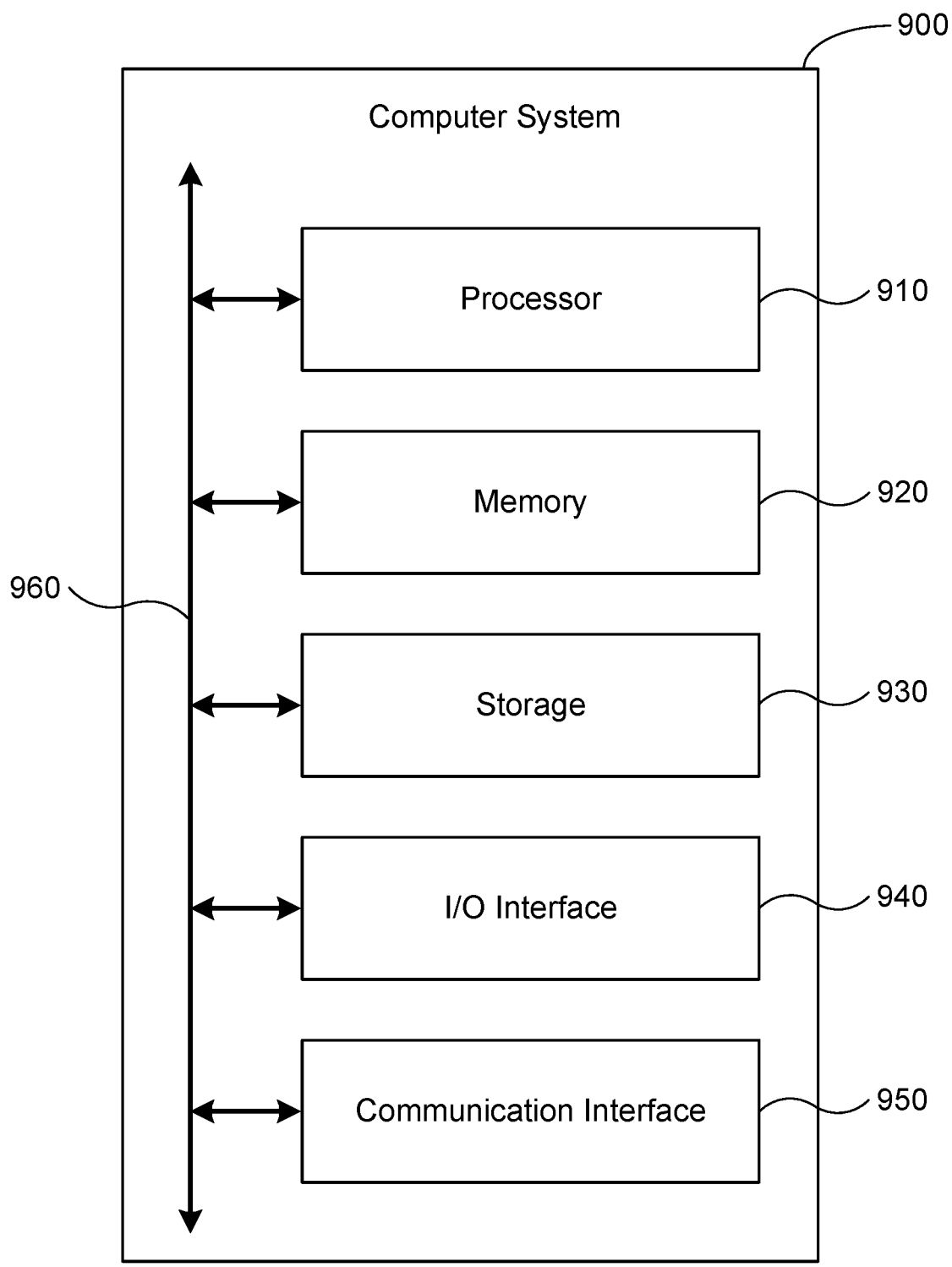
FIG. 24 illustrates an example computer system.

FIG. 24 illustrates an example computer system 900. In particular embodiments, one or more computer systems 900 may perform one or more steps of one or more methods described or illustrated herein. In particular embodiments, one or more computer systems 900 may provide functionality described or illustrated herein. In particular embodiments, software running on one or more computer systems 900 may perform one or more steps of one or more methods described or illustrated herein or may provide functionality described or illustrated herein. Particular embodiments may include one or more portions of one or more computer systems 900. In particular embodiments, a computer system may be referred to as a computing device, a computing system, a computer, a general-purpose computer, or a data-processing apparatus. Herein, reference to a computer system may encompass one or more computer systems, where appropriate.

Computer system 900 may take any suitable physical form. As an example, computer system 900 may be an embedded computer system, a system-on-chip (SOC), a single-board computer system (SBC), a desktop computer system, a laptop or notebook computer system, a mainframe, a mesh of computer systems, a server, a tablet computer system, or any suitable combination of two or more of these. As another example, all or part of computer system 900 may be combined with, coupled to, or integrated into a variety of devices, including, but not limited to, a camera, camcorder, personal digital assistant (PDA), mobile telephone, smartphone, electronic reading device (e.g., an e-reader), game console, smart watch, clock, calculator, television monitor, flat-panel display, computer monitor, vehicle display (e.g., odometer display or dashboard display), vehicle navigation system, lidar system, ADAS, autonomous vehicle, autonomous-vehicle driving system, cockpit control, camera view display (e.g., display of a rear-view camera in a vehicle), eyewear, or head-mounted display. Where appropriate, computer system 900 may include one or more computer systems 900; be unitary or distributed; span multiple locations; span multiple machines; span multiple data centers; or reside in a cloud, which may include one or more cloud components in one or more networks. Where appropriate, one or more computer systems 900 may perform without substantial spatial or temporal limitation one or more steps of one or more methods described or illustrated herein. As an example, one or more computer systems 900 may perform in real time or in batch mode one or more steps of one or more methods described or illustrated herein. One or more computer systems 900 may perform at different times or at different locations one or more steps of one or more methods described or illustrated herein, where appropriate.

As illustrated in the example of FIG. 24, computer system 900 may include a processor 910, memory 920, storage 930, an input/output (I/O) interface 940, a communication interface 950, or a bus 960. Computer system 900 may include any suitable number of any suitable components in any suitable arrangement.

In particular embodiments, processor 910 may include hardware for executing instructions, such as those making up a computer program. As an example, to execute instructions, processor 910 may retrieve (or fetch) the instructions from an internal register, an internal cache, memory 920, or storage 930; decode and execute them; and then write one or more results to an internal register, an internal cache, memory 920, or storage 930. In particular embodiments, processor 910 may include one or more internal caches for data, instructions, or addresses. Processor 910 may include any suitable number of any suitable internal caches, where appropriate. As an example, processor 910 may include one or more instruction caches, one or more data caches, or one or more translation lookaside buffers (TLBs). Instructions in the instruction caches may be copies of instructions in memory 920 or storage 930, and the instruction caches may speed up retrieval of those instructions by processor 910. Data in the data caches may be copies of data in memory 920 or storage 930 for instructions executing at processor 910 to operate on; the results of previous instructions executed at processor 910 for access by subsequent instructions executing at processor 910 or for writing to memory 920 or storage 930; or other suitable data. The data caches may speed up read or write operations by processor 910. The TLBs may speed up virtual-address translation for processor 910. In particular embodiments, processor 910 may include one or more internal registers for data, instructions, or addresses. Processor 910 may include any suitable number of any suitable internal registers, where appropriate. Where appropriate, processor 910 may include one or more arithmetic logic units (ALUs); may be a multi-core processor; or may include one or more processors 910.

In particular embodiments, memory 920 may include main memory for storing instructions for processor 910 to execute or data for processor 910 to operate on. As an example, computer system 900 may load instructions from storage 930 or another source (such as, for example, another computer system 900) to memory 920. Processor 910 may then load the instructions from memory 920 to an internal register or internal cache. To execute the instructions, processor 910 may retrieve the instructions from the internal register or internal cache and decode them. During or after execution of the instructions, processor 910 may write one or more results (which may be intermediate or final results) to the internal register or internal cache. Processor 910 may then write one or more of those results to memory 920. One or more memory buses (which may each include an address bus and a data bus) may couple processor 910 to memory 920. Bus 960 may include one or more memory buses. In particular embodiments, one or more memory management units (MMUs) may reside between processor 910 and memory 920 and facilitate accesses to memory 920 requested by processor 910. In particular embodiments, memory 920 may include random access memory (RAM). This RAM may be volatile memory, where appropriate. Where appropriate, this RAM may be dynamic RAM (DRAM) or static RAM (SRAM). Memory 920 may include one or more memories 920, where appropriate.

In particular embodiments, storage 930 may include mass storage for data or instructions. As an example, storage 930 may include a hard disk drive (HDD), a floppy disk drive, flash memory, an optical disc, a magneto-optical disc, magnetic tape, or a Universal Serial Bus (USB) drive or a combination of two or more of these. Storage 930 may include removable or non-removable (or fixed) media, where appropriate. Storage 930 may be internal or external to computer system 900, where appropriate. In particular embodiments, storage 930 may be non-volatile, solid-state memory. In particular embodiments, storage 930 may include read-only memory (ROM). Where appropriate, this ROM may be mask ROM (MROM), programmable ROM (PROM), erasable PROM (EPROM), electrically erasable PROM (EEPROM), flash memory, or a combination of two or more of these. Storage 930 may include one or more storage control units facilitating communication between processor 910 and storage 930, where appropriate. Where appropriate, storage 930 may include one or more storages 930.

In particular embodiments, I/O interface 940 may include hardware, software, or both, providing one or more interfaces for communication between computer system 900 and one or more I/O devices. Computer system 900 may include one or more of these I/O devices, where appropriate. One or more of these I/O devices may enable communication between a person and computer system 900. As an example, an I/O device may include a keyboard, keypad, microphone, monitor, mouse, printer, scanner, speaker, camera, stylus, tablet, touch screen, trackball, another suitable I/O device, or any suitable combination of two or more of these. An I/O device may include one or more sensors. Where appropriate, I/O interface 940 may include one or more device or software drivers enabling processor 910 to drive one or more of these I/O devices. I/O interface 940 may include one or more I/O interfaces 940, where appropriate.

In particular embodiments, communication interface 950 may include hardware, software, or both providing one or more interfaces for communication (such as, for example, packet-based communication) between computer system 900 and one or more other computer systems 900 or one or more networks. As an example, communication interface 950 may include a network interface controller (NIC) or network adapter for communicating with an Ethernet or other wire-based network or a wireless NIC (WNIC); a wireless adapter for communicating with a wireless network, such as a WI-FI network; or an optical transmitter (e.g., a laser or a light-emitting diode) or an optical receiver (e.g., a photodetector) for communicating using fiber-optic communication or free-space optical communication. Computer system 900 may communicate with an ad hoc network, a personal area network (PAN), an in-vehicle network (IVN), a local area network (LAN), a wide area network (WAN), a metropolitan area network (MAN), or one or more portions of the Internet or a combination of two or more of these. One or more portions of one or more of these networks may be wired or wireless. As an example, computer system 900 may communicate with a wireless PAN (WPAN) (such as, for example, a BLUETOOTH WPAN), a WI-FI network, a Worldwide Interoperability for Microwave Access (WiMAX) network, a cellular telephone network (such as, for example, a Global System for Mobile Communications (GSM) network), or other suitable wireless network or a combination of two or more of these. As another example, computer system 900 may communicate using fiber-optic communication based on 100 Gigabit Ethernet (100 GbE), 10 Gigabit Ethernet (10 GbE), or Synchronous Optical Networking (SONET). Computer system 900 may include any suitable communication interface 950 for any of these networks, where appropriate. Communication interface 950 may include one or more communication interfaces 950, where appropriate.

In particular embodiments, bus 960 may include hardware, software, or both coupling components of computer system 900 to each other. As an example, bus 960 may include an Accelerated Graphics Port (AGP) or other graphics bus, a controller area network (CAN) bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these. Bus 960 may include one or more buses 960, where appropriate.

In particular embodiments, various modules, circuits, systems, methods, or algorithm steps described in connection with the implementations disclosed herein may be implemented as electronic hardware, computer software, or any suitable combination of hardware and software. In particular embodiments, computer software (which may be referred to as software, computer-executable code, computer code, a computer program, computer instructions, or instructions) may be used to perform various functions described or illustrated herein, and computer software may be configured to be executed by or to control the operation of computer system 900. As an example, computer software may include instructions configured to be executed by processor 910. In particular embodiments, owing to the interchangeability of hardware and software, the various illustrative logical blocks, modules, circuits, or algorithm steps have been described generally in terms of functionality. Whether such functionality is implemented in hardware, software, or a combination of hardware and software may depend upon the particular application or design constraints imposed on the overall system.

In particular embodiments, a computing device may be used to implement various modules, circuits, systems, methods, or algorithm steps disclosed herein. As an example, all or part of a module, circuit, system, method, or algorithm disclosed herein may be implemented or performed by a general-purpose single- or multi-chip processor, a digital signal processor (DSP), an ASIC, a FPGA, any other suitable programmable-logic device, discrete gate or transistor logic, discrete hardware components, or any suitable combination thereof. A general-purpose processor may be a microprocessor, or, any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In particular embodiments, one or more implementations of the subject matter described herein may be implemented as one or more computer programs (e.g., one or more modules of computer-program instructions encoded or stored on a computer-readable non-transitory storage medium). As an example, the steps of a method or algorithm disclosed herein may be implemented in a processor-executable software module which may reside on a computer-readable non-transitory storage medium. In particular embodiments, a computer-readable non-transitory storage medium may include any suitable storage medium that may be used to store or transfer computer software and that may be accessed by a computer system. Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs (e.g., compact discs (CDs), CD-ROM, digital versatile discs (DVDs), blue-ray discs, or laser discs), optical disc drives (ODDs), magneto-optical discs, magneto-optical drives, floppy diskettes, floppy disk drives (FDDs), magnetic tapes, flash memories, solid-state drives (SSDs), RAM, RAM-drives, ROM, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In particular embodiments, certain features described herein in the context of separate implementations may also be combined and implemented in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

While operations may be depicted in the drawings as occurring in a particular order, this should not be understood as requiring that such operations be performed in the particular order shown or in sequential order, or that all operations be performed. Further, the drawings may schematically depict one more example processes or methods in the form of a flow diagram or a sequence diagram. However, other operations that are not depicted may be incorporated in the example processes or methods that are schematically illustrated. For example, one or more additional operations may be performed before, after, simultaneously with, or between any of the illustrated operations. Moreover, one or more operations depicted in a diagram may be repeated, where appropriate. Additionally, operations depicted in a diagram may be performed in any suitable order. Furthermore, although particular components, devices, or systems are described herein as carrying out particular operations, any suitable combination of any suitable components, devices, or systems may be used to carry out any suitable operation or combination of operations. In certain circumstances, multitasking or parallel processing operations may be performed. Moreover, the separation of various system components in the implementations described herein should not be understood as requiring such separation in all implementations, and it should be understood that the described program components and systems may be integrated together in a single software product or packaged into multiple software products.

Various embodiments have been described in connection with the accompanying drawings. However, it should be understood that the figures may not necessarily be drawn to scale. As an example, distances or angles depicted in the figures are illustrative and may not necessarily bear an exact relationship to actual dimensions or layout of the devices illustrated.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes or illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend.

The term "or" as used herein is to be interpreted as an inclusive or meaning any one or any combination, unless expressly indicated otherwise or indicated otherwise by context. Therefore, herein, the expression "A or B" means "A, B, or both A and B." As another example, herein, "A, B or C" means at least one of the following: A; B; C; A and B; A and C; B and C; A, B and C. An exception to this definition will occur if a combination of elements, devices, steps, or operations is in some way inherently mutually exclusive.

As used herein, words of approximation such as, without limitation, "approximately, "substantially," or "about" refer to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skill in the art recognize the modified feature as having the required characteristics or capabilities of the unmodified feature. In general, but subject to the preceding discussion, a numerical value herein that is modified by a word of approximation such as "approximately" may vary from the stated value by ±0.5%, ±1%, ±2%, ±3%, ±4%, ±5%, ±10%, ±12%, or ±15%.

As used herein, the terms "first," "second," "third," etc. may be used as labels for nouns that they precede, and these terms may not necessarily imply a particular ordering (e.g., a particular spatial, temporal, or logical ordering). As an example, a system may be described as determining a "first result" and a "second result," and the terms "first" and "second" may not necessarily imply that the first result is determined before the second result.

As used herein, the terms "based on" and "based at least in part on" may be used to describe or present one or more factors that affect a determination, and these terms may not exclude additional factors that may affect a determination. A determination may be based solely on those factors which are presented or may be based at least in part on those factors. The phrase "determine A based on B" indicates that B is a factor that affects the determination of A. In some instances, other factors may also contribute to the determination of A. In other instances, A may be determined based solely on B.

What is claimed is:

1. A system comprising:
   a light source configured to produce a first set of pulses of light having a first wavelength and a second set of pulses of light having a second wavelength different from the first wavelength;
   a first lidar sensor comprising:
      a first scanner configured to scan the first set of pulses of light along a first scan pattern; and
      a first receiver configured to detect scattered light from the first set of pulses of light, wherein the first receiver comprises a first optical filter configured to transmit light at the first wavelength and block light at the second wavelength;
   a second lidar sensor comprising:
      a second scanner configured to scan the second set of pulses of light along a second scan pattern, wherein the first scan pattern and the second scan pattern are at least partially overlapped in an overlap region; and
      a second receiver configured to detect scattered light from the second set of pulses of light, wherein the second receiver comprises a second optical filter configured to transmit light at the second wavelength and block light at the first wavelength;
   an enclosure, wherein the first lidar sensor and the second lidar sensor are contained within the enclosure, wherein the enclosure comprises a window configured to transmit the first set of pulses of light and the second set of pulses of light, wherein the window comprises a surface with a dielectric coating that is anti-reflecting at the first and second wavelengths; and
   wherein the first scanner and the second scanner include one or more of a galvanometer scanner, a resonant scanner, a microelectromechanical systems (MEMS) device, a polygonal scanner, or a voice coil motor.

2. The system of claim 1, wherein the light source comprises a fiber laser, wherein the fiber laser is configured to produce the first set of pulses of light and the second set of pulses of light.

3. The system of claim 2 wherein the fiber laser is configured with an operating wavelength between 1400 nm and 1600 nm.

4. The system of claim 2 wherein the fiber laser is contained within the enclosure.

5. The system of claim 1, further comprising a controller configured to determine a distance from the system to a target based at least in part on a round-trip time of flight for a pulse of light to travel from the system to the target and back to the system.

6. The system of claim 1, further comprising a controller configured to adjust a density of pixels of the first or second scan pattern.

7. The system of claim 1, further comprising a controller configured to:
   perform a scan that covers a field of regard of the system; and
   perform a targeted scan that covers a targeted scan region of the field of regard, wherein the targeted scan that covers the targeted scan region has a higher pixel density than the scan that covers the field of regard.

8. The system of claim 1, further comprising a third lidar sensor contained within the enclosure, wherein the third lidar sensor comprises:
   a third scanner configured to scan a third set of pulses of light along a third scan pattern, wherein the second scan pattern and the third scan pattern are at least partially overlapped; and
   a third receiver configured to detect scattered light from the third set of pulses of light.

9. The lidar system of claim 1, wherein the surface of the window has a reflectivity less than or equal to 1% at the first and second wavelengths.

10. The lidar system of claim 1, wherein the dielectric coating is high-reflecting at wavelengths away from the first and second wavelengths.

11. The lidar system of claim 1, wherein the light source comprises:
    a first light source configured to produce the first set of pulses of light; and
    a second light source configured to produce the second set of pulses of light.

12. A vehicle comprising:
    a sensor system comprising:
       a light source configured to produce a first set of pulses of light having a first wavelength and a second set of pulses of light having a second wavelength different from the first wavelength;
       a first lidar sensor comprising:
          a first scanner configured to scan the first set of pulses of light along a first scan pattern; and
          a first receiver configured to detect scattered light from the first set of pulses of light to capture a first set of pixels, wherein the first receiver comprises a first optical filter configured to transmit light at the first wavelength and block light at the second wavelength;
       a second lidar sensor comprising:
          a second scanner configured to scan the second set of pulses of light along a second scan pattern, wherein the first scan pattern and the second scan pattern are at least partially overlapped in an overlap region; and
          a second receiver configured to detect scattered light from the second set of pulses of light to capture a second set of pixels, wherein the second receiver comprises a second optical filter configured to transmit light at the second wavelength and block light at the first wavelength;
       an enclosure, wherein the first lidar sensor and the second lidar sensor are contained within the enclosure, wherein the enclosure comprises a window configured to transmit the first set of pulses of light and the second set of pulses of light, wherein the window comprises a surface with a dielectric coating that is anti-reflecting at the first and second wavelengths; and
       wherein the first scanner and the second scanner include one or more of a galvanometer scanner, a resonant scanner, a microelectromechanical systems (MEMS) device, a polygonal scanner, or a voice coil motor; and
    a controller configured to sense or identify a target using at least the first set of pixels and the second set of pixels.

13. The vehicle of claim 12, wherein the controller is further configured to:
    determine a distance from the sensor system to the target based at least in part on a round-trip time of flight for a pulse of light to travel from the system to the target and back to the system; and update a driving control signal based at least in part on the distance from the sensor system to the target.

\* \* \* \* \*